(12) United States Patent
Oh

(10) Patent No.: US 11,544,877 B2
(45) Date of Patent: Jan. 3, 2023

(54) POINT CLOUD DATA TRANSMISSION DEVICE, POINT CLOUD DATA TRANSMISSION METHOD, POINT CLOUD DATA RECEPTION DEVICE, AND POINT CLOUD DATA RECEPTION METHOD

(71) Applicant: LG Electronics Inc., Seoul (KR)

(72) Inventor: Sejin Oh, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/124,067

(22) Filed: Dec. 16, 2020

(65) Prior Publication Data

US 2021/0217200 A1 Jul. 15, 2021

Related U.S. Application Data

(60) Provisional application No. 62/959,755, filed on Jan. 10, 2020.

(51) Int. Cl.
*G06T 9/00* (2006.01)
*H04N 19/70* (2014.01)
*G06T 17/00* (2006.01)
*H04N 19/20* (2014.01)
*H04N 19/46* (2014.01)

(52) U.S. Cl.
CPC ............ *G06T 9/00* (2013.01); *G06T 17/00* (2013.01); *H04N 19/70* (2014.11); *H04N 19/20* (2014.11); *H04N 19/46* (2014.11)

(58) Field of Classification Search
None
See application file for complete search history.

(56) References Cited

U.S. PATENT DOCUMENTS

| | | |
|---|---|---|
| 2017/0186177 A1 | 6/2017 | Nagori et al. |
| 2018/0268570 A1 | 9/2018 | Budagavi et al. |
| 2019/0318488 A1* | 10/2019 | Lim ............... H04N 21/8547 |
| 2020/0014907 A1 | 1/2020 | Lee et al. |
| 2020/0153885 A1* | 5/2020 | Lee ....................... G06T 9/001 |
| 2020/0296397 A1* | 9/2020 | Wang .................. H04N 13/161 |
| 2021/0006833 A1* | 1/2021 | Tourapis ............... G06T 9/001 |

(Continued)

FOREIGN PATENT DOCUMENTS

| | | | |
|---|---|---|---|
| KR | 20200005438 A * | 1/2020 | ....... H04N 21/21805 |
| WO | WO2019078000 | 4/2019 | |
| WO | WO2019079032 | 4/2019 | |

OTHER PUBLICATIONS

WD of ISO/IEC 23090-10 Carriage of PC data, ISO/IEC JTC1/SC29/WG 11, MPEG 126th meeting, Geneva, N18321, w18413, Apr. 12, 2019, See p. 1-15 (Year: 2019).*

(Continued)

*Primary Examiner* — Lindsay J Uhl
(74) *Attorney, Agent, or Firm* — Fish & Richardson P.C.

(57) ABSTRACT

Disclosed herein is a point cloud data transmission method. The transmission method may include encoding the point cloud data, encapsulating the point cloud data, and transmitting point cloud data. Disclosed herein is a point cloud data reception device. The reception device may include a receiver configured to receive the point cloud data, a decapsulator configured to decapsulate the point cloud data, and a decoder configured to decode the point cloud data.

10 Claims, 48 Drawing Sheets

(56) References Cited

U.S. PATENT DOCUMENTS

2021/0105313 A1* 4/2021 Wang .................. H04L 65/80

OTHER PUBLICATIONS

PCT International Search Report and Written Opinion in International Appln. No. PCT/KR2020/016057, dated Feb. 26, 2021, 20 pages (with English translation).
International Search Report and Written Opinion in International Appln. No. PCT/KR2020/016057, dated Feb. 26, 2021, 3 pages (with English translation).
Lopes, "Adaptive Plane Projection for Video-based Point Cloud Coding," Thesis to obtain the Master of Science Degree in Electrical and Computer Engineering, dated Nov. 2018, 115 pages.

* cited by examiner

FIG. 2
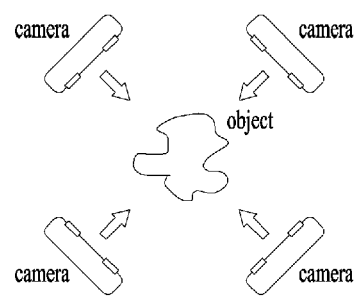
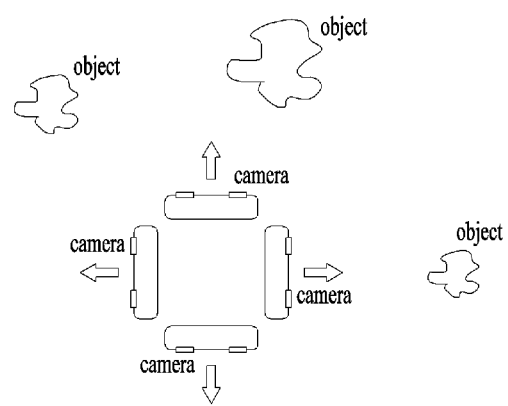

FIG. 27

| vpcc_unit( numBytesInVPCCUnit) { | Descriptor |
|---|---|
|    vpcc_unit_header( ) | |
|    vpcc_unit_payload( ) | |
|    while( more_data_in_vpcc_unit ) | |
|       trailing_zero_8bits /* equal to 0x00 */ | f(8) |
| } | |

| vpcc_unit_header( ) { | Descriptor |
|---|---|
|    vuh_unit_type | u(5) |
|    if( vuh_unit_type == VPCC_AVD \|\| vuh_unit_type == VPCC_GVD \|\| | |
|       vuh_unit_type == VPCC_OVD \|\| vuh_unit_type == VPCC_AD ) { | |
|       vuh_vpcc_parameter_set_id | u(4) |
|       vuh_atlas_id | u(6) |
|    } | |
|    if( vuh_unit_type == VPCC_AVD ) { | |
|       vuh_attribute_index | u(7) |
|       vuh_attribute_partition_index | u(5) |
|       vuh_map_index | u(4) |
|       vuh_auxiliary_video_flag | u(1) |
|    } else if( vuh_unit_type == VPCC_GVD ) { | |
|       vuh_map_index | u(4) |
|       vuh_auxiliary_video_flag | u(1) |
|       vuh_reserved_zero_12bits | u(12) |
|    } else if( vuh_unit_type == VPCC_OVD \|\| vuh_unit_type == VPCC_AD ) | |
|       vuh_reserved_zero_17bits | u(17) |
|    else | |
|       vuh_reserved_zero_27bits | u(27) |
| } | |

FIG. 28

| vpcc_unit_payload( ) { | Descriptor |
|---|---|
|     if( vuh_unit_type == VPCC_VPS ) | |
|         vpcc_parameter_set( ) | |
|     else if( vuh_unit_type == VPCC_AD ) | |
|         atlas_sub_bitstream( ) | |
|     else if( vuh_unit_type == VPCC_OVD \|\| | |
|         vuh_unit_type == VPCC_GVD \|\| | |
|         vuh_unit_type == VPCC_AVD) | |
|         video_sub_bitstream( ) | |
| } | |

FIG. 29

| | Descriptor |
|---|---|
| vpcc_parameter_set( ) { | |
|   profile_tier_level() | |
|   vps_vpcc_parameter_set_id | u(4) |
|   sps_bounding_box_present_flag | u(1) |
|   if( sps_bounding_box_present_flag ) { | |
|     sps_bounding_box_offset_x | se(v) |
|     sps_bounding_box_offset_y | se(v) |
|     sps_bounding_box_offset_z | se(v) |
|     sps_bounding_box_size_width | ue(v) |
|     sps_bounding_box_size_height | ue(v) |
|     sps_bounding_box_size_depth | ue(v) |
|     sps_bounding_box_changed_flag | u(1) |
|     sps_bounding_box_info_flag | u(1) |
|   } | |
|   vps_atlas_count_minus1 | u(6) |
|   for(j = 0; j < vps_atlas_count_minus1 + 1; j++ ) { | |
|     vps_frame_width[ j ] | u(16) |
|     vps_frame_height[ j ] | u(16) |
|     vps_map_count_minus1[ j ] | u(4) |
|     if( vps_map_count_minus1[ j ] > 0 ) | |
|       vps_multiple_map_streams_present_flag[ j ] | u(1) |
|     vps_map_absolute_coding_enabled_flag[ j ][ 0 ] = 1 | |
|     for( i = 1; i <= vps_map_count_minus1[ j ]; i++ ) { | |
|       if( vps_multiple_map_streams_present_flag[ j ] ) | |
|         vps_map_absolute_coding_enabled_flag[ j ][ i ] | u(1) |
|       else | |
|         vps_map_absolute_coding_enabled_flag[ j ][ i ] = 1 | |
|       if( vps_map_absolute_coding_enabled_flag[ j ][ i ] == 0 ) { | |
|         if( i > 0 ) | |
|           vps_map_predictor_index_diff[ j ][ i ] | ue(v) |
|         else | |
|           vps_map_predictor_index_diff[ j ][ i ] = 0 | |
|       } | |
|     } | |
|     vps_raw_patch_enabled_flag[ j ] | u(1) |
|     if( vps_raw_patch_enabled_flag[ j ] ) | |
|       vps_raw_separate_video_present_flag[ j ] | u(1) |
|     occupancy_information( j ) | |
|     geometry_information( j ) | |
|     attribute_information( j ) | |
|   } | |
|   byte_alignment( ) | |
| } | |

FIG. 31

| atlas_sequence_parameter_set_rbsp( ) { | Descriptor |
|---|---|
| asps_atlas_sequence_parameter_set_id | ue(v) |
| asps_frame_width | u(16) |
| asps_frame_height | u(16) |
| asps_log2_patch_packing_block_size | u(3) |
| asps_log2_max_atlas_frame_order_cnt_lsb_minus4 | ue(v) |
| asps_max_dec_atlas_frame_buffering_minus1 | ue(v) |
| asps_long_term_ref_atlas_frames_flag | u(1) |
| asps_num_ref_atlas_frame_lists_in_asps | ue(v) |
| for( i = 0; i < asps_num_ref_atlas_frame_lists_in_asps; i++ ) | |
|     ref_list_struct( i ) | |
| asps_use_eight_orientations_flag | u(1) |
| asps_45degree_projection_patch_present_flag | u(1) |
| asps_normal_axis_limits_quantization_enabled_flag | u(1) |
| asps_normal_axis_max_delta_value_enabled_flag | u(1) |
| asps_remove_duplicate_point_enabled_flag | u(1) |
| asps_pixel_deinterleaving_flag | u(1) |
| asps_patch_precedence_order_flag | u(1) |
| asps_patch_size_quantizer_present_flag | u(1) |
| asps_enhanced_occupancy_map_for_depth_flag | u(1) |
| asps_point_local_reconstruction_enabled_flag | u(1) |
| if( asps_enhanced_occupancy_map_for_depth_flag || | |
|     asps_point_local_reconstruction_enabled_flag ) | |
|     asps_map_count_minus1 | u(4) |
| if( asps_enhanced_occupancy_map_for_depth_flag && asps_map_count_minus1 = = 0 ) | |
|     asps_enhanced_occupancy_map_fix_bit_count_minus1 | u(4) |
| if( asps_point_local_reconstruction_enabled_flag ) | |
|     asps_point_local_reconstruction_information( asps_map_count_minus1 ) | |
| if( asps_pixel_interleaving_flag || asps_point_local_reconstruction_enabled_flag ) | |
|     asps_surface_thickness_minus1 | u(8) |
| asps_vui_parameters_present_flag | u(1) |
| if( asps_vui_parameters_present_flag ) | |
|     vui_parameters( ) | |
| rbsp_trailing_bits( ) | |
| } | |

FIG. 32

| atlas_frame_parameter_set_rbsp( ) { | Descriptor |
|---|---|
| afps_atlas_frame_parameter_set_id | ue(v) |
| afps_atlas_sequence_parameter_set_id | ue(v) |
| atlas_frame_tile_information( ) | |
| afps_num_ref_idx_default_active_minus1 | ue(v) |
| afps_additional_lt_afoc_lsb_len | ue(v) |
| afps_2d_pos_x_bit_count_minus1 | u(4) |
| afps_2d_pos_y_bit_count_minus1 | u(4) |
| afps_3d_pos_x_bit_count_minus1 | u(5) |
| afps_3d_pos_y_bit_count_minus1 | u(5) |
| afps_lod_bit_count | u(5) |
| afps_override_eom_for_depth_flag | u(1) |
| if( afps_override_eom_for_depth_flag ) { | |
|     afps_eom_number_of_patch_bit_count_minus1 | u(4) |
|     afps_eom_max_bit_count_minus1 | u(4) |
| } | |
| afps_raw_3d_pos_bit_count_explicit_mode_flag | u(1) |
| rbsp_trailing_bits( ) | |
| } | |

FIG. 33

| atlas_frame_tile_information( ) { | Descriptor |
|---|---|
|     afti_single_tile_in_atlas_frame_flag | u(1) |
|     if( !afti_single_tile_in_atlas_frame_flag ) { | |
|         afti_uniform_tile_spacing_flag | u(1) |
|         if( afti_uniform_tile_spacing_flag ) { | |
|             afti_tile_cols_width_minus1 | ue(v) |
|             afti_tile_rows_height_minus1 | ue(v) |
|         } else { | |
|             afti_num_tile_columns_minus1 | ue(v) |
|             afti_num_tile_rows_minus1 | ue(v) |
|             for( i = 0; i < afti_num_tile_columns_minus1; i++ ) | |
|                 afti_tile_column_width_minus1[ i ] | ue(v) |
|             for( i = 0; i < afti_num_tile_rows_minus1; i++ ) | |
|                 afti_tile_row_height_minus1[ i ] | ue(v) |
|         } | |
|         afti_num_tiles_in_atlas_frame_minus1 | ue(v) |
|         for( i = 0; i < afti_num_tile_groups_in_atlas_frame_minus1 + 1; i++ ) | |
|             afti_tile_idx[i] | u(v) |
|     afti_single_tile_per_tile_group_flag | u(1) |
|     if( !afti_single_tile_per_tile_group_flag ) { | |
|         afti_num_tile_groups_in_atlas_frame_minus1 | ue(v) |
|         for( i = 0; i < afti_num_tile_groups_in_atlas_frame_minus1 + 1; i++ ) { | |
|             if( i > 0 ) | |
|                 afti_top_left_tile_idx[ i ] | u(v) |
|             afti_bottom_right_tile_idx_delta[ i ] | u(v) |
|         } | |
|     } | |
|     afti_signalled_tile_group_id_flag | u(1) |
|     if( afti_signalled_tile_group_id_flag ) { | |
|         afti_signalled_tile_group_id_length_minus1 | ue(v) |
|         for( i = 0; i < afti_num_tile_groups_in_atlas_frame_minus1 + 1; i++ ) | |
|             afti_tile_group_id[ i ] | u(v) |
|     } | |
|     } | |
| } | |

FIG. 34

```
sei_payload( payloadType, payloadSize ) {
    if( psd_unit_type == PSD_PREFIX_SEI ) {
        if( payloadType == 0 )
            buffering_period( payloadSize )
        else if( payloadType == 1 )
            pic_timing( payloadSize )
        else if( payloadType == 2 )
            filler_payload( payloadSize )
        else if( payloadType == 3 )
            user_data_registered_itu_t_t35( payloadSize )
        else if( payloadType == 4 )
            user_data_unregistered( payloadSize )
        else if( payloadType == 5 )
            recovery_point( payloadSize )
        else if( payloadType == 6 )
            no_display( payloadSize )
        else if( payloadType == 7 )
            time_code( payloadSize )
        else if( payloadType == 8 )
            regional_nesting( payloadSize )
        else if( payloadType == 9 )
            sei_manifest( payloadSize )
        else if( payloadType == 10 )
            sei_prefix_indication( payloadSize )
        else if( payloadType == 11 )
            geometry_transformation_params ( payloadSize )
        else if( payloadType == 12 )
            3d_bounding_box_info( payloadSize )
        else if( payloadType == 13)
            3d_region_mapping( payloadSize )
        else
            reserved_sei_message( payloadSize )
    }
    else { /* psd_unit_type == PSD_SUFFIX_SEI */
        if( payloadType == 2 )
            filler_payload( payloadSize )
        else if( payloadType == 3 )
            user_data_registered_itu_t_t35( payloadSize )
        else if( payloadType == 4 )
            user_data_unregistered( payloadSize )
        else if( payloadType == 11 )
            decoded_pcc_hash( payloadSize )
        else
            reserved_sei_message( payloadSize )
    }
    if( more_data_in_payload( ) ) {
        if( payload_extension_present( ) )
            sp_reserved_payload_extension_data
        byte_alignment( )
    }
}
```

FIG. 35

| 3d_bounding_box_info( payloadSize ) { | Descriptor |
|---|---|
| 3dbi_cancel_flag | u(1) |
| if (!3dbi_cancel_flag) { | |
| object_id | ue(v) |
| 3d_bounding_box_x | se(v) |
| 3d_bounding_box_y | se(v) |
| 3d_bounding_box_z | se(v) |
| 3d_bounding_box_delta_x | ue(v) |
| 3d_bounding_box_delta_y | ue(v) |
| 3d_bounding_box_delta_z | ue(v) |
| } | |

FIG. 36

| 3d_region_mapping_info( payloadSize ) { | Descriptor |
|---|---|
|   3dmi_cancel_flag | u(1) |
|   if (!3dmi_cancel_flag) { | |
|   num_3d_regions | ue(v) |
|   for(i=0; i<num_3d_regions;i++){ | |
|     3d_region_idx[i] | |
|     3d_region_anchor_x[i] | se(v) |
|     3d_region_anchor_y[i] | se(v) |
|     3d_region_anchor_z[i] | se(v) |
|     3d_region_type[i] | |
|     if (3d_region_type == '1') {. //cuboid | |
|       3d_region_delta_x[i] | ue(v) |
|       3d_region_delta_y[i] | ue(v) |
|       3d_region_delta_z[i] | ue(v) |
|     } | |
|     num_2d_regions [i] | ue(v) |
|     for(j=0; j < num_2d_regions [i]; j++){ | |
|     2d_region_idx [j] | |
|     2d_region_top [j] | se(v) |
|     2d_region_left [j] | se(v) |
|     2d_region_width [j] | ue(v) |
|     2d_region_height [j] | ue(v) |
|     num_tiles[j] | ue(v) |
|     for (k=0; k < num_tiles [j] ; k++) | |
|       tile_idx[k] | ue(v) |
|     num_tile_groups[j] | ue(v) |
|     for (m=0; m < num_tile_groups[j]; m++) | |
|       tile_group_idx[m] | ue(v) |
|     } | |
|    } | |
|   } | |
| } | |

FIG. 37

| | Descriptor |
|---|---|
| volumetric_tiling_info( payloadSize ) { | |
|     vti_cancel_flag | u(1) |
|     if (!vti_cancel_flag) { | |
|         vti_object_label_present_flag | u(1) |
|         vti_3d_bounding_box_present_flag | u(1) |
|         vti_object_priority_present_flag | u(1) |
|         vti_object_hidden_present_flag | u(1) |
|         vti_object_collision_shape_present_flag | u(1) |
|         vti_object_dependency_present_flag | u(1) |
|         if( vti_object_label_present_flag ) | |
|             volumetric_tiling_info_labels( ) | |
|         if (vti_3d_bounding_box_present_flag) { | |
|             vti_bounding_box_scale_log2 | u(5) |
|             vti_3d_bounding_box_scale_log2 | u(5) |
|             vti_3d_bounding_box_precision_minus8 | u(5) |
|         } | |
|         volumetric_tiling_info_objects( vti_object_label_present_flag, vti_3d_bounding_box_present_flag, vti_object_priority_present_flag, vti_object_hidden_present_flag, vti_object_collision_shape_present_flag, vti_object_dependency_present_flag ) | |
|     } | |
| } | |

FIG. 38

| | |
|---|---|
| volumetric_tiling_info_objects( vtiObjectLabelPresentFlag, vti3dBoundingBoxPresentFlag, vtiObjectPriorityPresentFlag, vtiObjectHiddenPresentFlag, , vtiObjectCollisionShapePresentFlag, vtiObjectDependencyPresentFlag ) { | |
| vti_num_object_updates | ue(v) |
| for( i = 0; i <= vti_num_object_updates; i++ ) { | |
| vti_object_idx[ i ] | ue(v) |
| vti_object_cancel_flag[ vti_object_idx[ i ] ] | u(1) |
| ObjectTracked[vti_object_idx[ i ]] = ! vti_object_cancel_flag[ vti_object_idx[ i ] ] | |
| if (!vti_object_cancel_flag[ vti_object_idx[ i ] ]) { | |
| vti_bounding_box_update_flag[ vti_object_idx[ i ] ] | u(1) |
| if( vti_bounding_box_update_flag[ vti_object_idx[ i ] ] ) { | |
| vti_bounding_box_top[ vti_object_idx[ i ] ] | u(v) |
| vti_bounding_box_left[ vti_object_idx[ i ] ] | u(v) |
| vti_bounding_box_width[ vti_object_idx[ i ] ] | u(v) |
| vti_bounding_box_height[ vti_object_idx[ i ] ] | u(v) |
| } | |
| if( vti3dBoundingBoxPresentFlag ) { | |
| vti_3d_bounding_box_update_flag[ vti_object_idx[ i ] ] | u(1) |
| if( vti_3d_bounding_box_update_flag[ vti_object_idx[ i ] ] ) { | |
| vti_3d_bounding_box_x[ vti_object_idx[ i ] ] | u(v) |
| vti_3d_bounding_box_y[ vti_object_idx[ i ] ] | u(v) |
| vti_3d_bounding_box_z[ vti_object_idx[ i ] ] | u(v) |
| vti_3d_bounding_box_delta_x[ vti_object_idx[ i ] ] | u(v) |
| vti_3d_bounding_box_delta_y[ vti_object_idx[ i ] ] | u(v) |
| vti_3d_bounding_box_delta_z[ vti_object_idx[ i ] ] | u(v) |
| } | |
| } | |
| if( vtiObjectPriorityPresentFlag ) { | |
| vti_object_priority_update_flag[ vti_object_idx[ i ] ] | u(1) |
| if( vti_object_priority_update_flag[ vti_object_idx[ i ] ] ) | |
| vti_object_priority_value[ vti_object_idx[ i ] ] | u(4) |
| } | |
| if( vtiObjectHiddenPresentFlag ) | |
| vti_object_hidden_flag[ vti_object_idx[ i ] ] | u(1) |
| if( vtiObjectLabelPresentFlag ) { | |
| vti_object_label_update_flag[ vti_object_idx[ i ] ] | u(1) |
| if( vti_object_label_update_flag[ vti_object_idx[ i ] ] ) | |
| vti_object_label_idx[ vti_object_idx[ i ] ] | ue(v) |
| } | |
| if( vtiObjectCollisionShapePresentFlag ) { | |
| vti_object_collision_shape_update_flag[ vti_object_idx[ i ] ] | u(1) |
| if (vti_object_collision_shape_update_flag[ vti_object_idx[ i ] ]) | |
| vti_object_collision_shape_id[ vti_object_idx[ i ] ] | u(16) |
| } | |
| if(vtiObjectDependencyPresentFlag ) { | |
| vti_object_dependency_update_flag[ vti_object_idx[ i ] ] | u(1) |
| if (vti_object_dependency_update_flag[ vti_object_idx[ i ] ]) { | |
| vti_object_num_dependencies[ vti_object_idx[ i ] ] | u(4) |
| for( j = 0; j < vti_object_num_dependencies[ vti_object_idx[ i ] ]; j++ ) | |
| vti_object_dependency_idx[ vti_object_idx[ i ] ][ j ] | u(8) |
| } | |
| } | |
| } | |
| } | |
| } | |

FIG. 39

| volumetric_tiling_info_labels( ) { | Descriptor |
|---|---|
|     vti_object_label_language_present_flag | u(1) |
|     if( vti_object_label_language_present_flag ) { | |
|     while( !byte_aligned( ) ) | |
|         vti_bit_equal_to_zero /* equal to 0 */ | f(1) |
|         vti_object_label_language | st(v) |
|     } | |
|     vti_num_object_label_updates | ue(v) |
|     for( i = 0; i < vti_num_object_label_updates ; i++ ) { | |
|         vti_label_idx[ i ] | ue(v) |
|         vti_label_cancel_flag | u(1) |
|         LabelAssigned[ vti_label_idx[ i] ] = !vti_label_cancel_flag | |
|         if ( !vti_label_cancel_flag) { | |
|             while( !byte_aligned( ) ) | |
|             vti_bit_equal_to_zero /* equal to 0 */ | f(1) |
|             vti_label[ vti_label_idx[ i ] ] | st(v) |
|         } | |
|     } | |
| } | |

FIG. 44

```
aligned(8) class VPCC3DRegionMappingInfoStruct ( ) {
    unsigned int(16) num_3d_regions;
    for (i = 0; i < num_3d_regions; i++) {
        3DRegionInfoStruct(1);
        unsigned int(8) num_2d_regions[i];
        for (j =0; j< num_2d_regions[i]; j++) {
            2DRegionInfostruct(1);
        }
        unsigned int(8) num_track_groups[i];
        for (k=0 ; k <num_track_groups[i]; k++)
            unsigned int(32) track_group_id;
    }
}
```

FIG. 45

```
aligned(8) class VPCC3DRegionMappingBox extends FullBox('vpsr',0,0) {
    VPCC3DRegionMappingInfoStruct( ) ;
    unsigned int(8) num_2d_regions;
    for (j = 0; j < num_2d_regions; i++) {
        unsigned int(8) 2d_region_id;
        unsigned int(8) num_tiles[j];
        for (k=0; k< num_tiles[j]; k++)
            unsigned int(32) tile_id[k];
        unsigned int(8) num_tile_groups[j];
        for (k=0 ; k <num_groups[j]; k++)
            unsigned int(32) tile_group_id[m];
        unsigned int(8) num_track_groups[j];
        for (k=0 ; k <num_track_groups[j]; k++)
            unsigned int(32) track_group_id;

}
}
```

POINT CLOUD DATA TRANSMISSION DEVICE, POINT CLOUD DATA TRANSMISSION METHOD, POINT CLOUD DATA RECEPTION DEVICE, AND POINT CLOUD DATA RECEPTION METHOD

CROSS-REFERENCE TO RELATED APPLICATIONS

This application claims the benefit of priority to U.S. Provisional Application No. 62/959,755, filed on Jan. 10, 2020, which is hereby incorporated by reference as if fully set forth herein.

BACKGROUND

Field of the Invention

Embodiments provide a method for providing point cloud content to provide a user with various services such as virtual reality (VR), augmented reality (AR), mixed reality (MR), and autonomous driving services.

Discussion of the Related Art

A point cloud is a set of points in a three-dimensional (3D) space. It is difficult to generate point cloud data because the number of points in the 3D space is large.

A large throughput is required to transmit and receive data of a point cloud.

SUMMARY

An object of the present disclosure is to provide a point cloud data transmission device, a point cloud data transmission method, a point cloud data reception device, and a point cloud data reception method for efficiently transmitting and receiving a point cloud.

Another object of the present disclosure is to provide a point cloud data transmission device, a point cloud data transmission method, a point cloud data reception device, and a point cloud data reception method for addressing latency and encoding/decoding complexity.

Embodiments are not limited to the above-described objects, and the scope of the embodiments may be extended to other objects that can be inferred by those skilled in the art based on the entire contents of the present disclosure.

To achieve these objects and other advantages and in one aspect of the present disclosure, a method for transmitting point cloud data may include encoding point cloud data, encapsulating the point cloud data, and transmitting the point cloud data. In another aspect of the present disclosure, a device for receiving point cloud data may include a receiver configured to receive point cloud data, a decapsulator configured to decapsulate the point cloud data, and a decoder configured to decode the point cloud data.

A point cloud data transmission method, a point cloud data transmission device, a point cloud data reception method, and a point cloud data reception device according to embodiments may provide a good-quality point cloud service.

A point cloud data transmission method, a point cloud data transmission device, a point cloud data reception method, and a point cloud data reception device according to embodiments may achieve various video codec methods.

A point cloud data transmission method, a point cloud data transmission device, a point cloud data reception method, and a point cloud data reception device according to embodiments may provide universal point cloud content such as an autonomous driving service.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIG. 2 illustrates capture of point cloud data according to embodiments;

FIG. 27 shows a V-PCC unit and a V-PCC unit header according to embodiments;

FIG. 28 shows the payload of a V-PCC unit according to embodiments;

FIG. 29 shows a V-PCC parameter set according to embodiments;

FIG. 31 shows an atlas sequence parameter set according to embodiments;

FIG. 32 shows an atlas frame parameter set according to embodiments;

FIG. 33 shows atlas_frame_tile_information according to embodiments;

FIG. 34 shows supplemental enhancement information (SEI) according to embodiments;

FIG. 35 shows 3D bounding box SEI according to embodiments;

FIG. 36 shows a 3D region mapping information SEI message according to embodiments;

FIG. 37 shows volumetric tiling information according to embodiments;

FIG. 38 shows volumetric tiling information objects according to embodiments;

FIG. 39 shows volumetric tiling information labels according to embodiments;

FIG. 44 shows a structure of a 3D region mapping information according to embodiments;

FIG. 45 shows a structure of a 3D region mapping information according to embodiments;

DETAILED DESCRIPTION

Reference will now be made in detail to the preferred embodiments of the present disclosure, examples of which are illustrated in the accompanying drawings. The detailed description, which will be given below with reference to the accompanying drawings, is intended to explain exemplary embodiments of the present disclosure, rather than to show the only embodiments that can be implemented according to the present disclosure. The following detailed description includes specific details in order to provide a thorough understanding of the present disclosure. However, it will be apparent to those skilled in the art that the present disclosure may be practiced without such specific details.

Although most terms used in the present disclosure have been selected from general ones widely used in the art, some terms have been arbitrarily selected by the applicant and their meanings are explained in detail in the following description as needed. Thus, the present disclosure should be understood based upon the intended meanings of the terms rather than their simple names or meanings.

Figure 1:
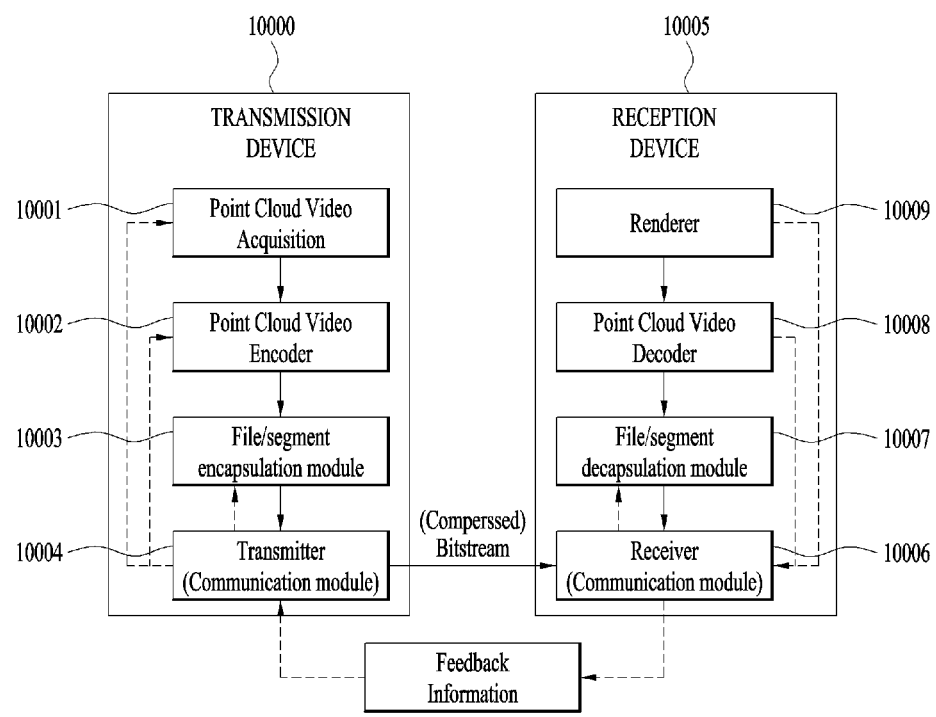
FIG. 1 illustrates an exemplary structure of a transmission/reception system for providing point cloud content according to embodiments.

FIG. 1 illustrates an exemplary structure of a transmission/reception system for providing point cloud content according to embodiments.

The present disclosure provides a method of providing point cloud content to provide a user with various services such as virtual reality (VR), augmented reality (AR), mixed reality (MR), and autonomous driving. The point cloud content according to the embodiments represent data representing objects as points, and may be referred to as a point cloud, point cloud data, point cloud video data, point cloud image data, or the like.

A point cloud data transmission device 10000 according to embodiment may include a point cloud video acquirer 10001, a point cloud video encoder 10002, a file/segment encapsulation module 10003, and/or a transmitter (or communication module) 10004. The transmission device according to the embodiments may secure and process point cloud video (or point cloud content) and transmit the same. According to embodiments, the transmission device may include a fixed station, a base transceiver system (BTS), a network, an artificial intelligence (AI) device and/or system, a robot, and an AR/VR/XR device and/or a server. According to embodiments, the transmission device 10000 may include a device robot, a vehicle, AR/VR/XR devices, a portable device, a home appliance, an Internet of Thing (IoT) device, and an AI device/server which are configured to perform communication with a base station and/or other wireless devices using a radio access technology (e.g., 5G New RAT (NR), Long Term Evolution (LTE)).

The point cloud video acquirer 10001 according to the embodiments acquires a point cloud video through a process of capturing, synthesizing, or generating a point cloud video.

The point cloud video encoder 10002 according to the embodiments encodes the point cloud video data. According to embodiments, the point cloud video encoder 10002 may be referred to as a point cloud encoder, a point cloud data encoder, an encoder, or the like. The point cloud compression coding (encoding) according to the embodiments is not limited to the above-described embodiment. The point cloud video encoder may output a bitstream containing the encoded point cloud video data. The bitstream may not only include encoded point cloud video data, but also include signaling information related to encoding of the point cloud video data.

The encoder according to the embodiments may support both the geometry-based point cloud compression (G-PCC) encoding scheme and/or the video-based point cloud compression (V-PCC) encoding scheme. In addition, the encoder may encode a point cloud (referring to either point cloud data or points) and/or signaling data related to the point cloud. The specific operation of encoding according to embodiments will be described below.

As used herein, the term V-PCC may stand for Video-based Point Cloud Compression (V-PCC). The term V-PCC may be the same as Visual Volumetric Video-based Coding (V3C). These terms may be complementarily used.

The file/segment encapsulation module 10003 according to the embodiments encapsulates the point cloud data in the form of a file and/or segment form. The point cloud data transmission method/device according to the embodiments may transmit the point cloud data in a file and/or segment form.

The transmitter (or communication module) 10004 according to the embodiments transmits the encoded point cloud video data in the form of a bitstream. According to embodiments, the file or segment may be transmitted to a reception device over a network, or stored in a digital storage medium (e.g., USB, SD, CD, DVD, Blu-ray, HDD, SSD, etc.). The transmitter according to the embodiments is capable of wired/wireless communication with the reception device (or the receiver) over a network of 4G, 5G, 6G, etc. In addition, the transmitter may perform necessary data processing operation according to the network system (e.g., a 4G, 5G or 6G communication network system). The transmission device may transmit the encapsulated data in an on-demand manner.

A point cloud data reception device 10005 according to the embodiments may include a receiver 10006, a file/segment decapsulation module 10007, a point cloud video decoder 10008, and/or a renderer 10009. According to embodiments, the reception device may include a device robot, a vehicle, AR/VR/XR devices, a portable device, a home appliance, an Internet of Thing (IoT) device, and an AI device/server which are configured to perform communication with a base station and/or other wireless devices using a radio access technology (e.g., 5G New RAT (NR), Long Term Evolution (LTE)).

The receiver 10006 according to the embodiments receives a bitstream containing point cloud video data. According to embodiments, the receiver 10006 may transmit feedback information to the point cloud data transmission device 10000.

The file/segment decapsulation module 10007 decapsulates a file and/or a segment containing point cloud data. The decapsulation module according to the embodiments may perform a reverse process of the encapsulation process according to the embodiments.

The point cloud video decoder 10007 decodes the received point cloud video data. The decoder according to the embodiments may perform a reverse process of encoding according to the embodiments.

The renderer 10009 renders the decoded point cloud video data. According to embodiments, the renderer 10009 may transmit the feedback information obtained at the reception side to the point cloud video decoder 10008. The point cloud video data according to the embodiments may carry feedback information to the receiver. According to embodiments, the feedback information received by the point cloud transmission device may be provided to the point cloud video encoder.

The arrows indicated by dotted lines in the drawing represent a transmission path of feedback information acquired by the reception device 10005. The feedback information is information for reflecting interactivity with a user who consumes point cloud content, and includes user information (e.g., head orientation information), viewport information, and the like). In particular, when the point cloud content is content for a service (e.g., autonomous driving service, etc.) that requires interaction with a user, the feedback information may be provided to the content transmitting side (e.g., the transmission device 10000) and/or the service provider. According to embodiments, the feedback information may be used in the reception device 10005 as well as the transmission device 10000, and may not be provided.

The head orientation information according to embodiments is information about a user's head position, orientation, angle, motion, and the like. The reception device 10005 according to the embodiments may calculate viewport information based on the head orientation information. The viewport information may be information about a region of the point cloud video that the user is viewing. A viewpoint is a point where a user is viewing a point cloud video, and may refer to a center point of the viewport region. That is, the viewport is a region centered on the viewpoint, and the size and shape of the region may be determined by a field of view (FOV). Accordingly, the reception device 10005 may extract the viewport information based on a vertical or horizontal FOV supported by the device in addition to the head orientation information. In addition, the reception device 10005 performs gaze analysis to check how the user consumes a point cloud, a region that the user gazes at in the point cloud video, a gaze time, and the like. According to embodiments, the reception device 10005 may transmit feedback information including the result of the gaze analysis to the transmission device 10000. The feedback information according to the embodiments may be acquired in the rendering and/or display process. The feedback information according to the embodiments may be secured by one or more sensors included in the reception device 10005. In addition, according to embodiments, the feedback information may be secured by the renderer 10009 or a separate external element (or device, component, etc.). The dotted lines in FIG. 1 represent a process of transmitting the feedback information secured by the renderer 10009. The point cloud content providing system may process (encode/decode) point cloud data based on the feedback information. Accordingly, the point cloud video data decoder 10008 may perform a decoding operation based on the feedback information. The reception device 10005 may transmit the feedback information to the transmission device. The transmission device (or the point cloud video data encoder 10002) may perform an encoding operation based on the feedback information. Accordingly, the point cloud content providing system may efficiently process necessary data (e.g., point cloud data corresponding to the user's head position) based on the feedback information rather than processing (encoding/decoding) all point cloud data, and provide point cloud content to the user.

According to embodiments, the transmission device 10000 may be called an encoder, a transmission device, a transmitter, or the like, and the reception device 10004 may be called a decoder, a reception device, a receiver, or the like.

The point cloud data processed in the point cloud content providing system of FIG. 1 according to embodiments (through a series of processes of acquisition/encoding/transmission/decoding/rendering) may be referred to as point cloud content data or point cloud video data. According to embodiments, the point cloud content data may be used as a concept covering metadata or signaling information related to point cloud data.

The elements of the point cloud content providing system illustrated in FIG. 1 may be implemented by hardware, software, a processor, and/or combinations thereof.

Embodiments may provide a method of providing point cloud content to provide a user with various services such as virtual reality (VR), augmented reality (AR), mixed reality (MR), and autonomous driving.

In order to provide a point cloud content service, a point cloud video may be acquired first. The acquired point cloud video may be transmitted through a series of processes, and the reception side may process the received data back into the original point cloud video and render the processed point cloud video. Thereby, the point cloud video may be provided to the user. Embodiments provide a method of effectively performing this series of processes.

The entire processes for providing a point cloud content service (the point cloud data transmission method and/or point cloud data reception method) may include an acquisition process, an encoding process, a transmission process, a decoding process, a rendering process, and/or a feedback process.

According to embodiments, the process of providing point cloud content (or point cloud data) may be referred to as a point cloud compression process. According to embodiments, the point cloud compression process may represent a geometry-based point cloud compression process.

Each element of the point cloud data transmission device and the point cloud data reception device according to the embodiments may be hardware, software, a processor, and/or a combination thereof.

In order to provide a point cloud content service, a point cloud video may be acquired. The acquired point cloud video is transmitted through a series of processes, and the reception side may process the received data back into the original point cloud video and render the processed point cloud video. Thereby, the point cloud video may be provided to the user. Embodiments provide a method of effectively performing this series of processes.

The entire processes for providing a point cloud content service may include an acquisition process, an encoding process, a transmission process, a decoding process, a rendering process, and/or a feedback process.

The point cloud compression system may include a transmission device and a reception device. The transmission device may output a bitstream by encoding a point cloud video, and deliver the same to the reception device through a digital storage medium or a network in the form of a file or a stream (streaming segment). The digital storage medium may include various storage media such as a USB, SD, CD, DVD, Blu-ray, HDD, and SSD.

The transmission device may include a point cloud video acquirer, a point cloud video encoder, a file/segment encapsulator, and a transmitter. The reception device may include a receiver, a file/segment decapsulator, a point cloud video decoder, and a renderer. The encoder may be referred to as a point cloud video/picture/picture/frame encoder, and the decoder may be referred to as a point cloud video/picture/picture/frame decoding device. The transmitter may be included in the point cloud video encoder. The receiver may be included in the point cloud video decoder. The renderer may include a display. The renderer and/or the display may be configured as separate devices or external components. The transmission device and the reception device may further include a separate internal or external module/unit/component for the feedback process.

According to embodiments, the operation of the reception device may be the reverse process of the operation of the transmission device.

The point cloud video acquirer may perform the process of acquiring point cloud video through a process of capturing, composing, or generating point cloud video. In the acquisition process, data of 3D positions (x, y, z)/attributes (color, reflectance, transparency, etc.) of multiple points, for example, a polygon file format (PLY) (or the Stanford Triangle format) file may be generated. For a video having multiple frames, one or more files may be acquired. During the capture process, point cloud related metadata (e.g., capture related metadata) may be generated.

A point cloud data transmission device according to embodiments may include an encoder configured to encode point cloud data, and a transmitter configured to transmit the point cloud data. The data may be transmitted in the form of a bitstream containing a point cloud.

A point cloud data reception device according to embodiments may include a receiver configured to receive point cloud data, a decoder configured to decode the point cloud data, and a renderer configured to render the point cloud data.

The method/device according to the embodiments represents the point cloud data transmission device and/or the point cloud data reception device.

FIG. 2 illustrates capture of point cloud data according to embodiments.

Point cloud data according to embodiments may be acquired by a camera or the like. A capturing technique according to embodiments may include, for example, inward-facing and/or outward-facing.

In the inward-facing according to the embodiments, one or more cameras inwardly facing an object of point cloud data may photograph the object from the outside of the object.

In the outward-facing according to the embodiments, one or more cameras outwardly facing an object of point cloud data may photograph the object. For example, according to embodiments, there may be four cameras.

The point cloud data or the point cloud content according to the embodiments may be a video or a still image of an object/environment represented in various types of 3D spaces. According to embodiments, the point cloud content may include video/audio/an image of an object.

For capture of point cloud content, a combination of camera equipment (a combination of an infrared pattern projector and an infrared camera) capable of acquiring depth and RGB cameras capable of extracting color information corresponding to the depth information may be configured. Alternatively, the depth information may be extracted through LiDAR, which uses a radar system that measures the location coordinates of a reflector by emitting a laser pulse and measuring the return time. A shape of the geometry consisting of points in a 3D space may be extracted from the depth information, and an attribute representing the color/reflectance of each point may be extracted from the RGB information. The point cloud content may include information about the positions (x, y, z) and color (YCbCr or RGB) or reflectance (r) of the points. For the point cloud content, the outward-facing technique of capturing an external environment and the inward-facing technique of capturing a central object may be used. In the VR/AR environment, when an object (e.g., a core object such as a character, a player, a thing, or an actor) is configured into point cloud content that may be viewed by the user in any direction (360 degrees), the configuration of the capture camera may be based on the inward-facing technique. When the current surrounding environment is configured into point cloud content in a mode of a vehicle, such as autonomous driving, the configuration of the capture camera may be based on the outward-facing technique. Because the point cloud content may be captured by multiple cameras, a camera calibration process may need to be performed before the content is captured to configure a global coordinate system for the cameras.

The point cloud content may be a video or still image of an object/environment presented in various types of 3D spaces.

Additionally, in the point cloud content acquisition method, any point cloud video may be composed based on the captured point cloud video. Alternatively, when a point cloud video for a computer-generated virtual space is to be provided, capturing with an actual camera may not be performed. In this case, the capture process may be replaced simply by a process of generating related data.

Post-processing may be needed for the captured point cloud video to improve the quality of the content. In the video capture process, the maximum/minimum depth may be adjusted within a range provided by the camera equipment. Even after the adjustment, point data of an unwanted area may still be present. Accordingly, post-processing of removing the unwanted area (e.g., the background) or recognizing a connected space and filling the spatial holes may be performed. In addition, point clouds extracted from the cameras sharing a spatial coordinate system may be integrated into one piece of content through the process of transforming each point into a global coordinate system based on the coordinates of the location of each camera acquired through a calibration process. Thereby, one piece of point cloud content having a wide range may be generated, or point cloud content with a high density of points may be acquired.

The point cloud video encoder may encode the input point cloud video into one or more video streams. One video may include a plurality of frames, each of which may correspond to a still image/picture. In this specification, a point cloud video may include a point cloud image/frame/picture/video/audio. In addition, the term "point cloud video" may be used interchangeably with a point cloud image/frame/picture. The point cloud video encoder may perform a video-based point cloud compression (V-PCC) procedure. The point cloud video encoder may perform a series of procedures such as prediction, transformation, quantization, and entropy coding for compression and encoding efficiency. The encoded data (encoded video/image information) may be output in the form of a bitstream. Based on the V-PCC procedure, the point cloud video encoder may encode point cloud video by dividing the same into a geometry video, an attribute video, an occupancy map video, and auxiliary information, which will be described later. The geometry video may include a geometry image, the attribute video may include an attribute image, and the occupancy map video may include an occupancy map image. The auxiliary information may include auxiliary patch information. The attribute video/image may include a texture video/image.

The encapsulation processor (file/segment encapsulation module) 1003 may encapsulate the encoded point cloud video data and/or metadata related to the point cloud video in the form of, for example, a file. Here, the metadata related to the point cloud video may be received from the metadata processor. The metadata processor may be included in the point cloud video encoder or may be configured as a separate component/module. The encapsulation processor may encapsulate the data in a file format such as ISOBMFF or process the same in the form of a DASH segment or the like. According to an embodiment, the encapsulation processor may include the point cloud video-related metadata in the file format. The point cloud video metadata may be included, for example, in boxes at various levels on the ISOBMFF file format or as data in a separate track within the file. According to an embodiment, the encapsulation processor may encapsulate the point cloud video-related metadata into a file. The transmission processor may perform processing for transmission on the point cloud video data encapsulated according to the file format. The transmission processor may be included in the transmitter or may be configured as a separate component/module. The transmission processor may process the point cloud video data according to a transmission protocol. The processing for transmission may include processing for delivery over a broadcast network and processing for delivery through a broadband. According to an embodiment, the transmission processor may receive point cloud video-related metadata from the metadata processor along with the point cloud video data, and perform processing of the point cloud video data for transmission.

The transmitter 1004 may transmit the encoded video/image information or data that is output in the form of a bitstream to the receiver of the reception device through a digital storage medium or a network in the form of a file or streaming. The digital storage medium may include various storage media such as USB, SD, CD, DVD, Blu-ray, HDD, and SSD. The transmitter may include an element for generating a media file in a predetermined file format, and may include an element for transmission over a broadcast/communication network. The receiver may extract the bitstream and transmit the extracted bitstream to the decoding device.

The receiver 1003 may receive point cloud video data transmitted by the point cloud video transmission device according to the present disclosure. Depending on the transmission channel, the receiver may receive the point cloud video data over a broadcast network or through a broadband. Alternatively, the point cloud video data may be received through a digital storage medium.

The reception processor may process the received point cloud video data according to the transmission protocol. The reception processor may be included in the receiver or may be configured as a separate component/module. The reception processor may reversely perform the above-described process of the transmission processor such that the processing corresponds to the processing for transmission performed at the transmission side. The reception processor may deliver the acquired point cloud video data to the decapsulation processor, and the acquired point cloud video-related metadata to the metadata parser. The point cloud video-related metadata acquired by the reception processor may take the form of a signaling table.

The decapsulation processor (file/segment decapsulation module) 10007 may decapsulate the point cloud video data received in the form of a file from the reception processor. The decapsulation processor may decapsulate the files according to ISOBMFF or the like, and may acquire a point cloud video bitstream or point cloud video-related metadata (a metadata bitstream). The acquired point cloud video bitstream may be delivered to the point cloud video decoder, and the acquired point cloud video-related metadata (metadata bitstream) may be delivered to the metadata processor. The point cloud video bitstream may include the metadata (metadata bitstream). The metadata processor may be included in the point cloud video decoder or may be configured as a separate component/module. The point cloud video-related metadata acquired by the decapsulation processor may take the form of a box or a track in the file format. The decapsulation processor may receive metadata necessary for decapsulation from the metadata processor, when necessary. The point cloud video-related metadata may be delivered to the point cloud video decoder and used in a point cloud video decoding procedure, or may be transferred to the renderer and used in a point cloud video rendering procedure.

The point cloud video decoder may receive the bitstream and decode the video/image by performing an operation corresponding to the operation of the point cloud video encoder. In this case, the point cloud video decoder may decode the point cloud video by dividing the same into a geometry video, an attribute video, an occupancy map video, and auxiliary information as described below. The geometry video may include a geometry image, and the attribute video may include an attribute image. The occupancy map video may include an occupancy map image. The auxiliary information may include auxiliary patch information. The attribute video/image may include a texture video/image.

The 3D geometry may be reconstructed based on the decoded geometry image, the occupancy map, and auxiliary patch information, and then may be subjected to a smoothing process. A color point cloud image/picture may be reconstructed by assigning color values to the smoothed 3D geometry based on the texture image. The renderer may render the reconstructed geometry and the color point cloud image/picture. The rendered video/image may be displayed through the display. The user may view all or part of the rendered result through a VR/AR display or a typical display.

The feedback process may include transferring various kinds of feedback information that may be acquired in the rendering/displaying process to the transmission side or to the decoder of the reception side. Interactivity may be provided through the feedback process in consuming point cloud video. According to an embodiment, head orientation information, viewport information indicating a region currently viewed by a user, and the like may be delivered to the transmission side in the feedback process. According to an embodiment, the user may interact with things implemented in the VR/AR/MR/autonomous driving environment. In this case, information related to the interaction may be delivered to the transmission side or a service provider during the feedback process. According to an embodiment, the feedback process may be skipped.

The head orientation information may represent information about the location, angle and motion of a user's head. On the basis of this information, information about a region of the point cloud video currently viewed by the user, that is, viewport information, may be calculated.

The viewport information may be information about a region of the point cloud video currently viewed by the user. Gaze analysis may be performed using the viewport information to check the way the user consumes the point cloud video, a region of the point cloud video at which the user gazes, and how long the user gazes at the region. The gaze analysis may be performed at the reception side and the result of the analysis may be delivered to the transmission side on a feedback channel. A device such as a VR/AR/MR display may extract a viewport region based on the location/direction of the user's head, vertical or horizontal FOV supported by the device, and the like.

According to an embodiment, the aforementioned feedback information may not only be delivered to the transmission side, but also be consumed at the reception side. That is, decoding and rendering processes at the reception side may be performed based on the aforementioned feedback information. For example, only the point cloud video for the region currently viewed by the user may be preferentially decoded and rendered based on the head orientation information and/or the viewport information.

Here, the viewport or viewport region may represent a region of the point cloud video currently viewed by the user. A viewpoint is a point which is viewed by the user in the point cloud video and may represent a center point of the viewport region. That is, a viewport is a region around a viewpoint, and the size and form of the region may be determined by the field of view (FOV).

The present disclosure relates to point cloud video compression as described above. For example, the methods/embodiments disclosed in the present disclosure may be applied to the point cloud compression or point cloud coding (PCC) standard of the moving picture experts group (MPEG) or the next generation video/image coding standard.

As used herein, a picture/frame may generally represent a unit representing one image in a specific time interval.

A pixel or a pel may be the smallest unit constituting one picture (or image). Also, "sample" may be used as a term corresponding to a pixel. A sample may generally represent a pixel or a pixel value. It may represent only a pixel/pixel value of a luma component, only a pixel/pixel value of a chroma component, or only a pixel/pixel value of a depth component.

A unit may represent a basic unit of image processing. The unit may include at least one of a specific region of the picture and information related to the region. The unit may be used interchangeably with term such as block or area in some cases. In a general case, an M×N block may include samples (or a sample array) or a set (or array) of transform coefficients configured in M columns and N rows.

Figure 3:
FIG. 3 illustrates an exemplary point cloud, geometry, and texture image according to embodiments.

FIG. 3 illustrates an example of a point cloud, a geometry image, and a texture image according to embodiments.

A point cloud according to the embodiments may be input to the V-PCC encoding process of FIG. 4, which will be described later, to generate a geometric image and a texture image. According to embodiments, a point cloud may have the same meaning as point cloud data.

As shown in the figure, the left part shows a point cloud, in which an object is positioned in a 3D space and may be represented by a bounding box or the like. The middle part shows the geometry, and the right part shows a texture image (non-padded image).

Video-based point cloud compression (V-PCC) according to embodiments may provide a method of compressing 3D point cloud data based on a 2D video codec such as HEVC or VVC. Data and information that may be generated in the V-PCC compression process are as follows:

Occupancy map: this is a binary map indicating whether there is data at a corresponding position in a 2D plane, using a value of 0 or 1 in dividing the points constituting a point cloud into patches and mapping the same to the 2D plane. The occupancy map may represent a 2D array corresponding to ATLAS, and the values of the occupancy map may indicate whether each sample position in the atlas corresponds to a 3D point.

An atlas is a collection of 2D bounding boxes positioned in a rectangular frame that correspond to a 3D bounding box in a 3D space in which volumetric data is rendered and information related thereto.

The atlas bitstream is a bitstream for one or more atlas frames constituting an atlas and related data.

The atlas frame is a 2D rectangular array of atlas samples onto which patches are projected.

An atlas sample is a position of a rectangular frame onto which patches associated with the atlas are projected.

An atlas frame may be partitioned into tiles. A tile is a unit in which a 2D frame is partitioned. That is, a tile is a unit for partitioning signaling information of point cloud data called an atlas.

Patch: A set of points constituting a point cloud, which indicates that points belonging to the same patch are adjacent to each other in 3D space and are mapped in the same direction among 6-face bounding box planes in the process of mapping to a 2D image.

A patch is a unit in which a tile partitioned. The patch is signaling information on the configuration of point cloud data.

The reception device according to the embodiments may restore attribute video data, geometry video data, and occupancy video data, which are actual video data having the same presentation time, based on an atlas (tile, patch).

Geometry image: this is an image in the form of a depth map that presents position information (geometry) about each point constituting a point cloud on a patch-by-patch basis. The geometry image may be composed of pixel values of one channel. Geometry represents a set of coordinates associated with a point cloud frame.

Texture image: this is an image representing the color information about each point constituting a point cloud on a patch-by-patch basis. A texture image may be composed of pixel values of a plurality of channels (e.g., three channels of R, G, and B). The texture is included in an attribute. According to embodiments, a texture and/or attribute may be interpreted as the same object and/or having an inclusive relationship.

Auxiliary patch info: this indicates metadata needed to reconstruct a point cloud with individual patches. Auxiliary patch info may include information about the position, size, and the like of a patch in a 2D/3D space.

Point cloud data according to the embodiments, for example, V-PCC components may include an atlas, an occupancy map, geometry, and attributes.

Atlas represents a set of 2D bounding boxes. It may be patches, for example, patches projected onto a rectangular frame. Atlas may correspond to a 3D bounding box in a 3D space, and may represent a subset of a point cloud.

An attribute may represent a scalar or vector associated with each point in the point cloud. For example, the attributes may include color, reflectance, surface normal, time stamps, material ID.

The point cloud data according to the embodiments represents PCC data according to video-based point cloud compression (V-PCC) scheme. The point cloud data may include a plurality of components. For example, it may include an occupancy map, a patch, geometry and/or texture.

Figure 4:
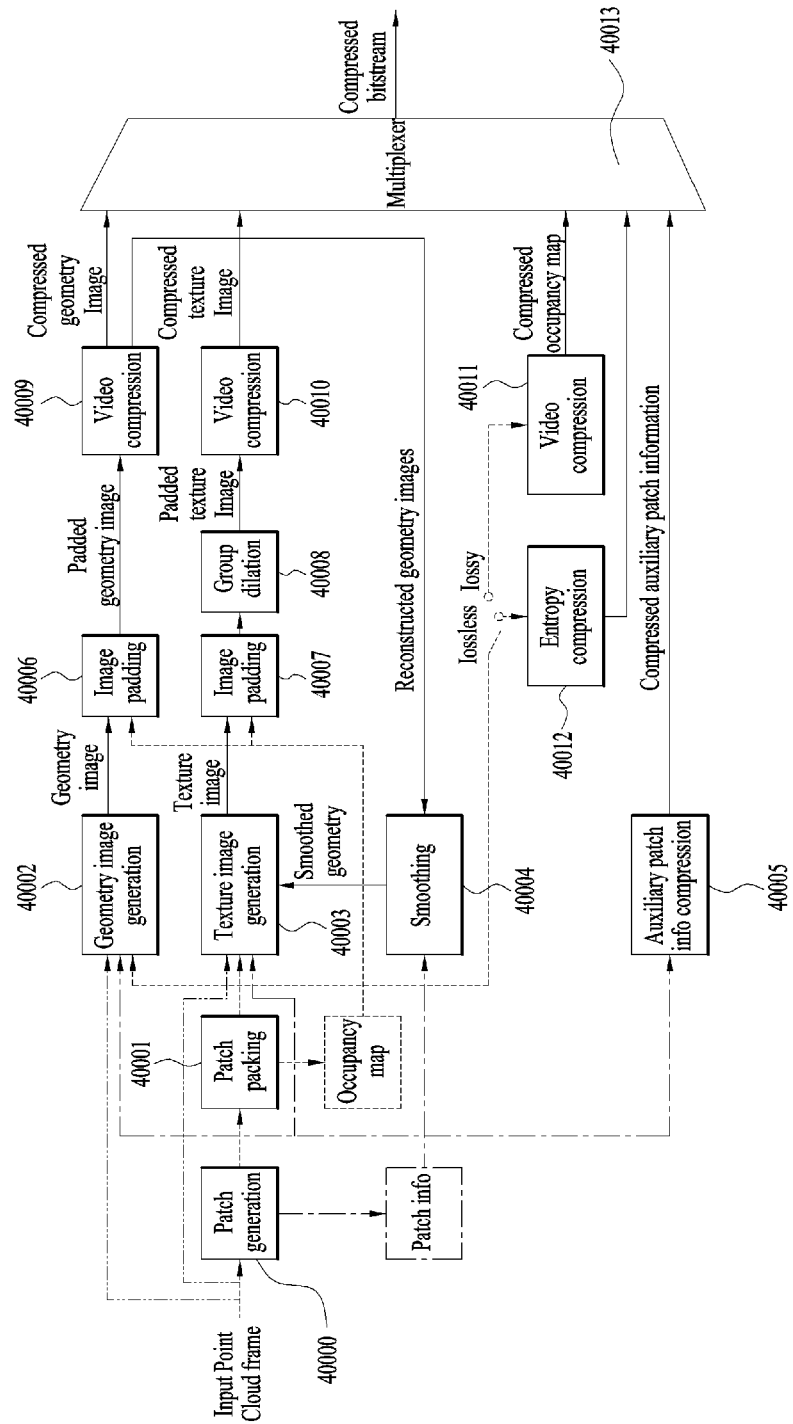
FIG. 4 illustrates an exemplary V-PCC encoding process according to embodiments.

FIG. 4 illustrates a V-PCC encoding process according to embodiments.

The figure illustrates a V-PCC encoding process for generating and compressing an occupancy map, a geometry image, a texture image, and auxiliary patch information. The V-PCC encoding process of FIG. 4 may be processed by the point cloud video encoder 10002 of FIG. 1. Each element of FIG. 4 may be performed by software, hardware, processor and/or a combination thereof.

The patch generation or patch generator 40000 receives a point cloud frame (which may be in the form of a bitstream containing point cloud data). The patch generator 40000 generates a patch from the point cloud data. In addition, patch information including information about patch generation is generated.

The patch packing or patch packer 40001 packs patches for point cloud data. For example, one or more patches may be packed. In addition, the patch packer generates an occupancy map containing information about patch packing.

The geometry image generation or geometry image generator 40002 generates a geometry image based on the point cloud data, patches, and/or packed patches. The geometry image refers to data containing geometry related to the point cloud data.

The texture image generation or texture image generator 40003 generates a texture image based on the point cloud data, patches, and/or packed patches. In addition, the texture image may be generated further based on smoothed geometry generated by smoothing processing of smoothing based on the patch information.

The smoothing or smoother 40004 may mitigate or eliminate errors contained in the image data. For example, based on the patched reconstructed geometry image, portions that may cause errors between data may be smoothly filtered out to generate smoothed geometry.

The auxiliary patch info compression or auxiliary patch info compressor 40005, auxiliary patch information related to the patch information generated in the patch generation is compressed. In addition, the compressed auxiliary patch information may be transmitted to the multiplexer. The auxiliary patch information may be used in the geometry image generation 40002.

The image padding or image padder 40006, 40007 may pad the geometry image and the texture image, respectively. The padding data may be padded to the geometry image and the texture image.

The group dilation or group dilator 40008 may add data to the texture image in a similar manner to image padding. The added data may be inserted into the texture image.

The video compression or video compressor 40009, 40010, 40011 may compress the padded geometry image, the padded texture image, and/or the occupancy map, respectively. The compression may encode geometry information, texture information, occupancy information, and the like.

The entropy compression or entropy compressor 40012 may compress (e.g., encode) the occupancy map based on an entropy scheme.

According to embodiments, the entropy compression and/or video compression may be performed, respectively depending on whether the point cloud data is lossless and/or lossy.

The multiplexer 40013 multiplexes the compressed geometry image, the compressed texture image, and the compressed occupancy map into a bitstream.

The specific operations in the respective processes of FIG. 4 are described below.

Patch Generation 40000

The patch generation process refers to a process of dividing a point cloud into patches, which are mapping units, in order to map the point cloud to the 2D image. The patch generation process may be divided into three steps: normal value calculation, segmentation, and patch segmentation.

The normal value calculation process will be described in detail with reference to FIG. 5.

Figure 5:
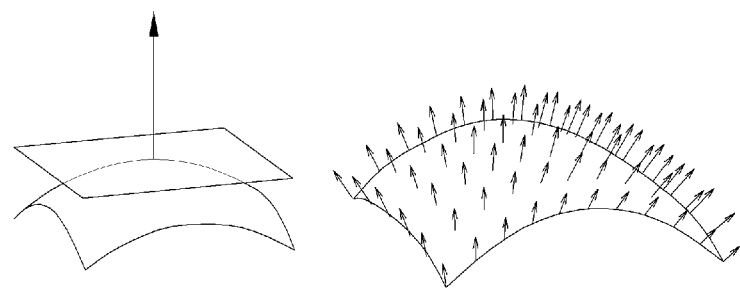
FIG. 5 illustrates an example of a tangent plane and a normal vector of a surface according to embodiments.

FIG. 5 illustrates an example of a tangent plane and a normal vector of a surface according to embodiments.

The surface of FIG. 5 is used in the patch generation process 40000 of the V-PCC encoding process of FIG. 4 as follows:

Normal calculation related to patch generation:

Each point of a point cloud has its own direction, which is represented by a 3D vector called a normal vector. Using the neighbors of each point obtained using a K-D tree or the like, a tangent plane and a normal vector of each point constituting the surface of the point cloud as shown in the figure may be obtained. The search range applied to the process of searching for neighbors may be defined by the user.

The tangent plane refers to a plane that passes through a point on the surface and completely includes a tangent line to the curve on the surface.

Figure 6:
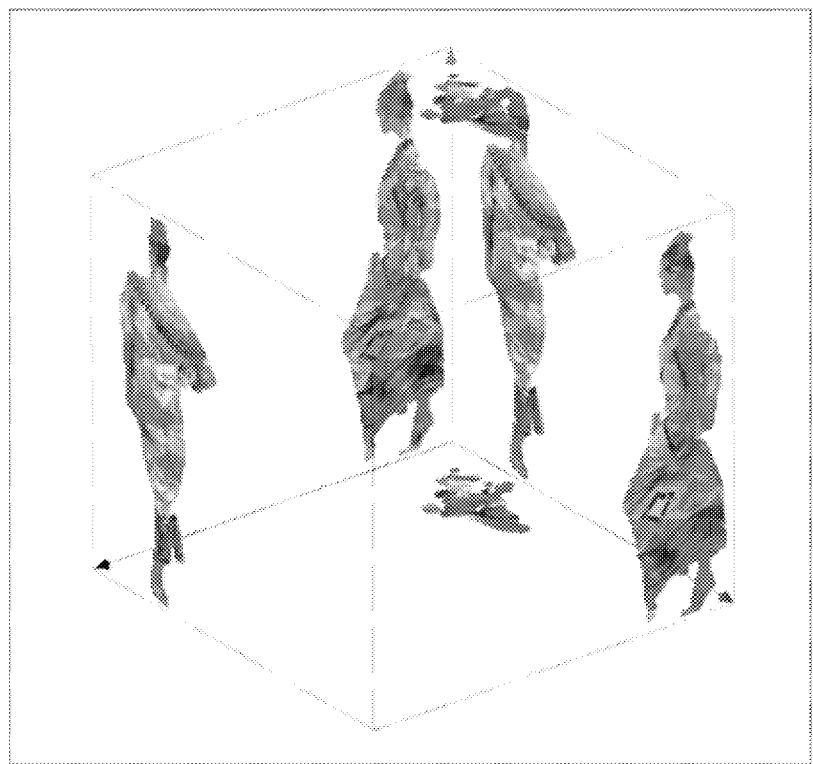
FIG. 6 illustrates an exemplary bounding box of a point cloud according to embodiments.

FIG. 6 illustrates an exemplary bounding box of a point cloud according to embodiments.

A method/device according to embodiments, for example, patch generation, may employ a bounding box in generating a patch from point cloud data.

The bounding box according to the embodiments refers to a box of a unit for dividing point cloud data based on a hexahedron in a 3D space.

The bounding box may be used in the process of projecting a target object of the point cloud data onto a plane of each planar face of a hexahedron in a 3D space. The bounding box may be generated and processed by the point cloud video acquirer 10000 and the point cloud video encoder 10002 of FIG. 1. Further, based on the bounding box, the patch generation 40000, patch packing 40001, geometry image generation 40002, and texture image generation 40003 of the V-PCC encoding process of FIG. 2 may be performed.

Segmentation Related to Patch Generation

Segmentation is divided into two processes: initial segmentation and refine segmentation.

The point cloud encoder 10002 according to the embodiments projects a point onto one face of a bounding box. Specifically, each point constituting a point cloud is projected onto one of the six faces of a bounding box surrounding the point cloud as shown in the figure. Initial segmentation is a process of determining one of the planar faces of the bounding box onto which each point is to be projected.

$\vec{n}_{P_{idx}}$, which is a normal value corresponding to each of the six planar faces, is defined as follows:

(1.0, 0.0, 0.0), (0.0, 1.0, 0.0), (0.0, 0.0, 1.0), (−1.0, 0.0, 0.0), (0.0, −1.0, 0.0), (0.0, 0.0, −1.0).

As shown in the equation below, a face that yields the maximum value of dot product of the normal vector $\vec{n}_{P_i}$ of each point, which is obtained in the normal value calculation process, and $\vec{n}_{P_{idx}}$ is determined as a projection plane of the corresponding point. That is, a plane whose normal vector is most similar to the direction of the normal vector of a point is determined as the projection plane of the point.

$$\max_{P_{idx}} \{\vec{n}_{P_i} \cdot \vec{n}_{P_{idx}}\}$$

The determined plane may be identified by one cluster index, which is one of 0 to 5.

Refine segmentation is a process of enhancing the projection plane of each point constituting the point cloud determined in the initial segmentation process in consideration of the projection planes of neighboring points. In this process, a score normal, which represents the degree of similarity between the normal vector of each point and the normal of each planar face of the bounding box which are considered in determining the projection plane in the initial segmentation process, and score smooth, which indicates the degree of similarity between the projection plane of the current point and the projection planes of neighboring points, may be considered together.

Score smooth may be considered by assigning a weight to the score normal. In this case, the weight value may be defined by the user. The refine segmentation may be performed repeatedly, and the number of repetitions may also be defined by the user.

Patch Segmentation Related to Patch Generation

Patch segmentation is a process of dividing the entire point cloud into patches, which are sets of neighboring points, based on the projection plane information about each point constituting the point cloud obtained in the initial/refine segmentation process. The patch segmentation may include the following steps:

1) Calculate neighboring points of each point constituting the point cloud, using the K-D tree or the like. The maximum number of neighbors may be defined by the user;

2) When the neighboring points are projected onto the same plane as the current point (when they have the same cluster index), extract the current point and the neighboring points as one patch;

3) Calculate geometry values of the extracted patch. The details are described below; and 4) Repeat operations 2) to 4) until there is no unextracted point.

The occupancy map, geometry image and texture image for each patch as well as the size of each patch are determined through the patch segmentation process.

Figure 7:
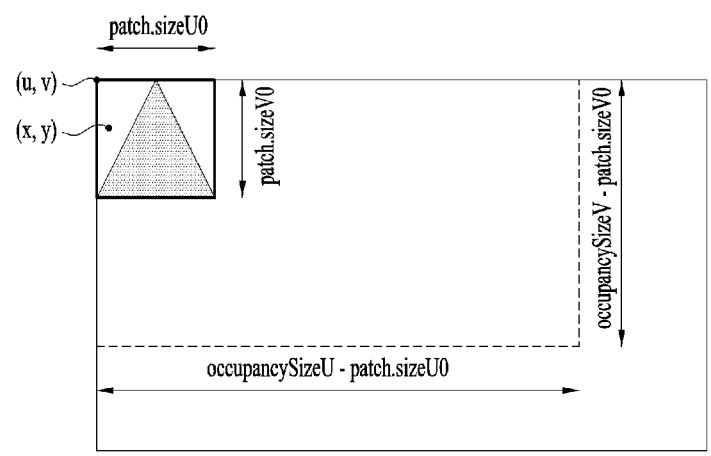
FIG. 7 illustrates an example of determination of individual patch positions on an occupancy map according to embodiments.

FIG. 7 illustrates an example of determination of individual patch positions on an occupancy map according to embodiments.

The point cloud encoder 10002 according to the embodiments may perform patch packing and generate an occupancy map.

Patch Packing & Occupancy Map Generation (40001)

This is a process of determining the positions of individual patches in a 2D image to map the segmented patches to the 2D image. The occupancy map, which is a kind of 2D image, is a binary map that indicates whether there is data at a corresponding position, using a value of 0 or 1. The occupancy map is composed of blocks and the resolution thereof may be determined by the size of the block. For example, when the block is 1*1 block, a pixel-level resolution is obtained. The occupancy packing block size may be determined by the user.

The process of determining the positions of individual patches on the occupancy map may be configured as follows:

1) Set all positions on the occupancy map to 0;

2) Place a patch at a point (u, v) having a horizontal coordinate within the range of (0, occupancySizeU-patch.sizeU0) and a vertical coordinate within the range of (0, occupancySizeV-patch.sizeV0) in the occupancy map plane;

3) Set a point (x, y) having a horizontal coordinate within the range of (0, patch.sizeU0) and a vertical coordinate within the range of (0, patch.sizeV0) in the patch plane as a current point;

4) Change the position of point (x, y) in raster order and repeat operations 3) and 4) if the value of coordinate (x, y) on the patch occupancy map is 1 (there is data at the point in the patch) and the value of coordinate (u+x, v+y) on the global occupancy map is 1 (the occupancy map is filled with the previous patch). Otherwise, proceed to operation 6);

5) Change the position of (u, v) in raster order and repeat operations 3) to 5);

6) Determine (u, v) as the position of the patch and copy the occupancy map data about the patch onto the corresponding portion on the global occupancy map; and 7) Repeat operations 2) to 7) for the next patch.

occupancySizeU: indicates the width of the occupancy map. The unit thereof is occupancy packing block size.

occupancySizeV: indicates the height of the occupancy map. The unit thereof is occupancy packing block size.

patch.sizeU0: indicates the width of the occupancy map. The unit thereof is occupancy packing block size.

patch.sizeV0: indicates the height of the occupancy map. The unit thereof is occupancy packing block size.

For example, as shown in FIG. 7, there is a box corresponding to a patch having a patch size in a box corresponding to an occupancy packing size block, and a point (x, y) may be located in the box.

Figure 8:
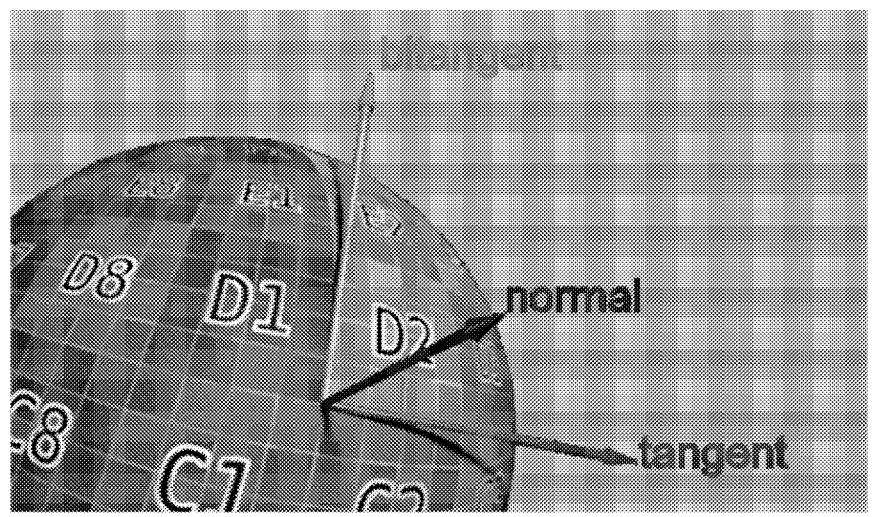
FIG. 8 shows an exemplary relationship among normal, tangent, and bitangent axes according to embodiments.

FIG. 8 shows an exemplary relationship among normal, tangent, and bitangent axes according to embodiments.

The point cloud encoder 10002 according to embodiments may generate a geometry image. The geometry image refers to image data including geometry information about a point cloud. The geometry image generation process may employ three axes (normal, tangent, and bitangent) of a patch in FIG. 8.

Geometry Image Generation (40002)

In this process, the depth values constituting the geometry images of individual patches are determined, and the entire geometry image is generated based on the positions of the patches determined in the patch packing process described above. The process of determining the depth values constituting the geometry images of individual patches may be configured as follows.

1) Calculate parameters related to the position and size of an individual patch. The parameters may include the following information.

A normal index indicating the normal axis is obtained in the previous patch generation process. The tangent axis is an axis coincident with the horizontal axis u of the patch image among the axes perpendicular to the normal axis, and the bitangent axis is an axis coincident with the vertical axis v of the patch image among the axes perpendicular to the normal axis. The three axes may be expressed as shown in the figure.

Figure 9:
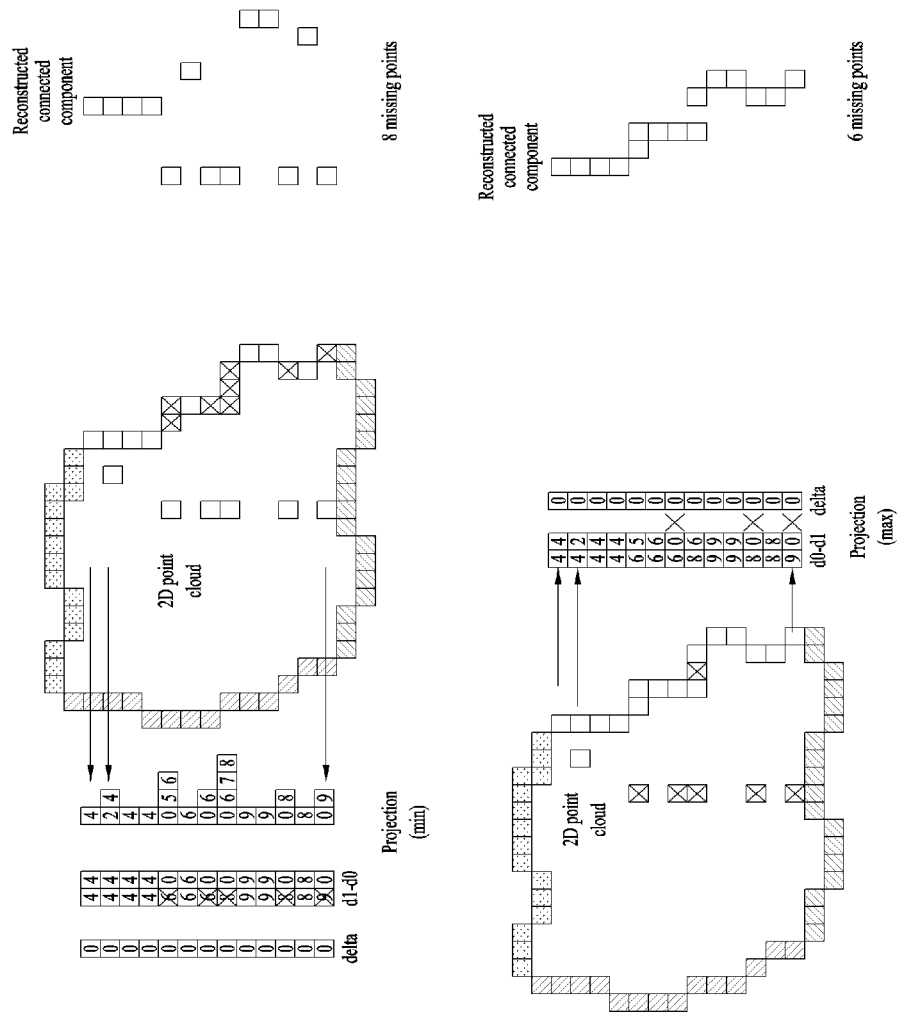
FIG. 9 shows an exemplary configuration of the minimum mode and maximum mode of a projection mode according to embodiments.

FIG. 9 shows an exemplary configuration of the minimum mode and maximum mode of a projection mode according to embodiments.

The point cloud encoder 10002 according to embodiments may perform patch-based projection to generate a geometry image, and the projection mode according to the embodiments includes a minimum mode and a maximum mode.

3D spatial coordinates of a patch may be calculated based on the bounding box of the minimum size surrounding the patch. For example, the 3D spatial coordinates may include the minimum tangent value of the patch (on the patch 3d shift tangent axis) of the patch, the minimum bitangent value of the patch (on the patch 3d shift bitangent axis), and the minimum normal value of the patch (on the patch 3d shift normal axis).

2D size of a patch indicates the horizontal and vertical sizes of the patch when the patch is packed into a 2D image. The horizontal size (patch 2d size u) may be obtained as a difference between the maximum and minimum tangent values of the bounding box, and the vertical size (patch 2d size v) may be obtained as a difference between the maximum and minimum bitangent values of the bounding box.

2) Determine a projection mode of the patch. The projection mode may be either the min mode or the max mode. The geometry information about the patch is expressed with a depth value. When each point constituting the patch is projected in the normal direction of the patch, two layers of images, an image constructed with the maximum depth value and an image constructed with the minimum depth value, may be generated.

In the min mode, in generating the two layers of images d0 and d1, the minimum depth may be configured for d0, and the maximum depth within the surface thickness from the minimum depth may be configured for d1, as shown in the figure.

For example, when a point cloud is located in 2D as illustrated in the figure, there may be a plurality of patches including a plurality of points. As shown in the figure, it is indicated that points marked with the same style of shadow may belong to the same patch. The figure illustrates the process of projecting a patch of points marked with blanks.

When projecting points marked with blanks to the left/right, the depth may be incremented by 1 as 0, 1, 2, . . . , 6, 7, 8, 9 with respect to the left side, and the number for calculating the depths of the points may be marked on the right side.

The same projection mode may be applied to all point clouds or different projection modes may be applied to respective frames or patches according to user definition. When different projection modes are applied to the respective frames or patches, a projection mode that may enhance compression efficiency or minimize missed points may be adaptively selected.

3) Calculate the depth values of the individual points.

In the min mode, image d0 is constructed with depth0, which is a value obtained by subtracting the minimum normal value of the patch (on the patch 3d shift normal axis) calculated in operation 1) from the minimum normal value of the patch (on the patch 3d shift normal axis) for the minimum normal value of each point. If there is another depth value within the range between depth0 and the surface thickness at the same position, this value is set to depth1. Otherwise, the value of depth0 is assigned to depth1. Image d1 is constructed with the value of depth1.

For example, a minimum value may be calculated in determining the depth of points of image d0 (4 2 4 4 0 6 0 0 9 9 0 8 0). In determining the depth of points of image d1, a greater value among two or more points may be calculated. When only one point is present, the value thereof may be calculated (4 4 4 4 6 6 6 8 9 9 8 8 9). In the process of encoding and reconstructing the points of the patch, some points may be lost (For example, in the figure, eight points are lost).

In the max mode, image d0 is constructed with depth0, which is a value obtained by subtracting the minimum normal value of the patch (on the patch 3d shift normal axis) calculated in operation 1) from the minimum normal value of the patch (on the patch 3d shift normal axis) for the maximum normal value of each point. If there is another depth value within the range between depth0 and the surface thickness at the same position, this value is set to depth1. Otherwise, the value of depth0 is assigned to depth1. Image d1 is constructed with the value of depth1.

For example, a maximum value may be calculated in determining the depth of points of d0 (4 4 4 4 6 6 6 8 9 9 8 8 9). In addition, in determining the depth of points of d1, a lower value among two or more points may be calculated. When only one point is present, the value thereof may be calculated (4 2 4 4 5 6 0 6 9 9 0 8 0). In the process of encoding and reconstructing the points of the patch, some points may be lost (For example, in the figure, six points are lost).

The entire geometry image may be generated by placing the geometry images of the individual patches generated through the above-described processes onto the entire geometry image based on the patch position information determined in the patch packing process.

Layer d1 of the generated entire geometry image may be encoded using various methods. A first method (absolute d1 method) is to encode the depth values of the previously generated image d1. A second method (differential method) is to encode a difference between the depth values of previously generated image d1 and the depth values of image d0.

In the encoding method using the depth values of the two layers, d0 and d1 as described above, if there is another point between the two depths, the geometry information about the point is lost in the encoding process, and therefore an enhanced-delta-depth (EDD) code may be used for lossless coding.

Hereinafter, the EDD code will be described in detail with reference to FIG. 10.

Figure 10:
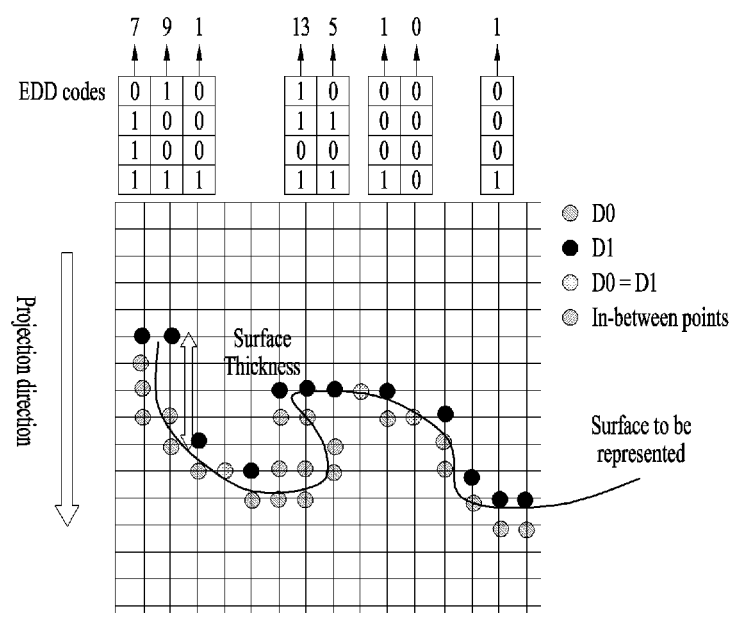
FIG. 10 illustrates an exemplary EDD code according to embodiments.

FIG. 10 illustrates an exemplary EDD code according to embodiments.

In some/all processes of the point cloud encoder 10002 and/or V-PCC encoding (e.g., video compression 40009), the geometry information about points may be encoded based on the EOD code.

As shown in the figure, the EDD code is used for binary encoding of the positions of all points within the range of surface thickness including d1. For example, in the figure, the points included in the second left column may be represented by an EDD code of 0b1001 (=9) because the points are present at the first and fourth positions over D0 and the second and third positions are empty. When the EDD code is encoded together with D0 and transmitted, a reception terminal may restore the geometry information about all points without loss.

For example, when there is a point present above a reference point, the value is 1. When there is no point, the value is 0. Thus, the code may be expressed based on 4 bits.

Smoothing (40004)

Smoothing is an operation for eliminating discontinuity that may occur on the patch boundary due to deterioration of the image quality occurring during the compression process. Smoothing may be performed by the point cloud encoder or smoother:

1) Reconstruct the point cloud from the geometry image. This operation may be the reverse of the geometry image generation described above. For example, the reverse process of encoding may be reconstructed;

2) Calculate neighboring points of each point constituting the reconstructed point cloud using the K-D tree or the like;

3) Determine whether each of the points is positioned on the patch boundary. For example, when there is a neighboring point having a different projection plane (cluster index) from the current point, it may be determined that the point is positioned on the patch boundary;

4) If there is a point present on the patch boundary, move the point to the center of mass of the neighboring points (positioned at the average x, y, z coordinates of the neighboring points). That is, change the geometry value. Otherwise, maintain the previous geometry value.

Figure 11:
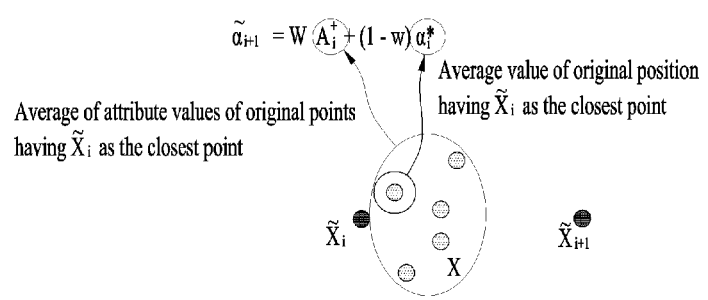
FIG. 11 illustrates an example of recoloring based on color values of neighboring points according to embodiments.

FIG. 11 illustrates an example of recoloring based on color values of neighboring points according to embodiments.

The point cloud encoder or the texture image generator 40003 according to the embodiments may generate a texture image based on recoloring.

Texture Image Generation (40003)

The texture image generation process, which is similar to the geometry image generation process described above, includes generating texture images of individual patches and generating an entire texture image by arranging the texture images at determined positions. However, in the operation of generating texture images of individual patches, an image with color values (e.g., R, G, and B values) of the points constituting a point cloud corresponding to a position is generated in place of the depth values for geometry generation.

In estimating a color value of each point constituting the point cloud, the geometry previously obtained through the smoothing process may be used. In the smoothed point cloud, the positions of some points may have been shifted from the original point cloud, and accordingly a recoloring process of finding colors suitable for the changed positions may be required. Recoloring may be performed using the color values of neighboring points. For example, as shown in the figure, a new color value may be calculated in consideration of the color value of the nearest neighboring point and the color values of the neighboring points.

For example, referring to the figure, in the recoloring, a suitable color value for a changed position may be calculated based on the average of the attribute information about the closest original points to a point and/or the average of the attribute information about the closest original positions to the point.

Texture images may also be generated in two layers of t0 and t1, like the geometry images, which are generated in two layers of d0 and d1.

Auxiliary Patch Info Compression (40005)

The point cloud encoder or the auxiliary patch info compressor according to the embodiments may compress the auxiliary patch information (auxiliary information about the point cloud).

The auxiliary patch info compressor compresses the auxiliary patch information generated in the patch generation, patch packing, and geometry generation processes described above. The auxiliary patch information may include the following parameters:

Index (cluster index) for identifying the projection plane (normal plane);

3D spatial position of a patch, i.e., the minimum tangent value of the patch (on the patch 3d shift tangent axis), the minimum bitangent value of the patch (on the patch 3d shift bitangent axis), and the minimum normal value of the patch (on the patch 3d shift normal axis);

2D spatial position and size of the patch, i.e., the horizontal size (patch 2d size u), the vertical size (patch 2d size v), the minimum horizontal value (patch 2d shift u), and the minimum vertical value (patch 2d shift u); and Mapping information about each block and patch, i.e., a candidate index (when patches are disposed in order based on the 2D spatial position and size information about the patches, multiple patches may be mapped to one block in an overlapping manner. In this case, the mapped patches constitute a candidate list, and the candidate index indicates the position in sequential order of a patch whose data is present in the block), and a local patch index (which is an index indicating one of the patches present in the frame). Table X shows a pseudo code representing the process of matching between blocks and patches based on the candidate list and the local patch indexes.

The maximum number of candidate lists may be defined by a user.

TABLE 1-1

Pseudo code for mapping a block to a patch

```
for( i = 0; i < BlockCount; i++ ) {
    if( candidatePatches[ i ].size( ) = = 1 ) {
        blockToPatch[ i ] = candidatePatches[ i ][ 0 ]
    } else {
        candidate_index
        if( candidate_index = = max_candidate_count ) {
            blockToPatch[ i ] = local_patch_index
        } else {
            blockToPatch[ i ] =
candidatePatches[ i ][ candidate_index ]
        }
    }
}
```

Figure 12:
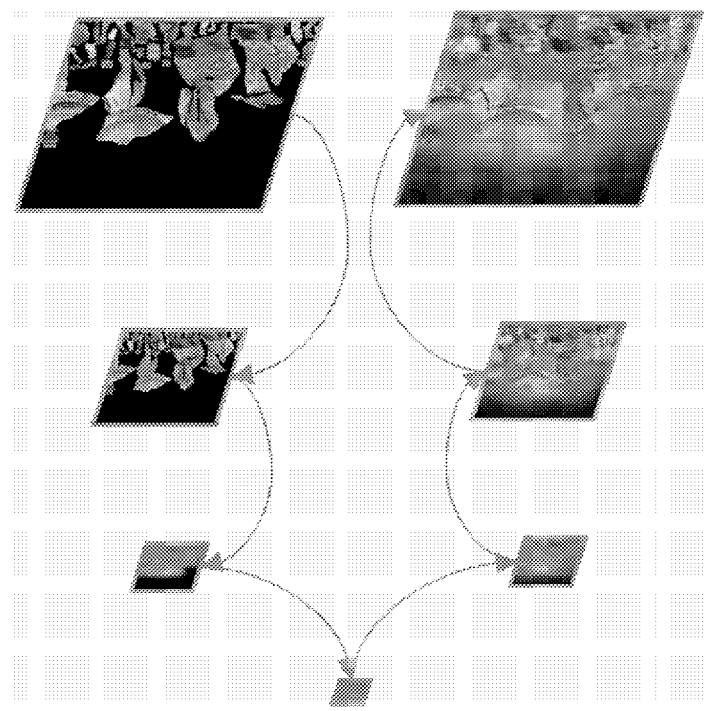
FIG. 12 illustrates an example of push-pull background filling according to embodiments.

FIG. 12 illustrates push-pull background filling according to embodiments.

Image Padding and Group Dilation (40006, 40007, 40008)

The image padder according to the embodiments may fill the space except the patch area with meaningless supplemental data based on the push-pull background filling technique.

Image padding is a process of filling the space other than the patch region with meaningless data to improve compression efficiency. For image padding, pixel values in columns or rows close to a boundary in the patch may be copied to fill the empty space. Alternatively, as shown in the figure, a push-pull background filling method may be used. According to this method, the empty space is filled with pixel values from a low resolution image in the process of gradually reducing the resolution of a non-padded image and increasing the resolution again.

Group dilation is a process of filling the empty spaces of a geometry image and a texture image configured in two layers, d0/d1 and t0/t1, respectively. In this process, the empty spaces of the two layers calculated through image padding are filled with the average of the values for the same position.

Figure 13:
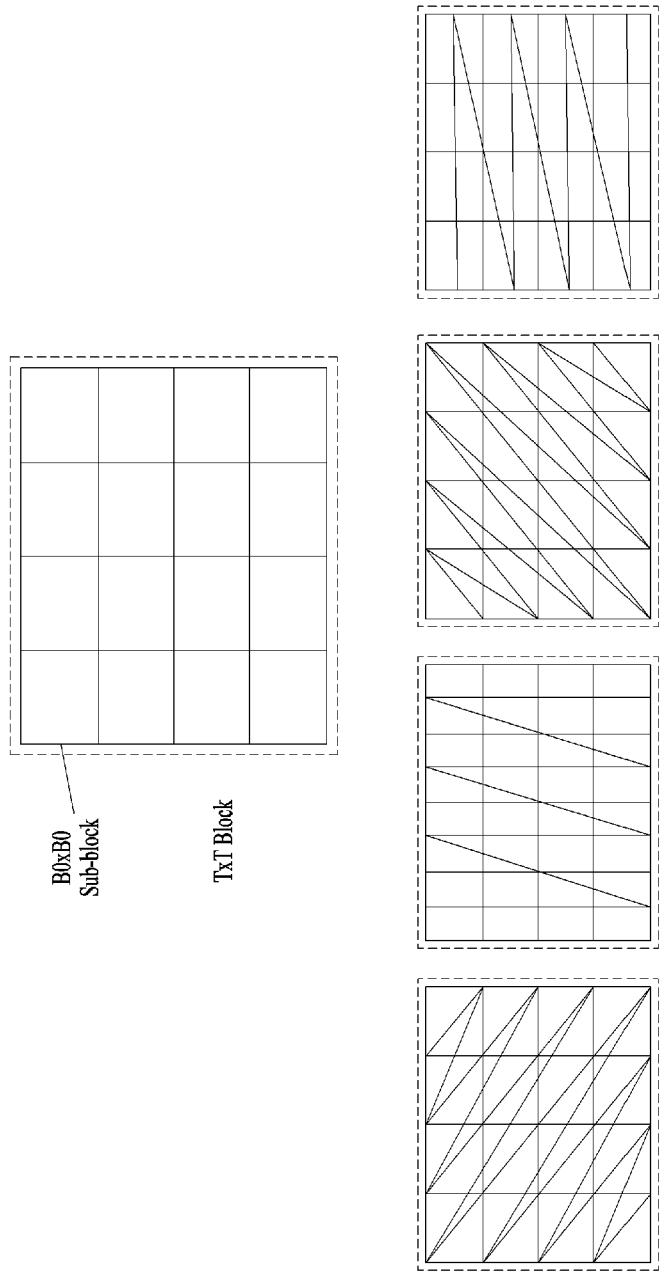
FIG. 13 shows an exemplary possible traversal order for a 4*4 block according to embodiments.

FIG. 13 shows an exemplary possible traversal order for a 4*4 block according to embodiments.

Occupancy Map Compression (40012, 40011)

The occupancy map compressor according to the embodiments may compress the previously generated occupancy map. Specifically, two methods, namely video compression for lossy compression and entropy compression for lossless compression, may be used. Video compression is described below.

The entropy compression may be performed through the following operations.

1) If a block constituting an occupancy map is fully occupied, encode 1 and repeat the same operation for the next block of the occupancy map. Otherwise, encode 0 and perform operations 2) to 5).

2) Determine the best traversal order to perform run-length coding on the occupied pixels of the block. The figure shows four possible traversal orders for a 4*4 block.

Figure 14:
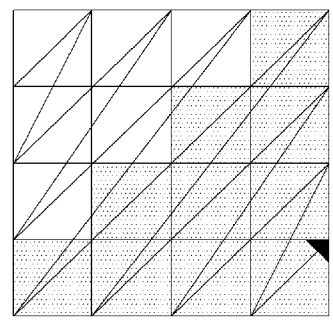
FIG. 14 illustrates an exemplary best traversal order according to embodiments.

FIG. 14 illustrates an exemplary best traversal order according to embodiments.

As described above, the entropy compressor according to the embodiments may code (encode) a block based on the traversal order scheme as described above.

For example, the best traversal order with the minimum number of runs is selected from among the possible traversal orders and the index thereof is encoded. The figure illustrates a case where the third traversal order in FIG. 13 is selected. In the illustrated case, the number of runs may be minimized to 2, and therefore the third traversal order may be selected as the best traversal order.

3) Encode the number of runs. In the example of FIG. 14, there are two runs, and therefore 2 is encoded.

4) Encode the occupancy of the first run. In the example of FIG. 14, 0 is encoded because the first run corresponds to unoccupied pixels.

5) Encode lengths of the individual runs (as many as the number of runs). In the example of FIG. 14, the lengths of the first run and the second run, 6 and 10, are sequentially encoded.

Video Compression (40009, 40010, 40011)

The video compressor according to the embodiments encodes a sequence of a geometry image, a texture image, an occupancy map image, and the like generated in the above-described operations, using a 2D video codec such as HEVC or VVC.

Figure 15:
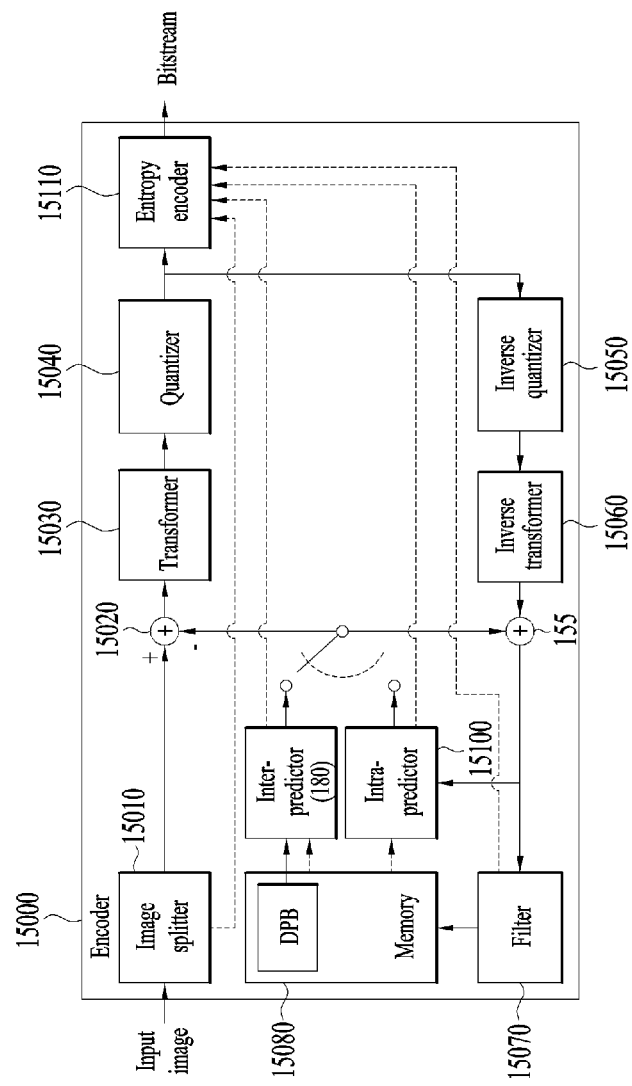
FIG. 15 illustrates an exemplary 2D video/image encoder according to embodiments.

FIG. 15 illustrates an exemplary 2D video/image encoder according to embodiments.

The figure, which represents an embodiment to which the video compression or video compressor 40009, 40010, and 40011 described above is applied, is a schematic block diagram of a 2D video/image encoder 15000 configured to encode a video/image signal. The 2D video/image encoder 15000 may be included in the point cloud video encoder described above or may be configured as an internal/external component. Each component of FIG. 15 may correspond to software, hardware, processor and/or a combination thereof.

Here, the input image may include the geometry image, the texture image (attribute(s) image), and the occupancy map image described above. The output bitstream (i.e., the point cloud video/image bitstream) of the point cloud video encoder may include output bitstreams for the respective input images (i.e., the geometry image, the texture image (attribute(s) image), the occupancy map image, etc.).

An inter-predictor 15090 and an intra-predictor 15100 may be collectively called a predictor. That is, the predictor may include the inter-predictor 15090 and the intra-predictor 15100. A transformer 15030, a quantizer 15040, an inverse quantizer 15050, and an inverse transformer 15060 may be included in the residual processor. The residual processor may further include a subtractor 15020. According to an embodiment, the image splitter 15010, the subtractor 15020, the transformer 15030, the quantizer 15040, the inverse quantizer 15050, the inverse transformer 15060, the adder 155, the filter 15070, the inter-predictor 15090, the intra-predictor 15100, and the entropy encoder 15110 described above may be configured by one hardware component (e.g., an encoder or a processor). In addition, the memory 15080 may include a decoded picture buffer (DPB) and may be configured by a digital storage medium.

The image splitter 15010 may spit an image (or a picture or a frame) input to the encoder 15000 into one or more processing units. For example, the processing unit may be called a coding unit (CU). In this case, the CU may be recursively split from a coding tree unit (CTU) or a largest coding unit (LCU) according to a quad-tree binary-tree (QTBT) structure. For example, one CU may be split into a plurality of CUs of a lower depth based on a quad-tree structure and/or a binary-tree structure. In this case, for example, the quad-tree structure may be applied first and the binary-tree structure may be applied later. Alternatively, the binary-tree structure may be applied first. The coding procedure according to the present disclosure may be performed based on a final CU that is not split anymore. In this case, the LCU may be used as the final CU based on coding efficiency according to characteristics of the image. When necessary, a CU may be recursively split into CUs of a lower depth, and a CU of the optimum size may be used as the final CU. Here, the coding procedure may include prediction, transformation, and reconstruction, which will be described later. As another example, the processing unit may further include a prediction unit (PU) or a transform unit (TU). In this case, the PU and the TU may be split or partitioned from the aforementioned final CU. The PU may be a unit of sample prediction, and the TU may be a unit for deriving a transform coefficient and/or a unit for deriving a residual signal from the transform coefficient.

The term "unit" may be used interchangeably with terms such as block or area. In a general case, an M×N block may represent a set of samples or transform coefficients configured in M columns and N rows. A sample may generally represent a pixel or a value of a pixel, and may indicate only a pixel/pixel value of a luma component, or only a pixel/pixel value of a chroma component. "Sample" may be used as a term corresponding to a pixel or a pel in one picture (or image).

The encoder 15000 may generate a residual signal (residual block or residual sample array) by subtracting a prediction signal (predicted block or predicted sample array) output from the inter-predictor 15090 or the intra-predictor 15100 from an input image signal (original block or original sample array), and the generated residual signal is transmitted to the transformer 15030. In this case, as shown in the figure, the unit that subtracts the prediction signal (predicted block or predicted sample array) from the input image signal (original block or original sample array) in the encoder 15000 may be called a subtractor 15020. The predictor may perform prediction for a processing target block (hereinafter referred to as a current block) and generate a predicted block including prediction samples for the current block. The predictor may determine whether intra-prediction or inter-prediction is applied on a current block or CU basis. As will be described later in the description of each prediction mode, the predictor may generate various kinds of information about prediction, such as prediction mode information, and deliver the generated information to the entropy encoder 15110. The information about the prediction may be encoded and output in the form of a bitstream by the entropy encoder 15110.

The intra-predictor 15100 may predict the current block with reference to the samples in the current picture. The samples may be positioned in the neighbor of or away from the current block depending on the prediction mode. In intra-prediction, the prediction modes may include a plurality of non-directional modes and a plurality of directional modes. The non-directional modes may include, for example, a DC mode and a planar mode. The directional modes may include, for example, 33 directional prediction modes or 65 directional prediction modes according to fineness of the prediction directions. However, this is merely an example, and more or fewer directional prediction modes may be used depending on the setting. The intra-predictor 15100 may determine a prediction mode to be applied to the current block, based on the prediction mode applied to the neighboring block.

The inter-predictor 15090 may derive a predicted block for the current block based on a reference block (reference sample array) specified by a motion vector on the reference picture. In this case, in order to reduce the amount of motion information transmitted in the inter-prediction mode, the motion information may be predicted on a per block, sub-block, or sample basis based on the correlation in motion information between the neighboring blocks and the current block. The motion information may include a motion vector and a reference picture index. The motion information may further include information about an inter-prediction direction (L0 prediction, L1 prediction, Bi prediction, etc.). In the case of inter-prediction, the neighboring blocks may include a spatial neighboring block, which is present in the current picture, and a temporal neighboring block, which is present in the reference picture. The reference picture including the reference block may be the same as or different from the reference picture including the temporal neighboring block. The temporal neighboring block may be referred to as a collocated reference block or a collocated CU (colCU), and the reference picture including the temporal neighboring block may be referred to as a collocated picture (colPic). For example, the inter-predictor 15090 may configure a motion information candidate list based on the neighboring blocks and generate information indicating a candidate to be used to derive a motion vector and/or a reference picture index of the current block. Inter-prediction may be performed based on various prediction modes. For example, in a skip mode and a merge mode, the inter-predictor 15090 may use motion information about a neighboring block as motion information about the current block. In the skip mode, unlike the merge mode, the residual signal may not be transmitted. In a motion vector prediction (MVP) mode, the motion vector of a neighboring block may be used as a motion vector predictor and the motion vector difference may be signaled to indicate the motion vector of the current block.

The prediction signal generated by the inter-predictor 15090 or the intra-predictor 15100 may be used to generate a reconstruction signal or to generate a residual signal.

The transformer 15030 may generate transform coefficients by applying a transformation technique to the residual signal. For example, the transformation technique may include at least one of discrete cosine transform (DCT), discrete sine transform (DST), Karhunen-Loéve transform (KLT), graph-based transform (GBT), or conditionally non-linear transform (CNT). Here, the GBT refers to transformation obtained from a graph depicting the relationship between pixels. The CNT refers to transformation obtained based on a prediction signal generated based on all previously reconstructed pixels. In addition, the transformation operation may be applied to pixel blocks having the same size of a square, or may be applied to blocks of a variable size other than the square.

The quantizer 15040 may quantize the transform coefficients and transmit the same to the entropy encoder 15110. The entropy encoder 15110 may encode the quantized signal (information about the quantized transform coefficients) and output a bitstream of the encoded signal. The information about the quantized transform coefficients may be referred to as residual information. The quantizer 15040 may rearrange the quantized transform coefficients, which are in a block form, in the form of a one-dimensional vector based on a coefficient scan order, and generate information about the quantized transform coefficients based on the quantized transform coefficients in the form of the one-dimensional vector. The entropy encoder 15110 may employ various encoding techniques such as, for example, exponential Golomb, context-adaptive variable length coding (CAVLC), and context-adaptive binary arithmetic coding (CABAC). The entropy encoder 15110 may encode information necessary for video/image reconstruction (e.g., values of syntax elements) together with or separately from the quantized transform coefficients. The encoded information (e.g., encoded video/image information) may be transmitted or stored in the form of a bitstream on a network abstraction layer (NAL) unit basis. The bitstream may be transmitted over a network or may be stored in a digital storage medium. Here, the network may include a broadcast network and/or a communication network, and the digital storage medium may include various storage media such as USB, SD, CD, DVD, Blu-ray, HDD, and SSD. A transmitter (not shown) to transmit the signal output from the entropy encoder 15110 and/or a storage (not shown) to store the signal may be configured as internal/external elements of the encoder 15000. Alternatively, the transmitter may be included in the entropy encoder 15110.

The quantized transform coefficients output from the quantizer 15040 may be used to generate a prediction signal. For example, inverse quantization and inverse transform may be applied to the quantized transform coefficients through the inverse quantizer 15050 and the inverse transformer 15060 to reconstruct the residual signal (residual block or residual samples). The adder 155 may add the reconstructed residual signal to the prediction signal output from the inter-predictor 15090 or the intra-predictor 15100. Thereby, a reconstructed signal (reconstructed picture, reconstructed block, reconstructed sample array) may be generated. When there is no residual signal for a processing target block as in the case where the skip mode is applied, the predicted block may be used as the reconstructed block. The adder 155 may be called a reconstructor or a reconstructed block generator. The generated reconstructed signal may be used for intra-prediction of the next processing target block in the current picture, or may be used for inter-prediction of the next picture through filtering as described below.

The filter 15070 may improve subjective/objective image quality by applying filtering to the reconstructed signal. For example, the filter 15070 may generate a modified reconstructed picture by applying various filtering techniques to the reconstructed picture, and the modified reconstructed picture may be stored in the memory 15080, specifically, the DPB of the memory 15080. The various filtering techniques may include, for example, deblocking filtering, sample adaptive offset, adaptive loop filtering, and bilateral filtering. As described below in the description of the filtering techniques, the filter 15070 may generate various kinds of information about filtering and deliver the generated information to the entropy encoder 15110. The information about filtering may be encoded and output in the form of a bitstream by the entropy encoder 15110.

The modified reconstructed picture transmitted to the memory 15080 may be used as a reference picture by the inter-predictor 15090. Thus, when inter-prediction is applied, the encoder may avoid prediction mismatch between the encoder 15000 and the decoder and improve encoding efficiency.

The DPB of the memory 15080 may store the modified reconstructed picture so as to be used as a reference picture by the inter-predictor 15090. The memory 15080 may store the motion information about a block from which the motion information in the current picture is derived (or encoded) and/or the motion information about the blocks in a picture that has already been reconstructed. The stored motion information may be delivered to the inter-predictor 15090 so as to be used as motion information about a spatial neighboring block or motion information about a temporal neighboring block. The memory 15080 may store the reconstructed samples of the reconstructed blocks in the current picture and deliver the reconstructed samples to the intra-predictor 15100.

At least one of the prediction, transform, and quantization procedures described above may be skipped. For example, for a block to which the pulse coding mode (PCM) is applied, the prediction, transform, and quantization procedures may be skipped, and the value of the original sample may be encoded and output in the form of a bitstream.

Figure 16:
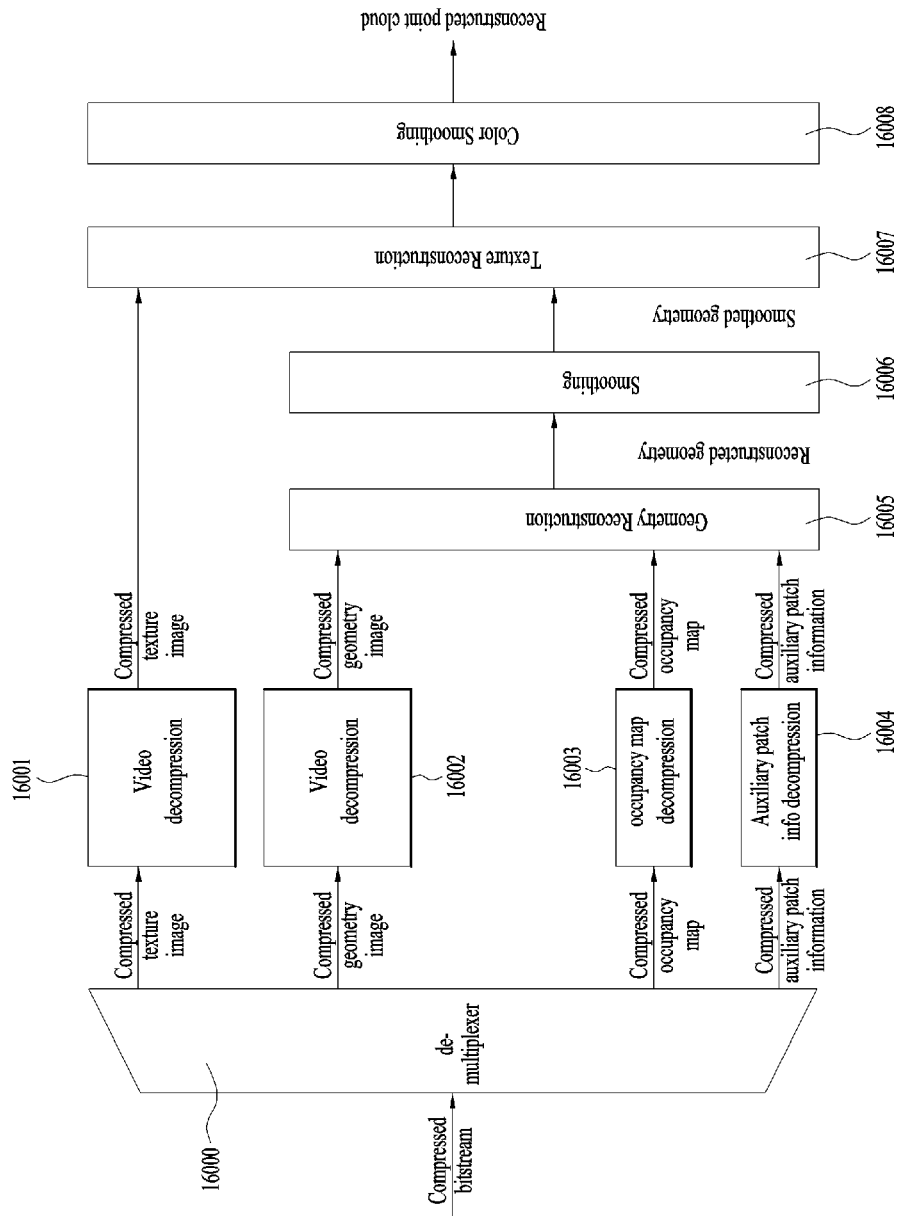
FIG. 16 illustrates an exemplary V-PCC decoding process according to embodiments.

FIG. 16 illustrates an exemplary V-PCC decoding process according to embodiments.

The V-PCC decoding process or V-PCC decoder may follow the reverse process of the V-PCC encoding process (or encoder) of FIG. 4. Each component in FIG. 16 may correspond to software, hardware, a processor, and/or a combination thereof.

The demultiplexer 16000 demultiplexes the compressed bitstream to output a compressed texture image, a compressed geometry image, a compressed occupancy map, and compressed auxiliary patch information.

The video decompression or video decompressor 16001, 16002 decompresses (or decodes) each of the compressed texture image and the compressed geometry image.

The occupancy map decompression or occupancy map decompressor 16003 decompresses the compressed occupancy map.

The auxiliary patch info decompression or auxiliary patch info decompressor 16004 decompresses auxiliary patch information.

The geometry reconstruction or geometry reconstructor 16005 restores (reconstructs) the geometry information based on the decompressed geometry image, the decompressed occupancy map, and/or the decompressed auxiliary patch information. For example, the geometry changed in the encoding process may be reconstructed.

The smoothing or smoother 16006 may apply smoothing to the reconstructed geometry. For example, smoothing filtering may be applied.

The texture reconstruction or texture reconstructor 16007 reconstructs the texture from the decompressed texture image and/or the smoothed geometry.

The color smoothing or color smoother 16008 smoothes color values from the reconstructed texture. For example, smoothing filtering may be applied.

As a result, reconstructed point cloud data may be generated.

The figure illustrates a decoding process of the V-PCC for reconstructing a point cloud by decoding the compressed occupancy map, geometry image, texture image, and auxiliary path information. Each process according to the embodiments is operated as follows.

Video Decompression (1600, 16002)

Video decompression is a reverse process of the video compression described above. In video decompression, a 2D video codec such as HEVC or VVC is used to decode a compressed bitstream containing the geometry image, texture image, and occupancy map image generated in the above-described process.

Figure 17:
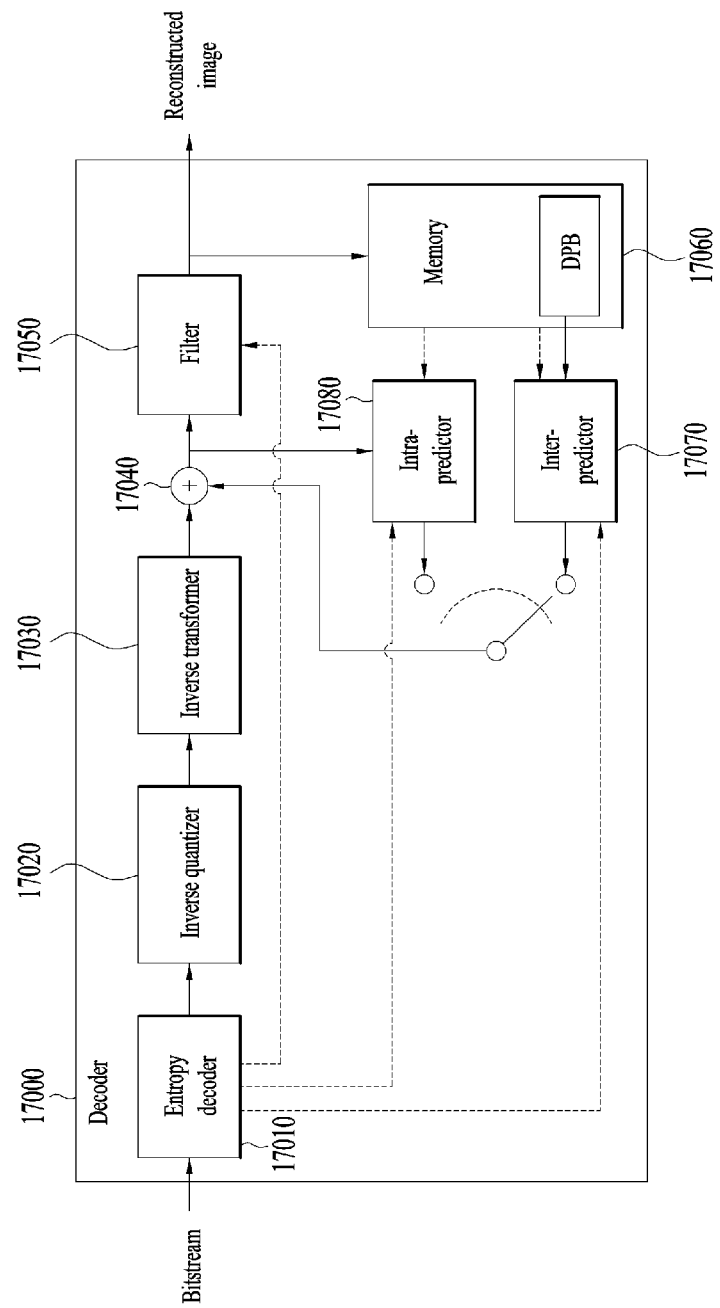
FIG. 17 shows an exemplary 2D video/image decoder according to embodiments.

FIG. 17 illustrates an exemplary 2D video/image decoder according to embodiments.

The 2D video/image decoder may follow the reverse process of the 2D video/image encoder of FIG. 15.

The 2D video/image decoder of FIG. 17 is an embodiment of the video decompression or video decompressor of FIG. 16. FIG. 17 is a schematic block diagram of a 2D video/image decoder 17000 by which decoding of a video/image signal is performed. The 2D video/image decoder 17000 may be included in the point cloud video decoder of FIG. 1, or may be configured as an internal/external component. Each component in FIG. 17 may correspond to software, hardware, a processor, and/or a combination thereof.

Here, the input bitstream may include bitstreams for the geometry image, texture image (attribute(s) image), and occupancy map image described above. The reconstructed image (or the output image or the decoded image) may represent a reconstructed image for the geometry image, texture image (attribute(s) image), and occupancy map image described above.

Referring to the figure, an inter-predictor 17070 and an intra-predictor 17080 may be collectively referred to as a predictor. That is, the predictor may include the inter-predictor 17070 and the intra-predictor 17080. An inverse quantizer 17020 and an inverse transformer 17030 may be collectively referred to as a residual processor. That is, the residual processor may include the inverse quantizer 17020 and the inverse transformer 17030. The entropy decoder 17010, the inverse quantizer 17020, the inverse transformer 17030, the adder 17040, the filter 17050, the inter-predictor 17070, and the intra-predictor 17080 described above may be configured by one hardware component (e.g., a decoder or a processor) according to an embodiment. In addition, the memory 170 may include a decoded picture buffer (DPB) or may be configured by a digital storage medium.

When a bitstream containing video/image information is input, the decoder 17000 may reconstruct an image in a process corresponding to the process in which the video/image information is processed by the encoder of FIGS. 0.2-1. For example, the decoder 17000 may perform decoding using a processing unit applied in the encoder. Thus, the processing unit of decoding may be, for example, a CU. The CU may be split from a CTU or an LCU along a quad-tree structure and/or a binary-tree structure. Then, the reconstructed video signal decoded and output through the decoder 17000 may be played through a player.

The decoder 17000 may receive a signal output from the encoder in the form of a bitstream, and the received signal may be decoded through the entropy decoder 17010. For example, the entropy decoder 17010 may parse the bitstream to derive information (e.g., video/image information) necessary for image reconstruction (or picture reconstruction). For example, the entropy decoder 17010 may decode the information in the bitstream based on a coding technique such as exponential Golomb coding, CAVLC, or CABAC, output values of syntax elements required for image reconstruction, and quantized values of transform coefficients for the residual. More specifically, in the CABAC entropy decoding, a bin corresponding to each syntax element in the bitstream may be received, and a context model may be determined based on decoding target syntax element information and decoding information about neighboring and decoding target blocks or information about a symbol/bin decoded in a previous step. Then, the probability of occurrence of a bin may be predicted according to the determined context model, and arithmetic decoding of the bin may be performed to generate a symbol corresponding to the value of each syntax element. According to the CABAC entropy decoding, after a context model is determined, the context model may be updated based on the information about the symbol/bin decoded for the context model of the next symbol/bin. Information about the prediction in the information decoded by the entropy decoder 17010 may be provided to the predictors (the inter-predictor 17070 and the intra-predictor 17080), and the residual values on which entropy decoding has been performed by the entropy decoder 17010, that is, the quantized transform coefficients and related parameter information, may be input to the inverse quantizer 17020. In addition, information about filtering of the information decoded by the entropy decoder 17010 may be provided to the filter 17050. A receiver (not shown) configured to receive a signal output from the encoder may be further configured as an internal/external element of the decoder 17000. Alternatively, the receiver may be a component of the entropy decoder 17010.

The inverse quantizer 17020 may output transform coefficients by inversely quantizing the quantized transform coefficients. The inverse quantizer 17020 may rearrange the quantized transform coefficients in the form of a two-dimensional block. In this case, the rearrangement may be performed based on the coefficient scan order implemented by the encoder. The inverse quantizer 17020 may perform inverse quantization on the quantized transform coefficients using a quantization parameter (e.g., quantization step size information), and acquire transform coefficients.

The inverse transformer 17030 acquires a residual signal (residual block and residual sample array) by inversely transforming the transform coefficients.

The predictor may perform prediction on the current block and generate a predicted block including prediction samples for the current block. The predictor may determine whether intra-prediction or inter-prediction is to be applied to the current block based on the information about the prediction output from the entropy decoder 17010, and may determine a specific intra-/inter-prediction mode.

The intra-predictor 265 may predict the current block with reference to the samples in the current picture. The samples may be positioned in the neighbor of or away from the current block depending on the prediction mode. In intra-prediction, the prediction modes may include a plurality of non-directional modes and a plurality of directional modes. The intra-predictor 17080 may determine a prediction mode to be applied to the current block, using the prediction mode applied to the neighboring block.

The inter-predictor 17070 may derive a predicted block for the current block based on a reference block (reference sample array) specified by a motion vector on the reference picture. In this case, in order to reduce the amount of motion information transmitted in the inter-prediction mode, the motion information may be predicted on a per block, sub-block, or sample basis based on the correlation in motion information between the neighboring blocks and the current block. The motion information may include a motion vector and a reference picture index. The motion information may further include information about an inter-prediction direction (L0 prediction, L1 prediction, Bi prediction, etc.). In the case of inter-prediction, the neighboring blocks may include a spatial neighboring block, which is present in the current picture, and a temporal neighboring block, which is present in the reference picture. For example, the inter-predictor 17070 may configure a motion information candidate list based on neighboring blocks and derive a motion vector of the current block and/or a reference picture index based on the received candidate selection information. Inter-prediction may be performed based on various prediction modes. The information about the prediction may include information indicating an inter-prediction mode for the current block.

The adder 17040 may add the acquired residual signal to the prediction signal (predicted block or prediction sample array) output from the inter-predictor 17070 or the intra-predictor 17080, thereby generating a reconstructed signal (a reconstructed picture, a reconstructed block, or a reconstructed sample array). When there is no residual signal for a processing target block as in the case where the skip mode is applied, the predicted block may be used as the reconstructed block.

The adder 17040 may be called a reconstructor or a reconstructed block generator. The generated reconstructed signal may be used for intra-prediction of the next processing target block in the current picture, or may be used for inter-prediction of the next picture through filtering as described below.

The filter 17050 may improve subjective/objective image quality by applying filtering to the reconstructed signal. For example, the filter 17050 may generate a modified reconstructed picture by applying various filtering techniques to the reconstructed picture, and may transmit the modified reconstructed picture to the memory 250, specifically, the DPB of the memory 17060. The various filtering techniques may include, for example, deblocking filtering, sample adaptive offset, adaptive loop filtering, and bilateral filtering.

The reconstructed picture stored in the DPB of the memory 17060 may be used as a reference picture in the inter-predictor 17070. The memory 17060 may store the motion information about a block from which the motion information is derived (or decoded) in the current picture and/or the motion information about the blocks in a picture that has already been reconstructed. The stored motion information may be delivered to the inter-predictor 17070 so as to be used as the motion information about a spatial neighboring block or the motion information about a temporal neighboring block. The memory 17060 may store the reconstructed samples of the reconstructed blocks in the current picture, and deliver the reconstructed samples to the intra-predictor 17080.

In the present disclosure, the embodiments described regarding the filter 160, the inter-predictor 180, and the intra-predictor 185 of the encoder 100 may be applied to the filter 17050, the inter-predictor 17070 and the intra-predictor 17080 of the decoder 17000, respectively, in the same or corresponding manner.

At least one of the prediction, transform, and quantization procedures described above may be skipped. For example, for a block to which the pulse coding mode (PCM) is applied, the prediction, transform, and quantization procedures may be skipped, and the value of a decoded sample may be used as a sample of the reconstructed image.

Occupancy Map Decompression (16003)

This is a reverse process of the occupancy map compression described above. Occupancy map decompression is a process for reconstructing the occupancy map by decompressing the occupancy map bitstream.

Auxiliary Patch Info Decompression (16004)

The auxiliary patch information may be reconstructed by performing the reverse process of the aforementioned auxiliary patch info compression and decoding the compressed auxiliary patch info bitstream.

Geometry Reconstruction (16005)

This is a reverse process of the geometry image generation described above. Initially, a patch is extracted from the geometry image using the reconstructed occupancy map, the 2D position/size information about the patch included in the auxiliary patch info, and the information about mapping between a block and the patch. Then, a point cloud is reconstructed in a 3D space based on the geometry image of the extracted patch and the 3D position information about the patch included in the auxiliary patch info. When the geometry value corresponding to a point (u, v) within the patch is g(u, v), and the coordinates of the position of the patch on the normal, tangent and bitangent axes of the 3D space are (δ0, s0, r0), □δ(u, v), s(u, v), and r(u, v), which are the normal, tangent, and bitangent coordinates in the 3D space of a position mapped to point (u, v) may be expressed as follows:

$$\delta(u,v)=\delta 0+g(u,v);$$

$$s(u,v)=s0+u;$$

$$r(u,v)=r0+v.$$

Smoothing (16006)

Smoothing, which is the same as the smoothing in the encoding process described above, is a process for eliminating discontinuity that may occur on the patch boundary due to deterioration of the image quality occurring during the compression process.

Texture Reconstruction (16007)

Texture reconstruction is a process of reconstructing a color point cloud by assigning color values to each point constituting a smoothed point cloud. It may be performed by assigning color values corresponding to a texture image pixel at the same position as in the geometry image in the 2D space to points of a point of a point cloud corresponding to the same position in the 3D space, based on the mapping information about the geometry image and the point cloud in the geometry reconstruction process described above.

Color Smoothing (16008)

Color smoothing is similar to the process of geometry smoothing described above. Color smoothing is a process for eliminating discontinuity that may occur on the patch boundary due to deterioration of the image quality occurring during the compression process. Color smoothing may be performed through the following operations:

1) Calculate neighboring points of each point constituting the reconstructed point cloud using the K-D tree or the like. The neighboring point information calculated in the geometry smoothing process described in section 2.5 may be used.

2) Determine whether each of the points is positioned on the patch boundary. These operations may be performed based on the boundary information calculated in the geometry smoothing process described above.

3) Check the distribution of color values for the neighboring points of the points present on the boundary and determine whether smoothing is to be performed. For example, when the entropy of luminance values is less than or equal to a threshold local entry (there are many similar luminance values), it may be determined that the corresponding portion is not an edge portion, and smoothing may be performed. As a method of smoothing, the color value of the point may be replaced with the average of the color values of the neighboring points.

Figure 18:
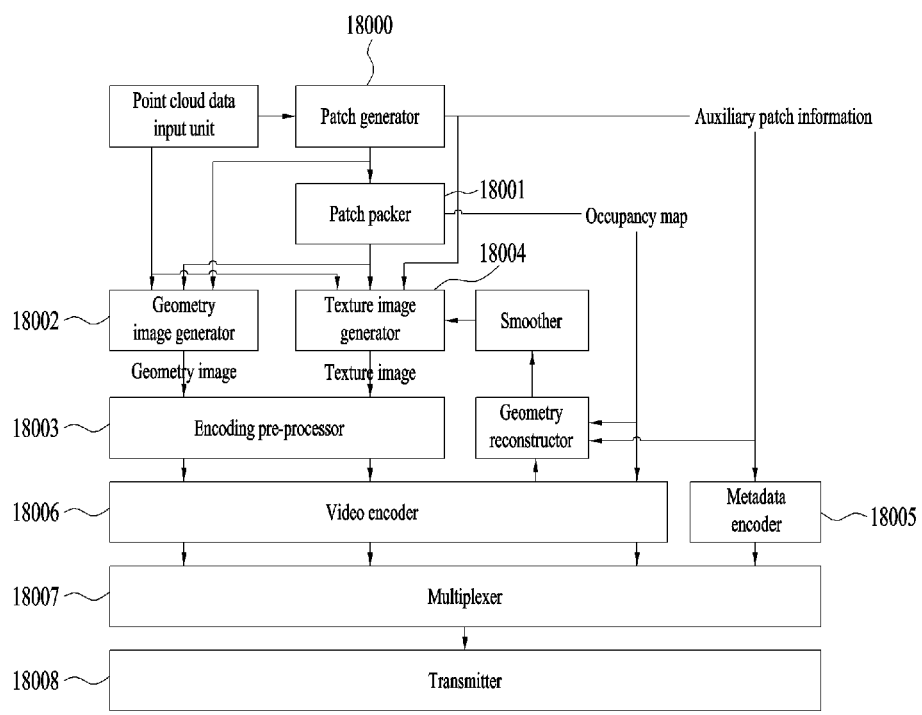
FIG. 18 is a flowchart illustrating operation of a transmission device according to embodiments of the present disclosure.

FIG. 18 is a flowchart illustrating operation of a transmission device according to embodiments of the present disclosure.

The transmission device according to the embodiments may correspond to the transmission device of FIG. 1, the encoding process of FIG. 4, and the 2D video/image encoder of FIG. 15, or perform some/all of the operations thereof. Each component of the transmission device may correspond to software, hardware, a processor and/or a combination thereof.

An operation process of the transmission terminal for compression and transmission of point cloud data using V-PCC may be performed as illustrated in the figure.

The point cloud data transmission device according to the embodiments may be referred to as a transmission device.

Regarding a patch generator 18000, a patch for 2D image mapping of a point cloud is generated. Auxiliary patch information is generated as a result of the patch generation. The generated information may be used in the processes of geometry image generation, texture image generation, and geometry reconstruction for smoothing.

Regarding a patch packer 18001, a patch packing process of mapping the generated patches into the 2D image is performed. As a result of patch packing, an occupancy map may be generated. The occupancy map may be used in the processes of geometry image generation, texture image generation, and geometry reconstruction for smoothing.

A geometry image generator 18002 generates a geometry image based on the auxiliary patch information and the occupancy map. The generated geometry image is encoded into one bitstream through video encoding.

An encoding preprocessor 18003 may include an image padding procedure. The geometry image regenerated by decoding the generated geometry image or the encoded geometry bitstream may be used for 3D geometry reconstruction and then be subjected to a smoothing process.

A texture image generator 18004 may generate a texture image based on the (smoothed) 3D geometry, the point cloud, the auxiliary patch information, and the occupancy map. The generated texture image may be encoded into one video bitstream.

A metadata encoder 18005 may encode the auxiliary patch information into one metadata bitstream.

A video encoder 18006 may encode the occupancy map into one video bitstream.

A multiplexer 18007 may multiplex the video bitstreams of the generated geometry image, texture image, and occupancy map and the metadata bitstream of the auxiliary patch information into one bitstream.

A transmitter 18008 may transmit the bitstream to the reception terminal. Alternatively, the video bitstreams of the generated geometry image, texture image, and the occupancy map and the metadata bitstream of the auxiliary patch information may be processed into a file of one or more track data or encapsulated into segments and may be transmitted to the reception terminal through the transmitter.

Figure 19:
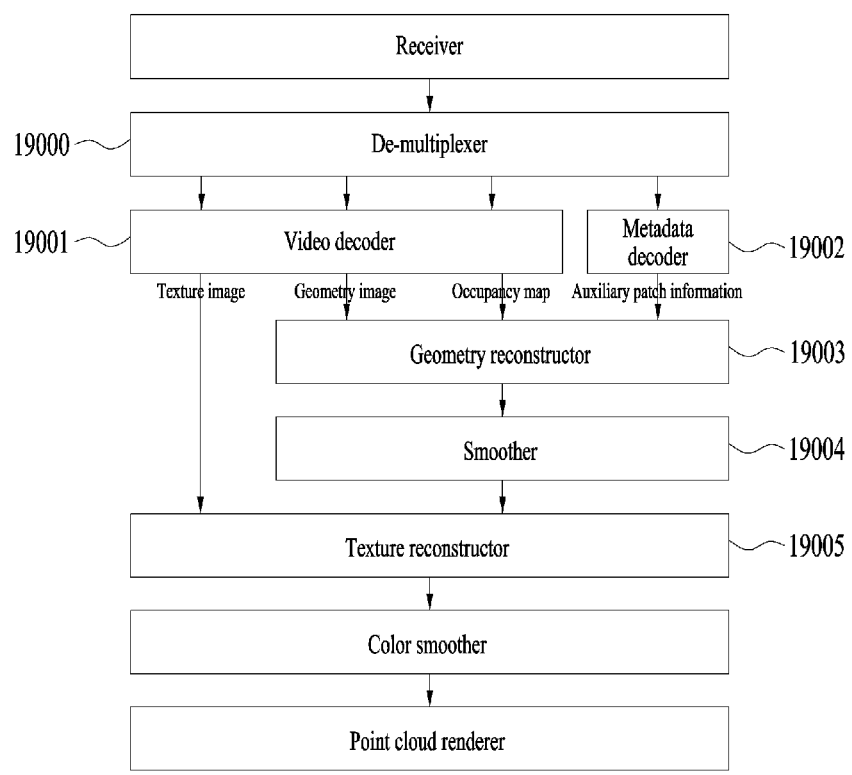
FIG. 19 is a flowchart illustrating operation of a reception device according to embodiments.

FIG. 19 is a flowchart illustrating operation of a reception device according to embodiments.

The reception device according to the embodiments may correspond to the reception device of FIG. 1, the decoding process of FIG. 16, and the 2D video/image encoder of FIG. 17, or perform some/all of the operations thereof. Each component of the reception device may correspond to software, hardware, a processor and/or a combination thereof.

The operation of the reception terminal for receiving and reconstructing point cloud data using V-PCC may be performed as illustrated in the figure. The operation of the V-PCC reception terminal may follow the reverse process of the operation of the V-PCC transmission terminal of FIG. 18.

The point cloud data reception device according to the embodiments may be referred to as a reception device.

The bitstream of the received point cloud is demultiplexed into the video bitstreams of the compressed geometry image, texture image, occupancy map and the metadata bitstream of the auxiliary patch information by a demultiplexer 19000 after file/segment decapsulation. A video decoder 19001 and a metadata decoder 19002 decode the demultiplexed video bitstreams and metadata bitstream. 3D geometry is reconstructed by a geometry reconstructor 19003 based on the decoded geometry image, occupancy map, and auxiliary patch information, and is then subjected to a smoothing process performed by a smoother 19004. A color point cloud image/picture may be reconstructed by a texture reconstructor 19005 by assigning color values to the smoothed 3D geometry based on the texture image. Thereafter, a color smoothing process may be additionally performed to improve the objective/subjective visual quality, and a modified point cloud image/picture derived through the color smoothing process is shown to the user through the rendering process (through, for example, the point cloud renderer). In some cases, the color smoothing process may be skipped.

Figure 20:
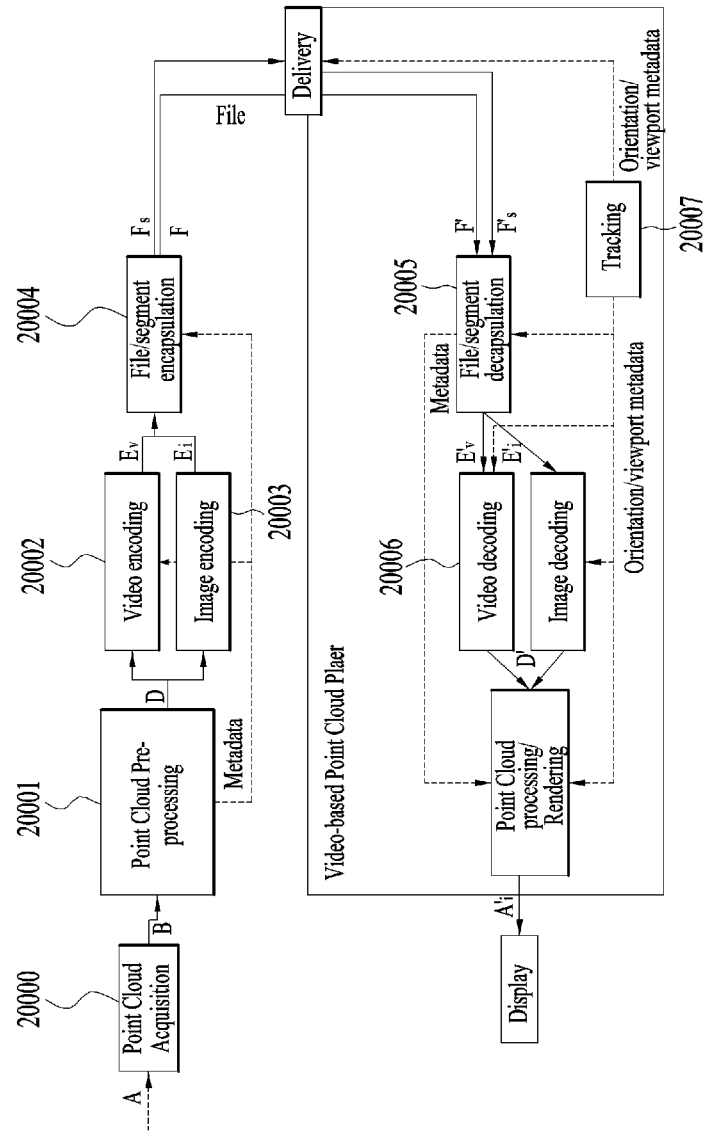
FIG. 20 illustrates an exemplary architecture for V-PCC based storage and streaming of point cloud data according to embodiments.

FIG. 20 illustrates an exemplary architecture for V-PCC based storage and streaming of point cloud data according to embodiments.

A part/the entirety of the system of FIG. 20 may include some or all of the transmission device and reception device of FIG. 1, the encoding process of FIG. 4, the 2D video/image encoder of FIG. 15, the decoding process of FIG. 16, the transmission device of FIG. 18, and/or the reception device of FIG. 19. Each component in the figure may correspond to software, hardware, a processor and/or a combination thereof.

Figure 21:
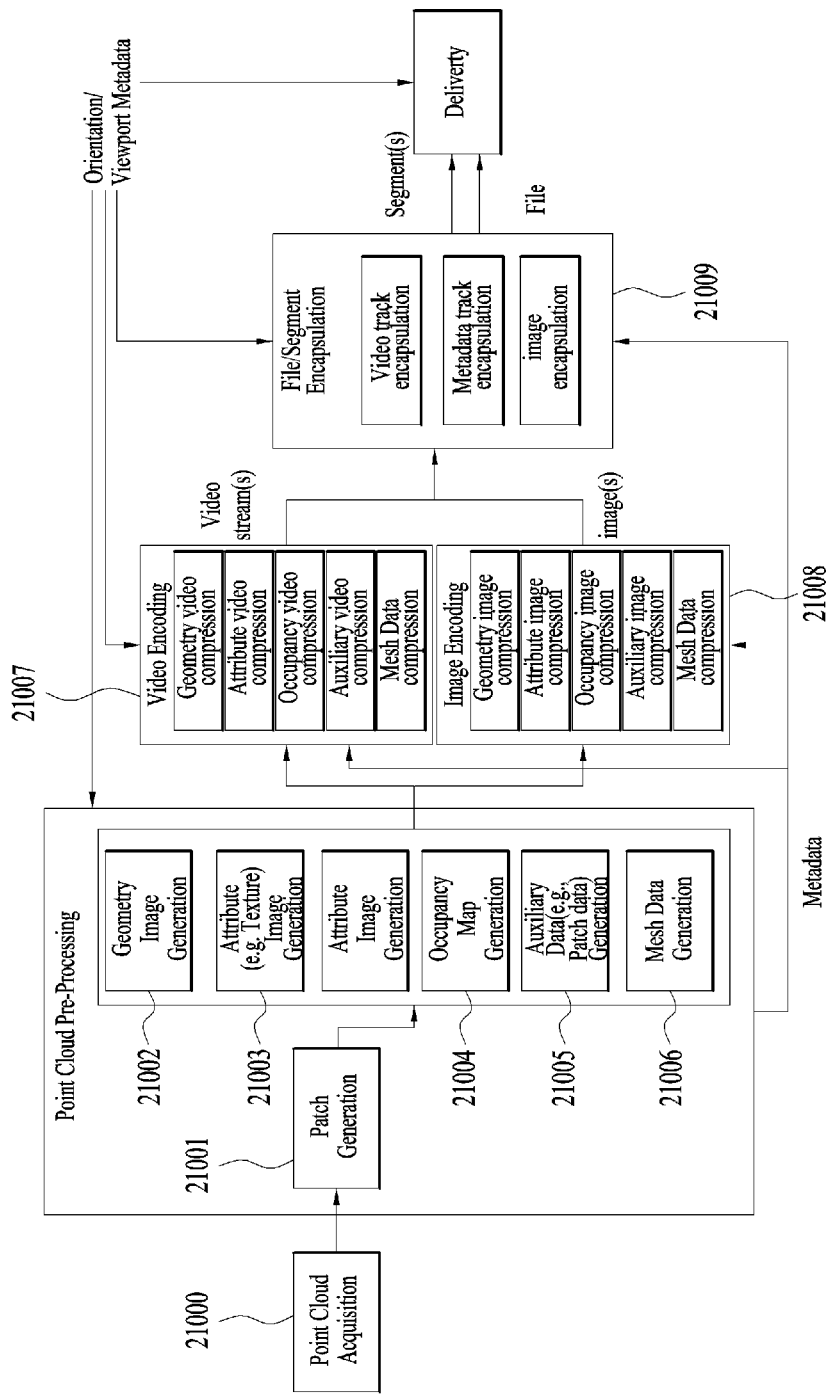
FIG. 21 is an exemplary block diagram of a device for storing and transmitting point cloud data according to embodiments.
Figure 22:
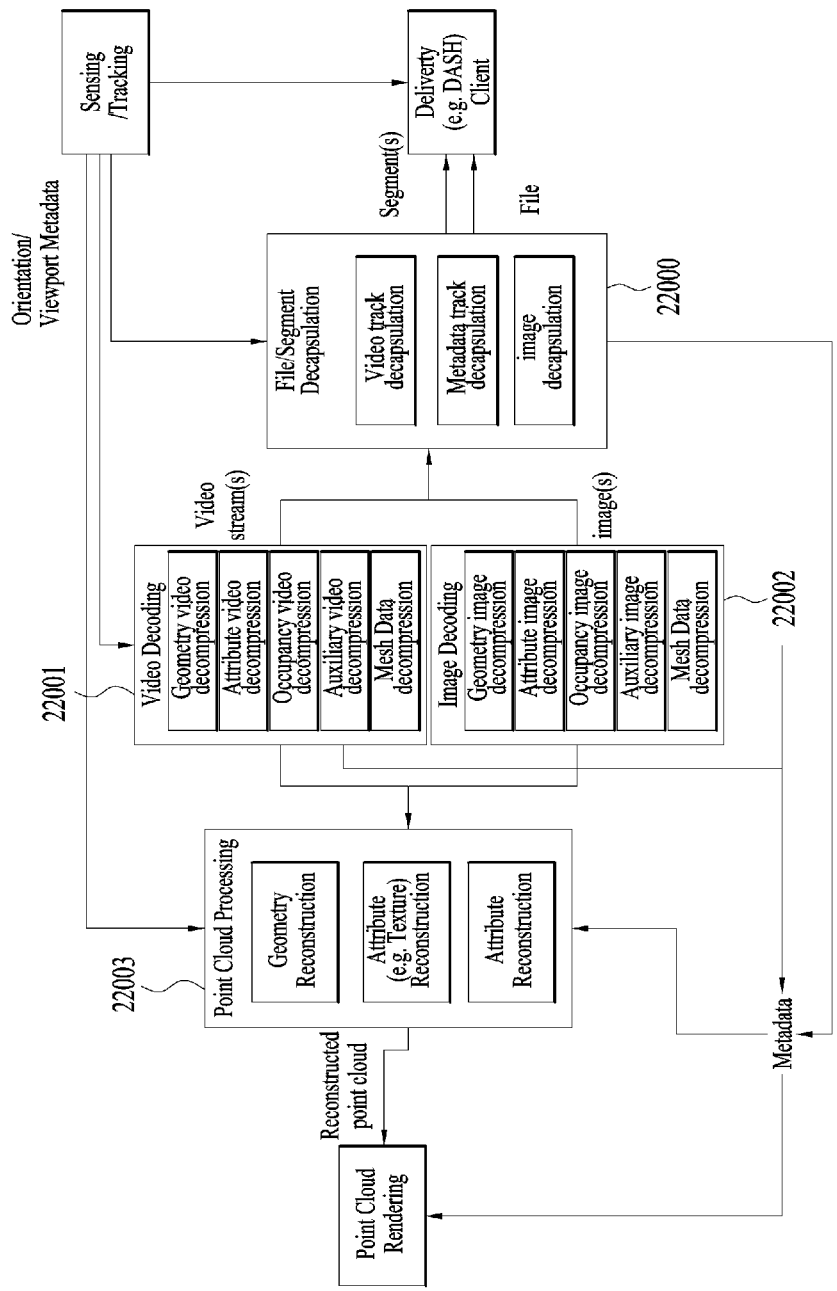
FIG. 22 is an exemplary block diagram of a point cloud data reception device according to embodiments.

FIGS. 20 to 22 are diagrams illustrating a structure in which a system is additionally connected to the transmission device and the reception device according to embodiments. The transmission device and the reception device the system according to embodiments may be referred to as a transmission/reception apparatus according to the embodiments.

In the apparatus according to the embodiments illustrated in FIGS. 20 to 22, the transmitting device corresponding to FIG. 18 or the like may generate a container suitable for a data format for transmission of a bitstream containing encoded point cloud data.

The V-PCC system according to the embodiments may create a container including point cloud data, and may further add additional data necessary for efficient transmission/reception to the container.

The reception device according to the embodiments may receive and parse the container based on the system shown in FIGS. 20 to 22. The reception device corresponding to FIG. 19 or the like may decode and restore point cloud data from the parsed bitstream.

The figure shows the overall architecture for storing or streaming point cloud data compressed based on video-based point cloud compression (V-PCC). The process of storing and streaming the point cloud data may include an acquisition process, an encoding process, a transmission process, a decoding process, a rendering process, and/or a feedback process.

The embodiments propose a method of effectively providing point cloud media/content/data.

In order to effectively provide point cloud media/content/data, a point cloud acquirer 20000 may acquire a point cloud video. For example, one or more cameras may acquire point cloud data through capture, composition or generation of a point cloud. Through this acquisition process, a point cloud video including a 3D position (which may be represented by x, y, and z position values, etc.) (hereinafter referred to as geometry) of each point and attributes (color, reflectance, transparency, etc.) of each point may be acquired. For example, a Polygon File format (PLY) (or Stanford Triangle format) file or the like containing the point cloud video may be generated. For point cloud data having multiple frames, one or more files may be acquired. In this process, point cloud related metadata (e.g., metadata related to capture, etc.) may be generated.

Post-processing for improving the quality of the content may be needed for the captured point cloud video. In the video capture process, the maximum/minimum depth may be adjusted within the range provided by the camera equipment. Even after the adjustment, point data of an unwanted area may still be present. Accordingly, post-processing of removing the unwanted area (e.g., the background) or recognizing a connected space and filling the spatial holes may be performed. In addition, point clouds extracted from the cameras sharing a spatial coordinate system may be integrated into one piece of content through the process of transforming each point into a global coordinate system based on the coordinates of the location of each camera acquired through a calibration process. Thereby, a point cloud video with a high density of points may be acquired.

A point cloud pre-processor 20001 may generate one or more pictures/frames of the point cloud video. Here, a picture/frame may generally represent a unit representing one image in a specific time interval. When points constituting the point cloud video is divided into one or more patches (sets of points that constitute the point cloud video, wherein the points belonging to the same patch are adjacent to each other in the 3D space and are mapped in the same direction among the planar faces of a 6-face bounding box when mapped to a 2D image) and mapped to a 2D plane, an occupancy map picture/frame of a binary map, which indicates presence or absence of data at the corresponding position in the 2D plane with a value of 0 or 1 may be generated. In addition, a geometry picture/frame, which is in the form of a depth map that represents the information about the position (geometry) of each point constituting the point cloud video on a patch-by-patch basis, may be generated. A texture picture/frame, which represents the color information about each point constituting the point cloud video on a patch-by-patch basis, may be generated. In this process, metadata needed to reconstruct the point cloud from the individual patches may be generated. The metadata may include information about the patches, such as the position and size of each patch in the 2D/3D space. These pictures/frames may be generated continuously in temporal order to construct a video stream or metadata stream.

A point cloud video encoder 20002 may encode one or more video streams related to a point cloud video. One video may include multiple frames, and one frame may correspond to a still image/picture. In the present disclosure, the point cloud video may include a point cloud image/frame/picture, and the term "point cloud video" may be used interchangeably with the point cloud video/frame/picture. The point cloud video encoder may perform a video-based point cloud compression (V-PCC) procedure. The point cloud video encoder may perform a series of procedures such as prediction, transform, quantization, and entropy coding for compression and coding efficiency. The encoded data (encoded video/image information) may be output in the form of a bitstream. Based on the V-PCC procedure, the point cloud video encoder may encode point cloud video by dividing the same into a geometry video, an attribute video, an occupancy map video, and metadata, for example, information about patches, as described below. The geometry video may include a geometry image, the attribute video may include an attribute image, and the occupancy map video may include an occupancy map image. The patch data, which is auxiliary information, may include patch related information. The attribute video/image may include a texture video/image.

A point cloud image encoder 20003 may encode one or more images related to a point cloud video. The point cloud image encoder may perform a video-based point cloud compression (V-PCC) procedure. The point cloud image encoder may perform a series of procedures such as prediction, transform, quantization, and entropy coding for compression and coding efficiency. The encoded image may be output in the form of a bitstream. Based on the V-PCC procedure, the point cloud image encoder may encode the point cloud image by dividing the same into a geometry image, an attribute image, an occupancy map image, and metadata, for example, information about patches, as described below.

The point cloud video encoder and/or the point cloud image encoder according to the embodiments may generate a PCC bitstream (G-PCC and/or V-PCC bitstream) according to the embodiments.

According to embodiments, the video encoder 20002, the image encoder 20002, the video decoding 20006, and the image decoding may be performed by one encoder/decoder as described above, and may be performed along separate paths as shown in the figure.

In file/segment encapsulation 20004, the encoded point cloud data and/or point cloud-related metadata may be encapsulated into a file or a segment for streaming. Here, the point cloud-related metadata may be received from the metadata processor or the like. The metadata processor may be included in the point cloud video/image encoder or may be configured as a separate component/module. The encapsulation processor may encapsulate the corresponding video/image/metadata in a file format such as ISOBMFF or in the form of a DASH segment or the like. According to an embodiment, the encapsulation processor may include the point cloud metadata in the file format. The point cloud-related metadata may be included, for example, in boxes at various levels on the ISOBMFF file format or as data in a separate track within the file. According to an embodiment, the encapsulation processor may encapsulate the point cloud-related metadata into a file.

The encapsulation or encapsulator according to the embodiments may divide the G-PCC/V-PCC bitstream into one or multiple tracks and store the same in a file, and may also encapsulate signaling information for this operation. In addition, the atlas stream included on the G-PCC/V-PCC bitstream may be stored as a track in the file, and related signaling information may be stored. Furthermore, an SEI message present in the G-PCC/V-PCC bitstream may be stored in a track in the file and related signaling information may be stored.

A transmission processor may perform processing of the encapsulated point cloud data for transmission according to the file format. The transmission processor may be included in the transmitter or may be configured as a separate component/module. The transmission processor may process the point cloud data according to a transmission protocol. The processing for transmission may include processing for delivery over a broadcast network and processing for delivery through a broadband. According to an embodiment, the transmission processor may receive point cloud-related metadata from the metadata processor as well as the point cloud data, and perform processing of the point cloud video data for transmission.

The transmitter may transmit a point cloud bitstream or a file/segment including the bitstream to the receiver of the reception device over a digital storage medium or a network. For transmission, processing according to any transmission protocol may be performed. The data processed for transmission may be delivered over a broadcast network and/or through a broadband. The data may be delivered to the reception side in an on-demand manner. The digital storage medium may include various storage media such as USB, SD, CD, DVD, Blu-ray, HDD, and SSD. The transmitter may include an element for generating a media file in a predetermined file format, and may include an element for transmission over a broadcast/communication network. The receiver may extract the bitstream and transmit the extracted bitstream to the decoder.

The receiver may receive point cloud data transmitted by the point cloud data transmission device according to the present disclosure. Depending on the transmission channel, the receiver may receive the point cloud data over a broadcast network or through a broadband. Alternatively, the point cloud data may be received through the digital storage medium. The receiver may include a process of decoding the received data and rendering the data according to the viewport of the user.

The reception processor may perform processing on the received point cloud video data according to the transmission protocol. The reception processor may be included in the receiver or may be configured as a separate component/module. The reception processor may reversely perform the process of the transmission processor above described so as to correspond to the processing for transmission performed at the transmission side. The reception processor may deliver the acquired point cloud video to a decapsulation processor, and the acquired point cloud-related metadata to a metadata parser.

A decapsulation processor (file/segment decapsulation) 20005 may decapsulate the point cloud data received in the form of a file from the reception processor. The decapsulation processor may decapsulate files according to ISOBMFF or the like, and may acquire a point cloud bitstream or point cloud-related metadata (or a separate metadata bitstream). The acquired point cloud bitstream may be delivered to the point cloud decoder, and the acquired point cloud video-related metadata (metadata bitstream) may be delivered to the metadata processor. The point cloud bitstream may include the metadata (metadata bitstream). The metadata processor may be included in the point cloud decoder or may be configured as a separate component/module. The point cloud video-related metadata acquired by the decapsulation processor may take the form of a box or track in the file format. The decapsulation processor may receive metadata necessary for decapsulation from the metadata processor, when necessary. The point cloud-related metadata may be delivered to the point cloud decoder and used in a point cloud decoding procedure, or may be transferred to the renderer and used in a point cloud rendering procedure.

The point cloud video decoder 20006 may receive the bitstream and decode the video/image by performing an operation corresponding to the operation of the point cloud video encoder. In this case, the point cloud video decoder may decode the point cloud video by dividing the same into a geometry video, an attribute video, an occupancy map video, and auxiliary patch information as described below. The geometry video may include a geometry image, the attribute video may include an attribute image, and the occupancy map video may include an occupancy map image. The auxiliary information may include auxiliary patch information. The attribute video/image may include a texture video/image.

The 3D geometry may be reconstructed based on the decoded geometry image, the occupancy map, and auxiliary patch information, and then may be subjected to a smoothing process. The color point cloud image/picture may be reconstructed by assigning a color value to the smoothed 3D geometry based on the texture image. The renderer may render the reconstructed geometry and the color point cloud image/picture. The rendered video/image may be displayed through the display. All or part of the rendered result may be shown to the user through a VR/AR display or a typical display.

A sensor/tracker (sensing/tracking) 20007 acquires orientation information and/or user viewport information from the user or the reception side and delivers the orientation information and/or the user viewport information to the receiver and/or the transmitter. The orientation information may represent information about the position, angle, movement, etc. of the user's head, or represent information about the position, angle, movement, etc. of a device through which the user is viewing a video/image. Based on this information, information about the area currently viewed by the user in a 3D space, that is, viewport information may be calculated.

The viewport information may be information about an area in a 3D space currently viewed by the user through a device or an HMD. A device such as a display may extract a viewport area based on the orientation information, a vertical or horizontal FOV supported by the device, and the like. The orientation or viewport information may be extracted or calculated at the reception side. The orientation or viewport information analyzed at the reception side may be transmitted to the transmission side on a feedback channel.

Based on the orientation information acquired by the sensor/tracker and/or the viewport information indicating the area currently viewed by the user, the receiver may efficiently extract or decode only media data of a specific area, i.e., the area indicated by the orientation information and/or the viewport information from the file. In addition, based on the orientation information and/or viewport information acquired by the sensor/tracker, the transmitter may efficiently encode only the media data of the specific area, that is, the area indicated by the orientation information and/or the viewport information, or generate and transmit a file therefor.

The renderer may render the decoded point cloud data in a 3D space. The rendered video/image may be displayed through the display. The user may view all or part of the rendered result through a VR/AR display or a typical display.

The feedback process may include transferring various kinds of feedback information that may be acquired in the rendering/displaying process to the transmitting side or the decoder of the receiving side. Through the feedback process, interactivity may be provided in consumption of point cloud data. According to an embodiment, head orientation information, viewport information indicating an area currently viewed by a user, and the like may be delivered to the transmitting side in the feedback process. According to an embodiment, the user may interact with what is implemented in the VR/AR/MR/autonomous driving environment. In this case, information related to the interaction may be delivered to the transmitting side or a service provider in the feedback process. According to an embodiment, the feedback process may be skipped.

According to an embodiment, the above-described feedback information may not only be transmitted to the transmitting side, but also be consumed at the receiving side. That is, the decapsulation processing, decoding, and rendering processes at the receiving side may be performed based on the above-described feedback information. For example, the point cloud data about the area currently viewed by the user may be preferentially decapsulated, decoded, and rendered based on the orientation information and/or the viewport information.

FIG. 21 is an exemplary block diagram of an device for storing and transmitting point cloud data according to embodiments.

FIG. 21 shows a point cloud system according to embodiments. A part/the entirety of the system may include some or all of the transmission device and reception device of FIG. 1, the encoding process of FIG. 4, the 2D video/image encoder of FIG. 15, the decoding process of FIG. 16, the transmission device of FIG. 18, and/or the reception device of FIG. 19. In addition, it may be included or corresponded to a part/the entirety of the system of FIG. 20.

A point cloud data transmission device according to embodiments may be configured as shown in the figure. Each element of the transmission device may be a module/unit/component/hardware/software/a processor.

The geometry, attribute, auxiliary data, and mesh data of the point cloud may each be configured as a separate stream or stored in different tracks in a file. Furthermore, they may be included in a separate segment.

A point cloud acquirer (point cloud acquisition) 21000 acquires a point cloud. For example, one or more cameras may acquire point cloud data through capture, composition or generation of a point cloud. Through this acquisition process, point cloud data including a 3D position (which may be represented by x, y, and z position values, etc.) (hereinafter referred to as geometry) of each point and attributes (color, reflectance, transparency, etc.) of each point may be acquired. For example, a Polygon File format (PLY) (or Stanford Triangle format) file or the like including the point cloud data may be generated. For point cloud data having multiple frames, one or more files may be acquired. In this process, point cloud related metadata (e.g., metadata related to capture, etc.) may be generated.

A patch generator (or patch generation) 21002 generates patches from the point cloud data. The patch generator generates point cloud data or point cloud video as one or more pictures/frames. A picture/frame may generally represent a unit representing one image in a specific time interval. When points constituting the point cloud video is divided into one or more patches (sets of points that constitute the point cloud video, wherein the points belonging to the same patch are adjacent to each other in the 3D space and are mapped in the same direction among the planar faces of a 6-face bounding box when mapped to a 2D image) and mapped to a 2D plane, an occupancy map picture/frame in a binary map, which indicates presence or absence of data at the corresponding position in the 2D plane with 0 or 1 may be generated. In addition, a geometry picture/frame, which is in the form of a depth map that represents the information about the position (geometry) of each point constituting the point cloud video on a patch-by-patch basis, may be generated. A texture picture/frame, which represents the color information about each point constituting the point cloud video on a patch-by-patch basis, may be generated. In this process, metadata needed to reconstruct the point cloud from the individual patches may be generated. The metadata may include information about the patches, such as the position and size of each patch in the 2D/3D space. These pictures/frames may be generated continuously in temporal order to construct a video stream or metadata stream.

In addition, the patches may be used for 2D image mapping. For example, the point cloud data may be projected onto each face of a cube. After patch generation, a geometry image, one or more attribute images, an occupancy map, auxiliary data, and/or mesh data may be generated based on the generated patches.

Geometry image generation, attribute image generation, occupancy map generation, auxiliary data generation, and/or mesh data generation are performed by a pre-processor or a controller.

In geometry image generation 21002, a geometry image is generated based on the result of the patch generation. Geometry represents a point in a 3D space. The geometry image is generated using the occupancy map, which includes information related to 2D image packing of the patches, auxiliary data (patch data), and/or mesh data based on the patches. The geometry image is related to information such as a depth (e.g., near, far) of the patch generated after the patch generation.

In attribute image generation 21003, an attribute image is generated. For example, an attribute may represent a texture. The texture may be a color value that matches each point. According to embodiments, images of a plurality of attributes (such as color and reflectance) (N attributes) including a texture may be generated. The plurality of attributes may include material information and reflectance. According to an embodiment, the attributes may additionally include information indicating a color, which may vary depending on viewing angle and light even for the same texture.

In occupancy map generation 21004, an occupancy map is generated from the patches. The occupancy map includes information indicating presence or absence of data in the pixel, such as the corresponding geometry or attribute image.

In auxiliary data generation 21005, auxiliary data including information about the patches is generated. That is, the auxiliary data represents metadata about a patch of a point cloud object. For example, it may represent information such as normal vectors for the patches. Specifically, the auxiliary data may include information needed to reconstruct the point cloud from the patches (e.g., information about the positions, sizes, and the like of the patches in 2D/3D space, and projection (normal) plane identification information, patch mapping information, etc.)

In mesh data generation 21006, mesh data is generated from the patches. Mesh represents connection between neighboring points. For example, it may represent data of a triangular shape. For example, the mesh data refers to connectivity between the points.

A point cloud pre-processor or controller generates metadata related to patch generation, geometry image generation, attribute image generation, occupancy map generation, auxiliary data generation, and mesh data generation.

The point cloud transmission device performs video encoding and/or image encoding in response to the result generated by the pre-processor. The point cloud transmission device may generate point cloud image data as well as point cloud video data. According to embodiments, the point cloud data may have only video data, only image data, and/or both video data and image data.

A video encoder 21007 performs geometry video compression, attribute video compression, occupancy map compression, auxiliary data compression, and/or mesh data compression. The video encoder generates video stream(s) containing encoded video data.

Specifically, in the geometry video compression, point cloud geometry video data is encoded. In the attribute video compression, attribute video data of the point cloud is encoded. In the auxiliary data compression, auxiliary data associated with the point cloud video data is encoded. In the mesh data compression, mesh data of the point cloud video data is encoded. The respective operations of the point cloud video encoder may be performed in parallel.

An image encoder 21008 performs geometry image compression, attribute image compression, occupancy map compression, auxiliary data image compression, and/or mesh data compression. The image encoder generates image(s) containing encoded image data.

Specifically, in the geometry image compression, the point cloud geometry image data is encoded. In the attribute image compression, the attribute image data of the point cloud is encoded. In the auxiliary data compression, the auxiliary data associated with the point cloud image data is encoded. In the mesh data compression, the mesh data associated with the point cloud image data is encoded. The respective operations of the point cloud image encoder may be performed in parallel.

The video encoder and/or the image encoder may receive metadata from the pre-processor. The video encoder and/or the image encoder may perform each encoding process based on the metadata.

A file/segment encapsulator (file/segment encapsulation) 21009 encapsulates the video stream(s) and/or image(s) in the form of a file and/or segment. The file/segment encapsulator performs video track encapsulation, metadata track encapsulation, and/or image encapsulation.

In the video track encapsulation, one or more video streams may be encapsulated into one or more tracks.

In the metadata track encapsulation, metadata related to a video stream and/or an image may be encapsulated in one or more tracks. The metadata includes data related to the content of the point cloud data. For example, it may include initial viewing orientation metadata. According to embodiments, the metadata may be encapsulated into a metadata track, or may be encapsulated together in a video track or an image track.

In the image encapsulation, one or more images may be encapsulated into one or more tracks or items.

For example, according to embodiments, when four video streams and two images are input to the encapsulator, the four video streams and two images may be encapsulated in one file.

The point cloud video encoder and/or the point cloud image encoder according to the embodiments may generate a G-PCC/V-PCC bitstream according to the embodiments.

The file/segment encapsulator may receive metadata from the pre-processor. The file/segment encapsulator may perform encapsulation based on the metadata.

A file and/or a segment generated by the file/segment encapsulation are transmitted by the point cloud transmission device or the transmitter. For example, the segment(s) may be delivered based on a DASH-based protocol.

The encapsulation or encapsulator according to the embodiments may divide the V-PCC bitstream into one or multiple tracks and store the same in a file, and may also encapsulate signaling information for this operation. In addition, the atlas stream included on the V-PCC bitstream may be stored as a track in the file, and related signaling information may be stored. Furthermore, an SEI message present in the V-PCC bitstream may be stored in a track in the file and related signaling information may be stored.

The transmitter may transmit a point cloud bitstream or a file/segment including the bitstream to the receiver of the reception device over a digital storage medium or a network. Processing according to any transmission protocol may be performed for transmission. The data that has been processed for transmission may be delivered over a broadcast network and/or through a broadband. The data may be delivered to the receiving side in an on-demand manner. The digital storage medium may include various storage media such as USB, SD, CD, DVD, Blu-ray, HDD, and SSD. The deliverer may include an element for generating a media file in a predetermined file format, and may include an element for transmission over a broadcast/communication network. The deliverer receives orientation information and/or viewport information from the receiver. The deliverer may deliver the acquired orientation information and/or viewport information (or information selected by the user) to the pre-processor, the video encoder, the image encoder, the file/segment encapsulator, and/or the point cloud encoder. Based on the orientation information and/or the viewport information, the point cloud encoder may encode all point cloud data or the point cloud data indicated by the orientation information and/or the viewport information. Based on the orientation information and/or the viewport information, the file/segment encapsulator may encapsulate all point cloud data or the point cloud data indicated by the orientation information and/or the viewport information. Based on the orientation information and/or the viewport information, the deliverer may deliver all point cloud data or the point cloud data indicated by the orientation information and/or the viewport information.

For example, the pre-processor may perform the above-described operation on all the point cloud data or on the point cloud data indicated by the orientation information and/or the viewport information. The video encoder and/or the image encoder may perform the above-described operation on all the point cloud data or on the point cloud data indicated by the orientation information and/or the viewport information. The file/segment encapsulator may perform the above-described operation on all the point cloud data or on the point cloud data indicated by the orientation information and/or the viewport information. The transmitter may perform the above-described operation on all the point cloud data or on the point cloud data indicated by the orientation information and/or the viewport information.

FIG. 22 is an exemplary block diagram of a point cloud data reception device according to embodiments.

FIG. 22 shows a point cloud system according to embodiments. A part/the entirety of the system may include some or all of the transmission device and reception device of FIG. 1, the encoding process of FIG. 4, the 2D video/image encoder of FIG. 15, the decoding process of FIG. 16, the transmission device of FIG. 18, and/or the reception device of FIG. 19. In addition, it may be included or corresponded to a part/the entirety of the system of FIGS. 20 and 21.

Each component of the reception device may be a module/unit/component/hardware/software/processor. A delivery client may receive point cloud data, a point cloud bitstream, or a file/segment including the bitstream transmitted by the point cloud data transmission device according to the embodiments. The receiver may receive the point cloud data over a broadcast network or through a broadband depending on the channel used for the transmission. Alternatively, the point cloud video data may be received through a digital storage medium. The receiver may include a process of decoding the received data and rendering the received data according to the user viewport. The reception processor may perform processing on the received point cloud data according to a transmission protocol. A reception processor may be included in the receiver or configured as a separate component/module. The reception processor may reversely perform the process of the transmission processor described above so as to correspond to the processing for transmission performed at the transmitting side. The reception processor may deliver the acquired point cloud data to the decapsulation processor and the acquired point cloud related metadata to the metadata parser.

The sensor/tracker (sensing/tracking) acquires orientation information and/or viewport information. The sensor/tracker may deliver the acquired orientation information and/or viewport information to the delivery client, the file/segment decapsulator, and the point cloud decoder.

The delivery client may receive all point cloud data or the point cloud data indicated by the orientation information and/or the viewport information based on the orientation information and/or the viewport information. The file/segment decapsulator may decapsulate all point cloud data or the point cloud data indicated by the orientation information and/or the viewport information based on the orientation information and/or the viewport information. The point cloud decoder (the video decoder and/or the image decoder) may decode all point cloud data or the point cloud data indicated by the orientation information and/or the viewport information based on the orientation information and/or the viewport information. The point cloud processor may process all point cloud data or the point cloud data indicated by the orientation information and/or the viewport information based on the orientation information and/or the viewport information.

A file/segment decapsulator (file/segment decapsulation) 22000 performs video track decapsulation, metadata track decapsulation, and/or image decapsulation. The decapsulation processor (file/segment decapsulation) may decapsulate the point cloud data in the form of a file received from the reception processor. The decapsulation processor (file/segment decapsulation) may decapsulate files or segments according to ISOBMFF, etc., to acquire a point cloud bitstream or point cloud-related metadata (or a separate metadata bitstream). The acquired point cloud bitstream may be delivered to the point cloud decoder, and the acquired point cloud-related metadata (or metadata bitstream) may be delivered to the metadata processor. The point cloud bitstream may include the metadata (metadata bitstream). The metadata processor may be included in the point cloud video decoder or may be configured as a separate component/module. The point cloud-related metadata acquired by the decapsulation processor may take the form of a box or track in a file format. The decapsulation processor may receive metadata necessary for decapsulation from the metadata processor, when necessary. The point cloud-related metadata may be delivered to the point cloud decoder and used in a point cloud decoding procedure, or may be delivered to the renderer and used in a point cloud rendering procedure. The file/segment decapsulator may generate metadata related to the point cloud data.

In the video track decapsulation, a video track contained in the file and/or segment is decapsulated. Video stream(s) including a geometry video, an attribute video, an occupancy map, auxiliary data, and/or mesh data are decapsulated.

In the metadata track decapsulation, a bitstream containing metadata related to the point cloud data and/or auxiliary data is decapsulated.

In the image decapsulation, image(s) including a geometry image, an attribute image, an occupancy map, auxiliary data and/or mesh data are decapsulated.

The decapsulation or decapsulator according to the embodiments may divide and parse (decapsulate) the G-PCC/V-PCC bitstream based on one or more tracks in a file, and may also decapsulate signaling information therefor. In addition, the atlas stream included in the G-PCC/V-PCC bitstream may be decapsulated based on a track in the file, and related signaling information may be parsed. Furthermore, an SEI message present in the G-PCC/V-PCC bitstream may be decapsulated based on a track in the file, and related signaling information may be also acquired.

The video decoding or video decoder 22001 performs geometry video decompression, attribute video decompression, occupancy map decompression, auxiliary data decompression, and/or mesh data decompression. The video decoder decodes the geometry video, the attribute video, the auxiliary data, and/or the mesh data in a process corresponding to the process performed by the video encoder of the point cloud transmission device according to the embodiments.

The image decoding or image decoder 22002 performs geometry image decompression, attribute image decompression, occupancy map decompression, auxiliary data decompression, and/or mesh data decompression. The image decoder decodes the geometry image, the attribute image, the auxiliary data, and/or the mesh data in a process corresponding to the process performed by the image encoder of the point cloud transmission device according to the embodiments.

The video decoding and the image decoding according to the embodiments may be processed by one video/image decoder as described above, and may be performed along separate paths as illustrated in the figure.

The video decoding and/or the image decoding may generate metadata related to the video data and/or the image data.

The point cloud video encoder and/or the point cloud image encoder according to the embodiments may decode the G-PCC/V-PCC bitstream according to the embodiments.

In point cloud processing 22003, geometry reconstruction and/or attribute reconstruction are performed.

In the geometry reconstruction, the geometry video and/or geometry image are reconstructed from the decoded video data and/or decoded image data based on the occupancy map, auxiliary data and/or mesh data.

In the attribute reconstruction, the attribute video and/or the attribute image are reconstructed from the decoded attribute video and/or the decoded attribute image based on the occupancy map, auxiliary data, and/or mesh data. According to embodiments, for example, the attribute may be a texture. According to embodiments, an attribute may represent a plurality of pieces of attribute information. When there is a plurality of attributes, the point cloud processor according to the embodiments performs a plurality of attribute reconstructions.

The point cloud processor may receive metadata from the video decoder, the image decoder, and/or the file/segment decapsulator, and process the point cloud based on the metadata.

The point cloud rendering or point cloud renderer renders the reconstructed point cloud. The point cloud renderer may receive metadata from the video decoder, the image decoder, and/or the file/segment decapsulator, and render the point cloud based on the metadata.

The display actually displays the result of rendering on the display.

As shown in FIGS. 15 to 19, after encoding/decoding, the method/device according to the embodiments the point cloud data as shown in 15 to 19, the bitstream containing the point cloud data may be encapsulated and/or decapsulated in the form of a file and/or a segment.

For example, a point cloud data device according to the embodiments may encapsulate point cloud data based on a file. The file may include a V-PCC track containing parameters for a point cloud, a geometry track containing geometry, an attribute track containing an attribute, and an occupancy track containing an occupancy map.

In addition, a point cloud data reception device according to embodiments decapsulates the point cloud data based on a file. The file may include a V-PCC track containing parameters for a point cloud, a geometry track containing geometry, an attribute track containing an attribute, and an occupancy track containing an occupancy map.

The operation described above may be performed by the file/segment encapsulator 20004, 20005 of FIG. 20, the file/segment encapsulator 21009 of FIG. 21, and the file/segment encapsulator 22000 of FIG. 22.

Figure 23:
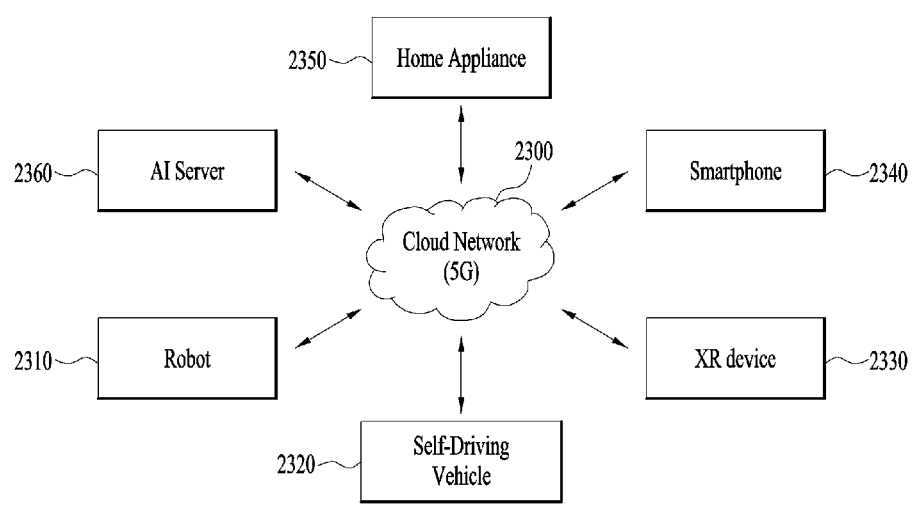
FIG. 23 illustrates an exemplary structure operable in connection with point cloud data transmission/reception methods/devices according to embodiments.

FIG. 23 illustrates an exemplary structure operable in connection with point cloud data transmission/reception methods/devices according to embodiments.

In the structure according to the embodiments, at least one of a server 2360, a robot 2310, a self-driving vehicle 2320, an XR device 2330, a smartphone 2340, a home appliance 2350 and/or a head-mount display (HMD) 2370 is connected to a cloud network 2300. Here, the robot 2310, the self-driving vehicle 2320, the XR device 2330, the smartphone 2340, or the home appliance 2350 may be referred to as a device. In addition, the XR device 1730 may correspond to a point cloud data (PCC) device according to embodiments or may be operatively connected to the PCC device.

The cloud network 2300 may represent a network that constitutes part of the cloud computing infrastructure or is present in the cloud computing infrastructure. Here, the cloud network 2300 may be configured using a 3G network, 4G or Long Term Evolution (LTE) network, or a 5G network.

The server 2360 may be connected to at least one of the robot 2310, the self-driving vehicle 2320, the XR device 2330, the smartphone 2340, the home appliance 2350, and/or the HMD 2370 over the cloud network 2300 and may assist at least a part of the processing of the connected devices 2310 to 2370.

The HMD 2370 represents one of the implementation types of the XR device and/or the PCC device according to the embodiments. An HMD type device according to embodiments includes a communication unit, a control unit, a memory, an I/O unit, a sensor unit, and a power supply unit.

Hereinafter, various embodiments of the devices 2310 to 2350 to which the above-described technology is applied will be described. The devices 2310 to 2350 illustrated in FIG. 23 may be operatively connected/coupled to a point cloud data transmission and reception device according to the above-described embodiments.

<PCC+XR>

The XR/PCC device 2330 may employ PCC technology and/or XR (AR+VR) technology, and may be implemented as an HMD, a head-up display (HUD) provided in a vehicle, a television, a mobile phone, a smartphone, a computer, a wearable device, a home appliance, a digital signage, a vehicle, a stationary robot, or a mobile robot.

The XR/PCC device 2330 may analyze 3D point cloud data or image data acquired through various sensors or from an external device and generate position data and attribute data about 3D points. Thereby, the XR/PCC device 2330 may acquire information about the surrounding space or a real object, and render and output an XR object. For example, the XR/PCC device 2330 may match an XR object including auxiliary information about a recognized object with the recognized object and output the matched XR object.

<PCC+XR+Mobile Phone>

The XR/PCC device 2330 may be implemented as a mobile phone 2340 by applying PCC technology.

The mobile phone 2340 may decode and display point cloud content based on the PCC technology.

<PCC+Self-Driving+XR>

The self-driving vehicle 2320 may be implemented as a mobile robot, a vehicle, an unmanned aerial vehicle, or the like by applying the PCC technology and the XR technology.

The self-driving vehicle 2320 to which the XR/PCC technology is applied may represent an autonomous vehicle provided with means for providing an XR image, or an autonomous vehicle that is a target of control/interaction in the XR image. In particular, the self-driving vehicle 2320, which is a target of control/interaction in the XR image, may be distinguished from the XR device 2330 and may be operatively connected thereto.

The self-driving vehicle 2320 having means for providing an XR/PCC image may acquire sensor information from the sensors including a camera, and output the generated XR/PCC image based on the acquired sensor information. For example, the self-driving vehicle may have an HUD and output an XR/PCC image thereto to provide an occupant with an XR/PCC object corresponding to a real object or an object present on the screen.

In this case, when the XR/PCC object is output to the HUD, at least a part of the XR/PCC object may be output to overlap the real object to which the occupant's eyes are directed. On the other hand, when the XR/PCC object is output on a display provided inside the self-driving vehicle, at least a part of the XR/PCC object may be output to overlap the object on the screen. For example, the self-driving vehicle may output XR/PCC objects corresponding to objects such as a road, another vehicle, a traffic light, a traffic sign, a two-wheeled vehicle, a pedestrian, and a building.

The virtual reality (VR) technology, the augmented reality (AR) technology, the mixed reality (MR) technology and/or the point cloud compression (PCC) technology according to the embodiments are applicable to various devices.

In other words, the VR technology is a display technology that provides only real-world objects, backgrounds, and the like as CG images. On the other hand, the AR technology refers to a technology for showing a CG image virtually created on a real object image. The MR technology is similar to the AR technology described above in that virtual objects to be shown are mixed and combined with the real world. However, the MR technology differs from the AR technology makes a clear distinction between a real object and a virtual object created as a CG image and uses virtual objects as complementary objects for real objects, whereas the MR technology treats virtual objects as objects having the same characteristics as real objects. More specifically, an example of MR technology applications is a hologram service.

Recently, the VR, AR, and MR technologies are sometimes referred to as extended reality (XR) technology rather than being clearly distinguished from each other. Accordingly, embodiments of the present disclosure are applicable to all VR, AR, MR, and XR technologies. For such technologies, encoding/decoding based on PCC, V-PCC, and G-PCC techniques may be applied.

The PCC method/device according to the embodiments may be applied to a vehicle that provides a self-driving service.

A vehicle that provides the self-driving service is connected to a PCC device for wired/wireless communication.

When the point cloud data transmission and reception device (PCC device) according to the embodiments is connected to a vehicle for wired/wireless communication, the device may receive and process content data related to an AR/VR/PCC service that may be provided together with the self-driving service and transmit the processed content data to the vehicle. In the case where the point cloud data transmission and reception device is mounted on a vehicle, the point cloud transmitting and reception device may receive and process content data related to the AR/VR/PCC service according to a user input signal input through a user interface device and provide the processed content data to the user. The vehicle or the user interface device according to the embodiments may receive a user input signal. The user input signal according to the embodiments may include a signal indicating the self-driving service.

The method/device according to the embodiments includes a point cloud data transmission apparatus (e.g., a transmission apparatus 10000 of FIG. 1, a transmission apparatus of FIG. 18), an encoder of the transmission apparatus (e.g., For example, the point cloud video encoder 10002 of FIG. 1, the encoder of the FIG. 4, the encoder of FIG. 15), the file encapsulator of the transmitting device (e.g., file/segment encapsulation of the system to which the transmitting device of FIG. 20 is connected) The router 20004, the pre-processor of FIG. 21, the file/segment encapsulator 21009 of the system to which the encoder is connected), a point cloud data receiving apparatus according to embodiments (e.g., the receiving apparatus 10005 of FIG. 1), the receiving device of FIG. 19), the decoder of the receiving device (point cloud video decoder 10008 of FIG. 1, the decoder of FIG. 16, the decoder of FIG. 17), the file decapsulator of the receiving device (e.g., FIG. 20 Refers to the file/segment decapsulator 20005 of the system to which the receiving device of is connected, the processor of FIG. 22, the file/segment decapsulator 22000 of the system to which the decoder is connected).

Video-based point cloud compression (V-PCC) described in this specification is the same as visual volumetric video-based coding (V3C). The terms V-PCC and V3C according to embodiments may be used interchangeably and may have the same meaning.

The method/device according to the embodiments may generate and transmit/receive 3D region information about V-PCC content for support of spatial access of V-PCC content and 2D region related metadata (for example, see FIGS. 25 to 45, etc.) in a video or atlas frame associated therewith according to a user viewport.

The method/device according to the embodiments may generate and transmit/receive 3D region information about a point cloud in a point cloud bitstream (for example, see FIG. 25) and 2D region related information (for example, see FIGS. 25 to 45) on a video or atlas frame related thereto.

The method/device according to the embodiments may store and transmit/receive 3D region information about a point cloud in a file (e.g., see FIGS. 40 and 41) and 2D region related information (e.g., FIGS. 25 to 45) on a video or atlas frame associated therewith.

The method/device according to the embodiments may store and transmit/receive 3D region information about a point cloud associated with an image item in a file (e.g., see FIG. 46) and 2D region related information on a video or atlas frame associated therewith.

The method/device according to the embodiments may group tracks including data related to a 3D region of point cloud data and generate and transmit/receive signaling information related thereto (see FIGS. 44 and 45).

The method/device according to the embodiments may group tracks including data related to a 2D region and generate and transmit/receive signaling information related thereto (see FIGS. 44 and 45, etc.).

Figure 26:
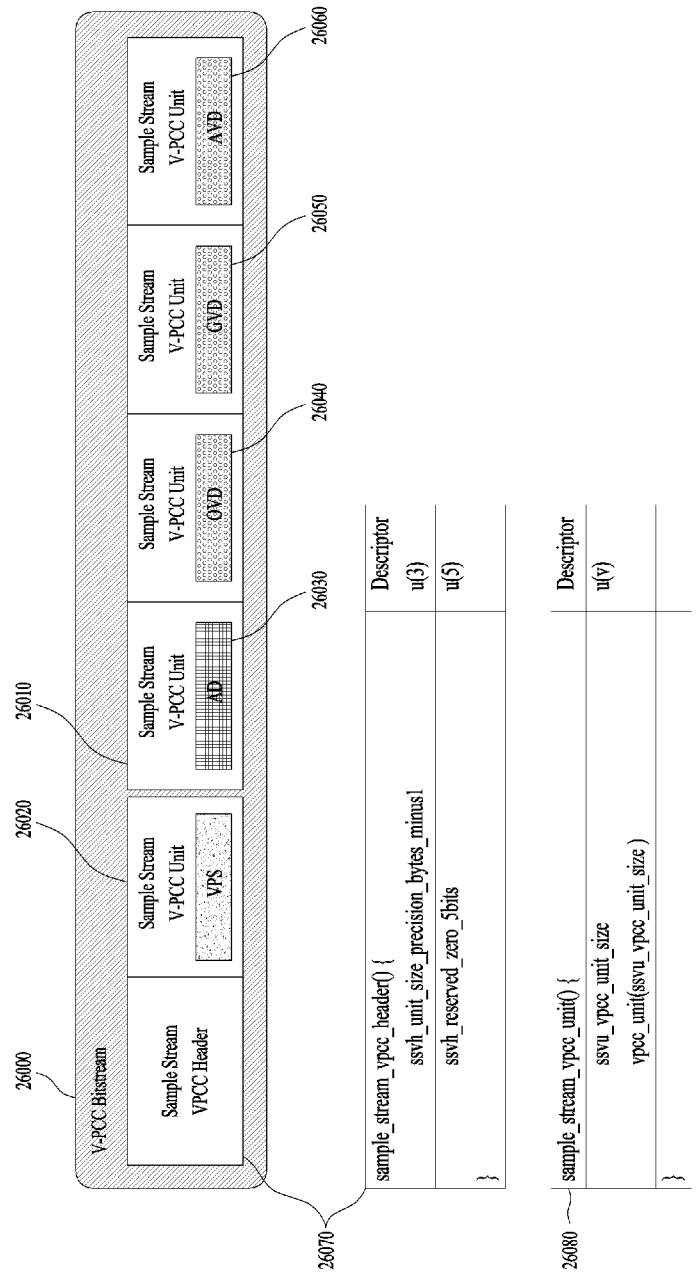
FIG. 26 shows the structure of a bitstream containing point cloud data according to embodiments.

The encoder of the V-PCC system of FIG. 20 (corresponding to the encoder 10002 of FIG. 1, etc.) encodes point cloud data to generate a V-PCC bitstream (see FIG. 26, etc.). Proposed herein is a transmitter or a receiver (see FIG. 1, etc.) for providing a point cloud content service that the file/segment encapsulator 20004 of the V-PCC system efficiently stores the V-PCC bitstream in tracks of a file (see FIGS. 40 and 41, etc.) and provides signaling therefor.

Embodiments relate to a file storage technique for efficiently storing V-PCC bitstream in a track in a file, generating signaling information thereon, and supporting efficient access to the stored V-PCC bitstream. Embodiments also relates to a technique for dividing and storing a V-PCC bitstream into one or more tracks in a file in relation to/combination with the file storage technique.

Figure 24:
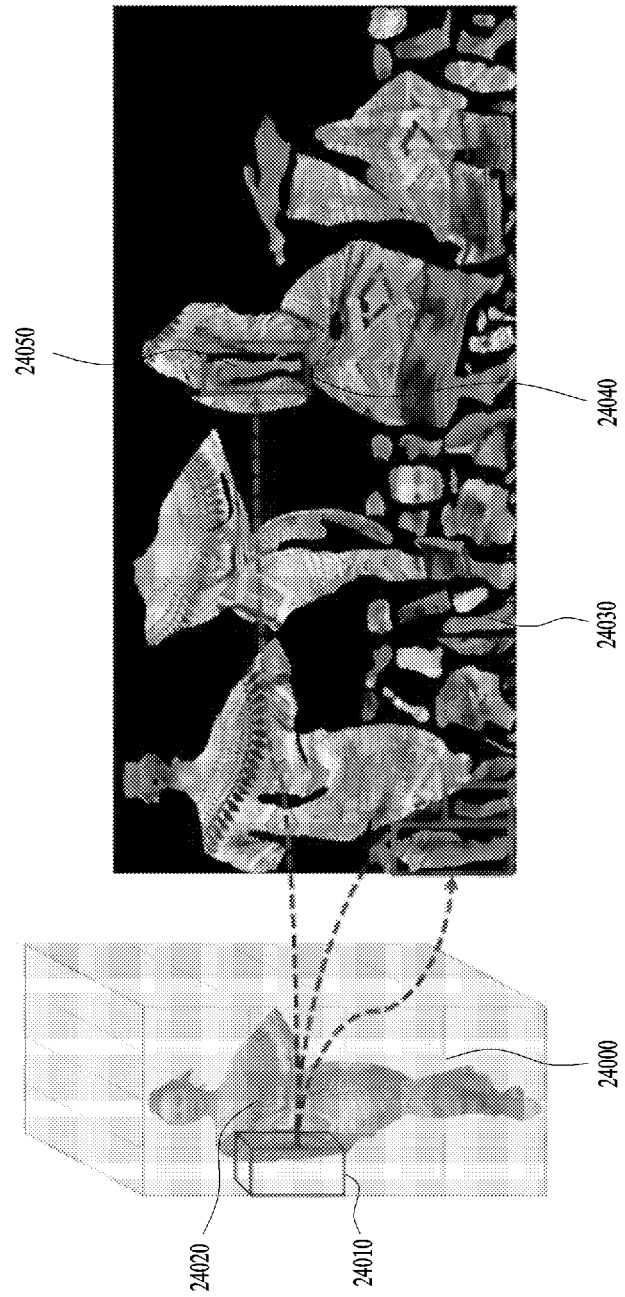
FIG. 24 illustrates a relationship between a 3D region of a point cloud and regions on a video frame according to embodiments.

FIG. 24 illustrates a relationship between a 3D region of a point cloud and regions on a video frame according to embodiments.

A portion of a point cloud object/data rather than the entirety thereof may be rendered or displayed on the user viewport due to the zoom-in operation by the user or change of the user viewport. The operations may be performed efficiently when the PCC decoder/player (FIG. 1, FIG. 20, etc.) decodes or processes video or atlas data associated with the portion of the point cloud data rendered or displayed on the user viewport. In other words, efficient operations may be ensured in terms of low latency when the operation of decoding or processing video or atlas data associated with point cloud data of a portion/region that is not rendered or displayed is not performed.

A method/device according to embodiments may encode/transmit and decode/receive point cloud data that changes over time, that is, dynamic point cloud data. For example, dynamic point cloud data is data in which the number of points in the point cloud changes or the position of the point cloud changes over time. In this case, a point cloud displayed in the same three-dimensional region may change over time.

Accordingly, a PCC decoder/player corresponding to the method/device according to the embodiments may make a spatial access or partial access to the point cloud data rendered/displayed on the user viewport.

Accordingly, the method/device according to the embodiments transmits information for 2D region information in a video frame associated with a three-dimensional region of a point cloud that may change over time in a V-PCC bitstream or in the form of signaling or metadata.

The reception device and the renderer according to the embodiments may render or display a portion of a point cloud object/data rather than the entirety thereof on the user viewport due to the zoom-in operation by the user or change of the user viewport.

The PCC decoder/player according to the embodiments may decode or process video or atlas data associated with the portion of the point cloud data rendered or displayed on the user viewport for an efficient process.

The PCC decoder/player according to the embodiments may not perform the operation of decoding or processing video or atlas data associated with point cloud data of a portion/region that is not rendered or displayed, for an efficient process.

The data 24020 associated with a 3D region 24010 of the point cloud for an object 24000 may be associated with video data 24050 of one or more 2D regions 24040 within a video frame 24030.

In the case of dynamic point cloud data (data in which the number of points in the point cloud changes or the location of the point cloud changes over time), the point cloud displayed in the same three-dimensional region may change over time.

Accordingly, in order to access the space or portion of the point cloud data rendered/displayed on the user viewport, the PCC decoder/player according to the embodiments may include 2D region information about a video frame associated with a 3D region of the point cloud that may change over time in a V-PCC bitstream 25000 or in a file (e.g., FIG. 40) in the form of signaling or metadata.

Figure 25:
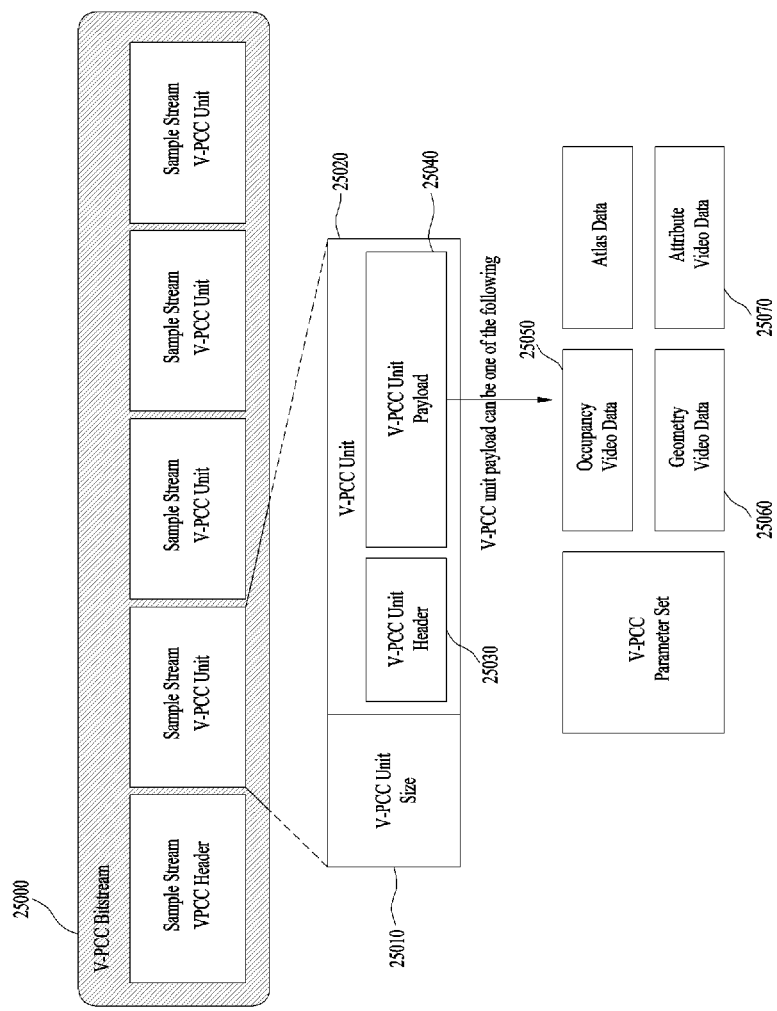
FIG. 25 shows the structure of a bitstream containing point cloud data according to embodiments.

FIG. 25 shows the structure of a bitstream containing point cloud data according to embodiments.

The bitstream 25000 of FIG. 25 corresponds to the bitstream 26000 of FIG. 26. The bitstreams of FIGS. 25 and 26 are generated by the transmission device 10000 of FIG. 1, the point cloud video encoder 10002 of FIG. 1, the encoder of FIG. 4, the encoder of FIG. 15, the transmission device of FIG. 18, the processor 20001 of FIG. 20, and video/image encoder 20002 of FIG. 20, the processors 21001 to 21006 of FIG. 21, the video/image encoder 21007, 21008 of FIG. 21, and the like.

The bitstreams of FIGS. 25 and 26 are stored in a container (the file of FIGS. 40 and 41, etc.) by the file/segment encapsulator of FIG. 1, the file/segment encapsulator 20004 of FIG. 20, the file/segment encapsulator 21009 of FIG. 20, or the like.

The bitstreams of bitstreams of FIGS. 25 and 26 are transmitted by the transmitter 10004 of FIG. 1 or the like.

The reception device 10005, the receiver 10006, or the like of FIG. 1 receives the container (the file of FIGS. 40 and 41, etc.) including the bitstreams of FIGS. 25 and 26.

The bitstreams of FIGS. 25 and 26 are parsed from the container by the file/segment decapsulator 10007 of FIG. 1, the file/segment decapsulator 20005 of FIG. 20, the file/segment decapsulator 22000 of FIG. 22, or the like.

The bitstreams of FIGS. 25 and 26 are decoded, reconstructed, and provided to the user by the point cloud video decoder 10008 of FIG. 1, the decoder of FIG. 16, the decoder of FIG. 17, the reception device of FIG. 19, the video/image decoder 20006 of FIG. 20, the video/image decoders 22001 and 22002 of FIG. 22, the processor 22003 of FIG. 22, or the like.

A sample stream V-PCC unit included in the bitstream 25000 for point cloud data according to embodiments may include a V-PCC unit size 25010 and a V-PCC unit 25020.

The terms employed in this document are defined as follows: VPS (V-PCC parameter set); AD (Atlas data); OVD (Occupancy video data); GVD (Geometry video data); AVD (Attribute video data).

Each V-PCC unit 25020 may include a V-PCC unit header 25030 and a V-PCC unit payload 25040. The V-PCC unit header 25030 may describe a V-PCC unit type. The V-PCC unit header of attribute video data may describe an attribute type, an index thereof, multiple instances of the same attribute type supported, and the like.

The unit payloads 25050, 25060, and 25070 of occupancy, geometry and attribute video data may correspond to video data units. For example, the occupancy video data, geometry video data, and attribute video data 25050, 25060, and 25070 may be HEVC NAL units. Such video data may be decoded by a video decoder according to embodiments.

FIG. 26 shows the structure of a bitstream containing point cloud data according to embodiments.

FIG. 26 shows the structure of a bitstream containing point cloud data to be encoded or decoded according to embodiments, as described with reference to FIGS. 18 to 25.

The method/device according to the embodiments generates a bitstream for a dynamic point cloud object. In this regard, a file format for the bitstream is proposed, and a signaling scheme therefor is provided.

The method/device according to the embodiments includes a transmitter, a receiver, and/or a processor for providing a point cloud content service of efficiently storing a V-PCC (=V3C) bitstream in a track of a file and providing signaling therefor.

The method/device according to the embodiments provides a data format for storing a V-PCC bitstream containing point cloud data. Accordingly, the reception method/device according to the embodiments provides a data storage and signaling method for receiving point cloud data and efficiently accessing the point cloud data. Therefore, based on the storage technique for a file containing point cloud data for efficient access, the transmitter and/or the receiver may provide a point cloud content service.

The method/device according to the embodiments efficiently stores a point cloud bitstream (V-PCC bitstream) in a track of a file. It generates signaling information about an efficient storage technique and stores the same in the file. To support efficient access to the V-PCC bitstream stored in the file, a technique for partitioning and storing the V-PCC bitstream into one or more tracks in the file may be provided in addition to (or by modifying/in combination with) the file storage technique according to the embodiments.

The terms employed in this document are defined as follows:

VPS: V-PCC parameter set; AD: Atlas data; OVD: Occupancy video data; GVD: Geometry video data; AVD: Attribute video data; ACL: Atlas Coding Layer; AAPS: Atlas adaptation parameter set; ASPS: Atlas sequence parameter set, which may be a syntax structure containing syntax elements according to embodiments that apply to zero or more entire coded atlas sequences (CASs) as determined by the content of a syntax element found in the ASPS referred to by a syntax element found in each tile group header.

AFPS: Atlas frame parameter set, which may include a syntax structure containing syntax elements that apply to zero or more entire coded atlas frames as determined by the content of a syntax element found in the tile group header.

SEI: Supplemental enhancement information.

Atlas: A collection of 2D bounding boxes, for example, patches projected into a rectangular frame that corresponds to a 3D bounding box in 3D space. Atlas may represent a subset of a point cloud.

Atlas sub-bitstream: an extracted sub-bitstream from the V-PCC bitstream containing a part of an atlas NAL bitstream.

V-PCC content: A point cloud encoded based on V-PCC (V3C).

V-PCC track: A volumetric visual track which carries the atlas bitstream of the V-PCC bitstream.

V-PCC component track: A video track which carries 2D video encoded data for any of the occupancy map, geometry, or attribute component video bitstreams of the V-PCC bitstream.

Embodiments for supporting partial access of a dynamic point cloud object will be described. Embodiments include atlas tile group information associated with some data of a V-PCC object included in each spatial region at a file system level. Further, embodiments include an extended signaling scheme for label and/or patch information included in each atlas tile group.

FIG. 26 shows a structure of a point cloud bitstream included in data transmitted and received by the methods/devices according to the embodiments.

A method of compressing and decompressing point cloud data according to embodiments refers to volumetric encoding and decoding of point cloud visual information.

A point cloud bitstream (which may be referred to as a V-PCC bitstream or V3C bitstream) 26000 containing a coded point cloud sequence (CPCS) may include sample stream V-PCC units 26010. The sample stream V-PCC units 26010 may carry V-PCC parameter set (VPS) data 26020, an atlas bitstream 26030, a 2D video encoded occupancy map bitstream 26040, a 2D video encoded geometry bitstream 26050, and zero or one or more 2D video encoded attribute bitstreams 26060.

The point cloud bitstream 26000 may include a sample stream VPCC header 26070.

ssvh_unit_size_precision_bytes_minus1: A value obtained by adding 1 to this value specifies the precision, in bytes, of the ssvu_vpcc_unit_size element in all sample stream V-PCC units. ssvh_unit_size_precision_bytes_minus1 may be in the range of 0 to 7.

The syntax 26080 of the sample stream V-PCC unit 26010 is configured as follows. Each sample stream V-PCC unit may include a type of one of V-PCC units of VPS, AD, OVD, GVD, and AVD. The content of each sample stream V-PCC unit may be associated with the same access unit as the V-PCC unit included in the sample stream V-PCC unit.

ssvu_vpcc_unit_size: specifies the size, in bytes, of the subsequent vpcc_unit. The number of bits used to represent ssvu_vpcc_unit_size is equal to (ssvh_unit_size_precision_bytes_minus1+1)*8.

Figure 40:
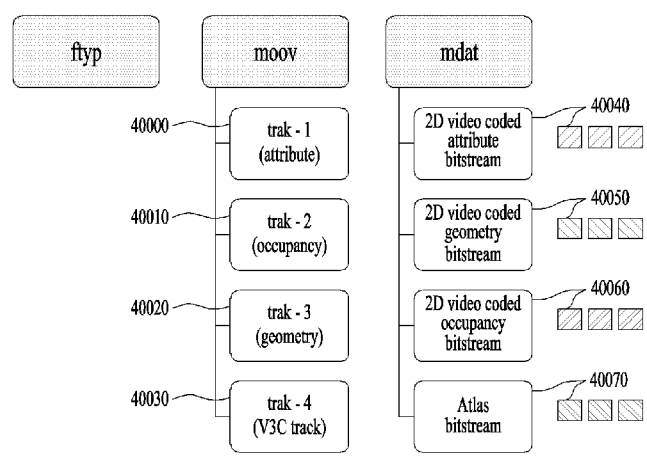
FIG. 40 shows the structure of an encapsulated V-PCC data container according to embodiments.
Figure 41:
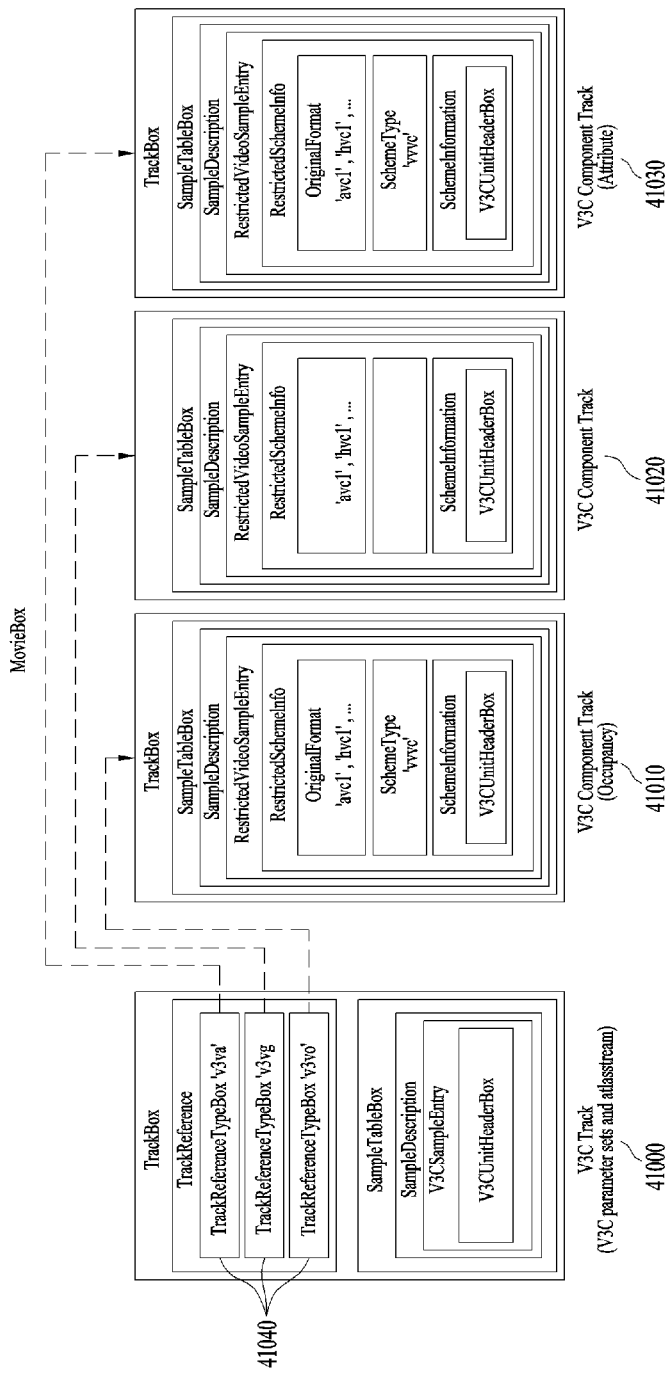
FIG. 41 shows the structure of an encapsulated V-PCC data container according to embodiments.

The method/device according to the embodiments receives the bitstream of FIG. 26 containing the encoded point cloud data, and generates a file as shown in FIGS. 40 and 41 through the encapsulator 20004 or 21009.

The method/device according to the embodiments receives a file as shown in FIGS. 40 and 41 and decodes point cloud data through the decapsulator 22000 or the like.

The VPS 26020 and/or AD 26030 are encapsulated in track-4 (V3C track) 40030.

The OVD 26040 is encapsulated in track-2 (occupancy track) 40010.

The GVD 26050 is encapsulated in track-3 (geometry track) 40020.

The AVD 26060 is encapsulated in track-1 (attribute track) 40000.

FIG. 27 shows a V-PCC unit and a V-PCC unit header according to embodiments.

FIG. 27 shows the syntaxes of the V-PCC unit 25020 and the V-PCC unit header 25030 described above with reference to FIG. 25.

A V-PCC bitstream according to embodiments may contain a series of V-PCC sequences.

A vpcc unit type with a value of vuh_unit_type equal to VPCC_VPS may be expected to be the first V-PCC unit type in a V-PCC sequence. All other V-PCC unit types follow this unit type without any additional restrictions in their coding order. A V-PCC unit payload of a V-PCC unit carrying occupancy video, attribute video, or geometry video is composed of one or more NAL units.

A VPCC unit may include a header and a payload.

The VPCC unit header may include the following information based on the VUH unit type.

vuh_unit_type indicates the type of the V-PCC unit 25020 as follows.

| vuh_unit_type | Identifier | V-PCC Unit Type | Description |
| --- | --- | --- | --- |
| 0 | VPCC_VPS | V-PCC parameter set | V-PCC level parameters |
| 1 | VPCC_AD | Atlas data | Atlas information |
| 2 | VPCC_OVD | Occupancy Video Data | Occupancy information |
| 3 | VPCC_GVD | Geometry Video Data | Geometry information |
| 4 | VPCC_AVD | Attribute Video Data | Attribute information |
| 5 . . . 31 | VPCC_RSVD | Reserved | — |

When vuh_unit_type indicates attribute video data (VPCC_AVD), geometry video data (VPCC_GVD), occupancy video data (VPCC_OVD), or atlas data (VPCC_AD), vuh_vpcc_parameter_set ID and vuh_atlas_id is carried in the unit header. A parameter set ID and an atlas ID associated with the V-PCC unit may be delivered.

When the unit type is atlas video data, the header of the unit may carry an attribute index (vuh_attribute_index), an attribute partition index (vuh_attribute_partition_index), a map index (vuh_map_index), and an auxiliary video flag (vuh_auxiliary_video_flag).

When the unit type is geometry video data, vuh_map_index and vuh_auxiliary_video_flag may be carried.

When the unit type is occupancy video data or atlas data, the header of the unit may contain additional reserved bits.

vuh_vpcc_parameter_set_id specifies the value of vps_vpcc_parameter_set_id for the active V-PCC VPS. Through the vpcc_parameter_set_id in the header of the current V-PCC unit, the ID of the VPS parameter set may be known and the relationship between the V-PCC unit and the V-PCC parameter set may be announced.

vuh_atlas_id specifies the index of the atlas that corresponds to the current V-PCC unit. Through the vuh_atlas_id in the header of the current V-PCC unit, the index of the atlas may be known, and the atlas corresponding to the V-PCC unit may be announced.

vuh_attribute_index indicates the index of the attribute data carried in the Attribute Video Data unit.

vuh_attribute_partition_index indicates the index of the attribute dimension group carried in the Attribute Video Data unit.

vuh_map_index indicates, when present, the map index of the current geometry or attribute stream.

vuh_auxiliary_video_flag equal to 1 indicates that the associated geometry or attribute video data unit is a RAW and/or EOM coded points video only. vuh_auxiliary_video_flag equal to 0 indicates that the associated geometry or attribute video data unit may contain RAW and/or EOM coded points.

FIG. 28 shows the payload of a V-PCC unit according to embodiments.

FIG. 28 shows the syntax of the V-PCC unit payload 25040.

When vuh_unit_type is V-PCC parameter set (VPCC_VPS), the V-PCC unit payload contains vpcc_parameter_set( ).

When vuh_unit_type is V-PCC atlas data (VPCC_AD), the V-PCC unit payload contains atlas_sub_bitstream( ).

When vuh_unit_type is V-PCC accumulating video data (VPCC_OVD), geometric video data (VPCC_GVD), or attribute video data (VPCC_AVD), the V-PCC unit payload contains video_sub_bitstream( ).

FIG. 29 shows a V-PCC parameter set according to embodiments.

FIG. 29 shows the syntax of a parameter set when the payload 25040 of the unit 25020 of the bitstream according to the embodiments contains the parameter set as shown in FIG. 28.

The VPS of FIG. 29 may include the following elements.

profile_tier_level( ) specifies restrictions on the bitstreams and hence limits on the capabilities needed to decode the bitstreams. Profiles, tiers, and levels may also be used to indicate interoperability points between individual decoder implementations.

vps_vpcc_parameter_set_id may provide an identifier for the V-PCC VPS for reference by other syntax elements.

sps_bounding_box_present_flag is a flag indicating whether there is information on the overall bounding box of a point cloud object/content in the bitstream (which may be a bounding box that may include the entirety of a bounding box that changes over time. sps_bounding_box_present_flag equal to 1 indicates overall bounding box offset and the size information of point cloud content carried in this bitstream).

When sps_bounding_box_present_flag has a specific value, the following bounding box elements are included in the VPS.

sps_bounding_box_offset_x indicates the x offset of overall bounding box offset and the size information of point cloud content carried in this bitstream in the Cartesian coordinates. When not present, the value of sps_bounding_box_offset_x may be inferred to be 0.

sps_bounding_box_offset_y indicates the y offset of overall bounding box offset and the size information of point cloud content carried in this bitstream in the Cartesian coordinates. When not present, the value of sps_bounding_box_offset_y may be inferred to be 0.

sps_bounding_box_offset_z indicates the z offset of overall bounding box offset and the size information of point cloud content carried in this bitstream in the Cartesian coordinates. When not present, the value of sps_bounding_box_offset_z may be inferred to be 0.

sps_bounding_box_size width indicates the width of overall bounding box offset and the size information of point cloud content carried in this bitstream in the Cartesian coordinates. When not present, the value of sps_bounding_box_size width may be inferred to be 1.

sps_bounding_box_size_height indicates the height of overall bounding box offset and the size information of point cloud content carried in this bitstream in the Cartesian coordinates. When not present, the value of sps_bounding_box_size_height may be inferred to be 1.

sps_bounding_box_size_depth indicates the depth of overall bounding box offset and the size information of point cloud content carried in this bitstream in the Cartesian coordinates. When not present, the value of sps_bounding_box_size_depth may be inferred to be 1.

sps_bounding_box_changed_flag is a flag indicating whether the bounding box of point cloud data contained in the bitstream changes over time. The flag equal to 1 may indicate that the bounding box of the point cloud data changes over time.

sps_bounding_box_info_flag is a flag indicating whether SEI including bounding box information about the point cloud data is contained in the bitstream. The flag equal to 1 may indicate that 3D bounding box SEI (see FIG. 35, etc.) including bounding box information about the point cloud data is contained in the bitstream. In this case, a PCC play corresponding to the method/device according to the embodiments may inform that the information included in the SEI can be acquired and used.

vps_atlas_count_minus1 plus 1 indicates the total number of supported atlases in the current bitstream.

Depending on the number of atlases, the following parameters may be further included in the parameter set.

vps_frame_width[j] indicates the V-PCC frame width in terms of integer luma samples for the atlas with index j. This frame width is the nominal width that is associated with all V-PCC components for the atlas with index j.

vps_frame_height[j] indicates the V-PCC frame height in terms of integer luma samples for the atlas with index j. This frame height is the nominal height that is associated with all V-PCC components for the atlas with index j.

vps_map_count_minus1[j] plus 1 indicates the number of maps used for encoding the geometry and attribute data for the atlas with index j.

When vps_map_count_minus1[j] is greater than 0, the following parameters may be further included in the parameter set.

Depending on the value of vps_map_count_minus1[j], the following parameters may be further included in the parameter set.

vps_multiple_map_streams_present_flag[j] equal to 0 indicates that all geometry or attribute maps for the atlas with index j are placed in a single geometry or attribute video stream, respectively. vps_multiple_map_streams_present_flag[j] equal to 1 indicates that all geometry or attribute maps for the atlas with index j are placed in separate video streams.

If vps_multiple_map_streams_present_flag[j] indicates 1, vps_map_absolute_coding_enabled_flag[j][i] may be further included in the parameter set. Otherwise, vps_map_absolute_coding_enabled_flag[j][i] may have a value of 1.

vps_map_absolute_coding_enabled_flag[j][i] equal to 1 indicates that the geometry map with index i for the atlas with index j is coded without any form of map prediction. vps_map_absolute_coding_enabled_flag[j][i] equal to 0 indicates that the geometry map with index i for the atlas with index j is first predicted from another, earlier coded map, prior to coding.

vps_map_absolute_coding_enabled_flag[j][0] equal to 1 indicates that the geometry map with index 0 is coded without map prediction.

If vps_map_absolute_coding_enabled_flag[j][i] is 0 and i is greater than 0, vps_map_predictor_index_diff[j][i] may be further included in the parameter set. Otherwise, vps_map_predictor_index_diff[j][i] may be 0.

vps_map_predictor_index_diff[j][i] is used to compute the predictor of the geometry map with index i for the atlas with index j when vps_map_absolute_coding_enabled_flag[j][i] is equal to 0.

vps_auxiliary_video_present_flag[j] equal to 1 indicates that auxiliary information for the atlas with index j, i.e. RAW or EOM patch data, may be stored in a separate video stream, referred to as the auxiliary video stream. vps_auxiliary_video_present_flag[j] equal to 0 indicates that auxiliary information for the atlas with index j is not be stored in a separate video stream.

vps_raw_patch_enabled_flag[j] equal to 1 indicates that patches with RAW coded points for the atlas with index j may be present in the bitstream.

When vps_raw_patch_enabled_flag[j] has a specific value, the following elements are included in the VPS.

vps_raw_separate_video_present_flag[j] equal to 1 indicates that RAW coded geometry and attribute information for the atlas with index j may be stored in a separate video stream occupancy_information( ) includes occupancy video related parameter sets.

geometry_information( ) includes geometry video related parameter sets.

attribute_information( ) includes attribute video related parameter sets.

vps_extension_present_flag equal to 1 specifies that the syntax element vps_extension_length is present in vpcc_parameter_set syntax structure. vps_extension_present_flag equal to 0 specifies that syntax element vps_extension_length is not present.

vps_extension_length_minus1 plus 1 specifies the number of vps_extension_data_byte elements that follow this syntax element.

Depending on vps_extension_length_minus1, extension data may be further included in the parameter_set.

vps_extension_data byte may have any value that may be included through extension.

Figure 30:
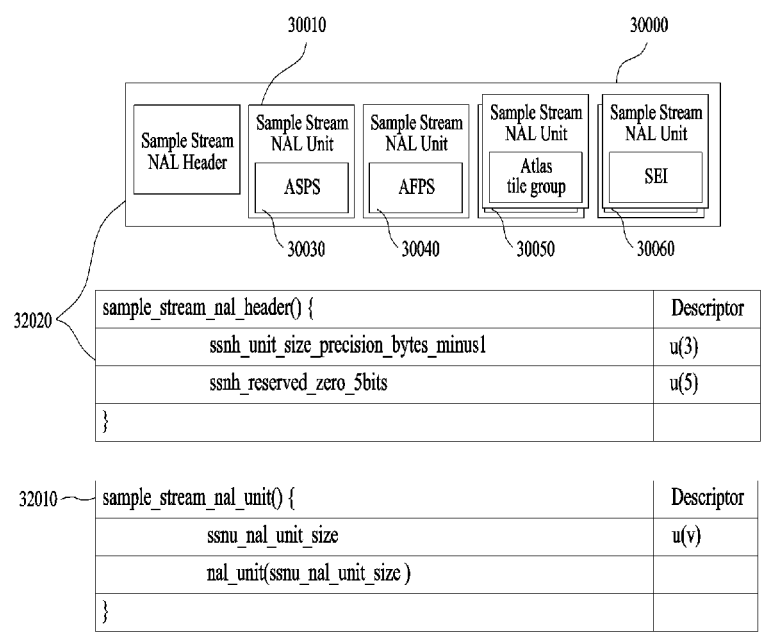
FIG. 30 shows the structure of an atlas bitstream according to embodiments.

FIG. 30 shows the structure of an atlas bitstream according to embodiments.

FIG. 30 shows an example in which the payload 25040 of the unit 25020 of the bitstream 25000 of FIG. 25 carries an atlas sub-bitstream 30000

The V-PCC unit payload of the V-PCC unit carrying the atlas sub-bitstream may include one or more sample stream NAL units 30010.

The atlas sub-bitstream 30000 according to the embodiments may include a sample stream NAL header 30020 and one or more sample stream NAL units 30010.

The sample stream NAL header 30020 may include ssnh_unit_size_precision_bytes_minus1. ssnh_unit_size_precision_bytes_minus1 plus 1 specifies the precision, in bytes, of the ssnu_nal_unit_size element in all sample stream NAL units. ssnh_unit_size_precision_bytes_minus1 may be in the range of 0 to 7.

The sample stream NAL unit 30010 may include ssnu_nal_unit_size.

ssnu_nal_unit_size specifies the size, in bytes, of the subsequent NAL_unit. The number of bits used to represent ssnu_nal_unit_size may be equal to (ssnh_unit_size_precision_bytes_minus1+1)*8.

Each sample stream NAL unit may include an atlas sequence parameter set (ASPS) 30030, an atlas frame parameter set (AFPS) 30040, one or more pieces of atlas tile group information 30050, and one or more pieces of supplemental enhancement information (SEI) 30060, each of which will be described below. According to embodiments, the atlas tile group may be referred to as an atlas tile.

The NAL unit may include nal_unit_header( ) and NumBytesInRbsp.

NumBytesInRbsp indicates bytes corresponding to the payload of the NAL unit, and the initial value thereof is set to 0.

nal_unit_header( ) may include nal_forbidden_zero_bit, nal_unit_type, nal_layer_id, and nal_temporal_id_plus1.

nal_forbidden_zero_bit is a field used for error detection of the NAL unit and should be 0.

nal_unit_type indicates the type of the RBSP data structure included in the NAL unit as shown in FIG. 32.

nal_layer_id specifies the identifier of the layer to which an ACL NAL unit belongs or the identifier of a layer to which a non-ACL NAL unit applies.

nal_temporal_id_plus1 minus 1 specifies a temporal identifier for the NAL unit.

The nal_unit_type may include the following types:

NAL_TRAIL: A coded tile group of a non-TSA, non STSA trailing atlas frame may be included in the NAL unit. The RBSP syntax structure of the NAL unit is atlas_tile_group_layer_rbsp( ) or atlas_tile_layer_rbsp( ). The type class of the NAL unit is ACL. According to embodiments, a tile group may correspond to a tile.

NAL TSA: A coded tile group of a TSA atlas frame may be included in the NAL unit. The RBSP syntax structure of the NAL unit is atlas_tile_group_layer_rbsp( ) or atlas_tile_layer_rbsp( ). The type class of the NAL unit is ACL.

NAL_STSA: A coded tile group of an STSA atlas frame may be included in the NAL unit. The RBSP syntax structure of the NAL unit is atlas_tile_group_layer_rbsp( ) or atlas_tile_layer_rbsp( ). The type class of the NAL unit is ACL.

NAL_RADL: A coded tile group of an RADL atlas frame may be included in the NAL unit. The RBSP syntax structure of the NAL unit is atlas_tile_group_layer_rbsp( ) or atlas_tile_layer_rbsp( ). The type class of the NAL unit is ACL.

NAL_RASL: A coded tile group of an RASL atlas frame may be included in the NAL unit. The RBSP syntax structure of the NAL unit is atlas_tile_group_layer_rbsp( ) or aatlas_tile_layer_rbsp( ). The type class of the NAL unit is ACL.

NAL_SKIP: A coded tile group of a skipped atlas frame may be included in the NAL unit. The RBSP syntax structure of the NAL unit is atlas_tile_group_layer_rbsp( ) or atlas_tile_layer_rbsp( ). The type class of the NAL unit is ACL.

NAL_RSV_ACL_6 to NAL_RSV_ACL_9: Reserved non-IRAP ACL NAL unit types may be included in the NAL unit. The type class of the NAL unit is ACL.

NAL_BLA_W_LP, NAL_BLA_W_RADL, NAL_BLA_N_LP: A coded tile group of a BLA atlas frame may be included in the NAL unit. The RBSP syntax structure of the NAL unit is atlas_tile_group_layer_rbsp( ) or atlas_tile_layer_rbsp( ). The type class of the NAL unit is ACL.

NAL_GBLA_W_LP, NAL_GBLA_W_RADL, NAL_GBLA_N_LP: A coded tile group of a GBLA atlas frame may be included in the NAL unit. The RBSP syntax structure of the NAL unit is atlas_tile_group_layer_rbsp( ) or atlas_tile_layer_rbsp( ). The type class of the NAL unit is ACL.

NAL_IDR_W_RADL, NAL_IDR_N_LP: A coded tile group of an IDR atlas frame may be included in the NAL unit. The RBSP syntax structure of the NAL unit is atlas_tile_group_layer_rbsp( ) or atlas_tile_layer_rbsp( ). The type class of the NAL unit is ACL.

NAL_GIDR_W_RADL, NAL_GIDR_N_LP: A coded tile group of a GIDR atlas frame may be included in the NAL unit. The RBSP syntax structure of the NAL unit is atlas_tile_group_layer_rbsp( ) or atlas_tile_layer_rbsp( ). The type class of the NAL unit is ACL.

NAL_CRA: A coded tile group of a CRA atlas frame may be included in the NAL unit. The RBSP syntax structure of the NAL unit is atlas_tile_group_layer_rbsp( ) or atlas_tile layer_rbsp( ). The type class of the NAL unit is ACL.

NAL_GCRA: A coded tile group of a GCRA atlas frame may be included in the NAL unit. The RBSP syntax structure of the NAL unit is atlas_tile_group_layer_rbsp( ) or atlas_tile layer_rbsp( ). The type class of the NAL unit is ACL.

NAL_IRAP_ACL_22, NAL_IRAP_ACL_23: Reserved TRAP ACL NAL unit types may be included in the NAL unit. The type class of the NAL unit is ACL.

NAL_RSV_ACL_24 to NAL_RSV_ACL_31: Reserved non-IRAP ACL NAL unit types may be included in the NAL unit. The type class of the NAL unit is ACL.

NAL_ASPS: An atlas sequence parameter set may be included in the NAL unit. The RBSP syntax structure of the NAL unit is atlas_sequence_parameter_set_rbsp( ). The type class of the NAL unit is non-ACL.

NAL_AFPS: An atlas frame parameter set may be included in the NAL unit. The RBSP syntax structure of the NAL unit is atlas_frame_parameter_set_rbsp( ). The type class of the NAL unit is non-ACL.

NAL_AUD: An access unit delimiter may be included in the NAL unit. The RBSP syntax structure of the NAL unit is access_unit_delimiter_rbsp( ). The type class of the NAL unit is non-ACL.

NAL_VPCC_AUD: A V-PCC access unit delimiter may be included in the NAL unit. The RBSP syntax structure of the NAL unit is access_unit_delimiter_rbsp( ). The type class of the NAL unit is non-ACL.

NAL_EOS: The NAL unit type may be end of sequence. The RBSP syntax structure of the NAL unit is end_of_seq_rbsp( ). The type class of the NAL unit is non-ACL.

NAL_EOB: The NAL unit type may be end of bitstream. The RBSP syntax structure of the NAL unit is end of atlas_sub_bitstream_rbsp( ). The type class of the NAL unit is non-ACL.

NAL_FD Filler: The NAL unit type may be filler_data_rbsp( ). The type class of the NAL unit is non-ACL.

NAL_PREFIX_NSEI, NAL_SUFFIX_NSEI: The NAL unit type may be non-essential supplemental enhancement information. The RBSP syntax structure of the NAL unit is sei_rbsp( ). The type class of the NAL unit is non-ACL.

NAL_PREFIX_ESEI, NAL_SUFFIX_ESEI: The NAL unit type may be essential supplemental enhancement information. The RBSP syntax structure of the NAL unit is sei_rbsp( ). The type class of the NAL unit is non-ACL.

NAL_AAPS: The NAL unit type may be atlas adaptation parameter set. The RBSP syntax structure of the NAL unit is atlas_adaptation_parameter_set_rbsp( ). The type class of the NAL unit is non-ACL.

NAL_RSV_NACL_44 to NAL_RSV_NACL_47: The NAL unit type may be reserved non-ACL NAL unit types. The type class of the NAL unit is non-ACL.

NAL_UNSPEC_48 to NAL_UNSPEC_63: The NAL unit type may be unspecified non-ACL NAL unit types. The type class of the NAL unit is non-ACL.

FIG. 31 shows an atlas sequence parameter set according to embodiments.

FIG. 31 shows the syntax of an RBSP data structure included in a NAL unit when the NAL unit type is atlas sequence parameter.

Each sample stream NAL unit may contain one of an atlas parameter set, for example, ASPS, AAPS, or AFPS, one or more atlas tile group about, and SEIs.

The ASPS may contain syntax elements that apply to zero or more entire coded atlas sequences (CASs) as determined by the content of a syntax element found in the ASPS referred to by a syntax element found in each tile group header.

The ASPS may include the following elements.

asps_atlas_sequence_parameter_set_id may provide an identifier for the atlas sequence parameter set for reference by other syntax elements.

asps_frame_width indicates the atlas frame width in terms of integer luma samples for the current atlas.

asps_frame_height indicates the atlas frame height in terms of integer luma samples for the current atlas.

asps_log2_patch_packing_block_size specifies the value of the variable PatchPackingBlockSize that is used for the horizontal and vertical placement of the patches within the atlas.

asps_log2_max_atlas_frame_order_cnt_lsb_minus4 specifies the value of the variable MaxAtlasFrmOrderCntLsb that is used in the decoding process for the atlas frame order count.

asps_max_dec_atlas_frame_buffering_minus1 plus 1 specifies the maximum required size of the decoded atlas frame buffer for the CAS in units of atlas frame storage buffers.

asps_long_term_ref_atlas_frames_flag equal to 0 specifies that no long term reference atlas frame is used for inter prediction of any coded atlas frame in the CAS. asps_long_term_ref_atlas_frames_flag equal to 1 specifies that long term reference atlas frames may be used for inter prediction of one or more coded atlas frames in the CAS.

asps_num_ref_atlas_frame_lists_in_asps specifies the number of the ref_list_struct(rlsIdx) syntax structures included in the atlas sequence parameter set.

ref_list_struct(i) may be included in the atlas sequence parameter set according to the value of asps_num_ref_atlas_frame_lists_in_asps.

asps_use_eight_orientations_flag equal to 0 specifies that the patch orientation index for a patch with index j in a frame with index i, pdu_orientation_index[i][j], is in the range of 0 to 1, inclusive. asps_use_eight_orientations_flag equal to 1 specifies that the patch orientation index for a patch with index j in a frame with index i, pdu_orientation_index[i][j], is in the range of 0 to 7, inclusive.

asps_45degree_projection_patch_present_flag equal to 0 specifies that the patch projection information is not signaled for the current atlas tile group. asps_45degree_projection_present_flag equal to 1 specifies that the patch projection information is signaled for the current atlas tile group.

When atgh_type is not SKIP TILE GRP, the following elements may be included in the atlas tile group (or tile) header.

asps_normal_axis_limits_quantization_enabled_flag equal to 1 specifies that quantization parameters shall be signalled and used for quantizing the normal axis related elements of a patch data unit, a merge patch data unit, or an inter patch data unit. If asps_normal_axis_limits_quantization_enabled_flag is equal to 0, then no quantization is applied on any normal axis related elements of a patch data unit, a merge patch data unit, or an inter patch data unit.

When asps_normal_axis_limits_quantization_enabled_flag is 1, atgh_pos_min_z_quantizer may be included in the atlas tile group (or tile) header.

asps_normal_axis_max_delta_value_enabled_flag equal to 1 specifies that the maximum nominal shift value of the normal axis that may be present in the geometry information of a patch with index i in a frame with index j will be indicated in the bitstream for each patch data unit, a merge patch data unit, or an inter patch data unit. If asps_normal_axis_max_delta_value_enabled_flag is equal to 0, then the maximum nominal shift value of the normal axis that may be present in the geometry information of a patch with index i in a frame with index j shall not be indicated in the bitstream for each patch data unit, a merge patch data unit, or an inter patch data unit.

When asps_normal_axis_max_delta_value_enabled_flag is equal to 1, atgh_pos_delta_max_z_quantizer may be included in the atlas tile group (or tile) header.

asps_remove_duplicate_point_enabled_flag equal to 1 indicates that duplicated points are not econstructed for the current atlas, where a duplicated point is a point with the same 2D and 3D geometry coordinates as another point from a lower index map. asps_remove_duplicate_point_enabled_flag equal to 0 indicates that all points are reconstructed.

asps_max_dec_atlas_frame_buffering_minus1 plus 1 specifies the maximum required size of the decoded atlas frame buffer for the CAS in units of atlas frame storage buffers.

asps_pixel_deinterleaving_flag equal to 1 indicates that the decoded geometry and attribute videos for the current atlas contain spatially interleaved pixels from two maps. asps_pixel_deinterleaving_flag equal to 0 indicates that the decoded geometry and attribute videos corresponding to the current atlas contain pixels from only a single map.

asps_patch_precedence_order_flag equal to 1 indicates that patch precedence for the current atlas is the same as the decoding order. asps_patch_precedence_order_flag equal to 0 indicates that patch precedence for the current atlas is the reverse of the decoding order.

asps_patch_size_quantizer_present_flag equal to 1 indicates that the patch size quantization parameters are present in an atlas tile group header. asps_patch_size_quantizer_present flag equal to 0 indicates that the patch size quantization parameters are not present.

When asps_patch_size_quantizer_present_flag is equal to 1, atgh_patch_size_x_info_quantizer and atgh_patch_size_y_info_quantizer may be included in the atlas tile group (or tile) header.

asps_enhanced_occupancy_map_for_depth_flag equal to 1 indicates that the decoded occupancy map video for the current atlas contains information related to whether intermediate depth positions between two depth maps are occupied. asps_eom_patch_enabled_flag equal to 0 indicates that the decoded occupancy map video does not contain information related to whether intermediate depth positions between two depth maps are occupied.

When asps_enhanced_occupancy_map_for_depth_flag or asps_point_local_reconstruction_enabled_flag is equal to 1, asps_map_count_minus1 may be included in the ASPS.

asps_point_local_reconstruction_enabled_flag equal to 1 indicates that point local reconstruction mode information may be present in the bitstream for the current atlas. asps_point_local_reconstruction_enabled_flag equal to 0 indicates that no information related to the point local reconstruction mode is present in the bitstream for the current atlas.

When asps_point_local_reconstruction_enabled_flag is equal to 1, asps_point_local_reconstruction_information may be carried in the atlas sequence parameter set.

asps_map_count_minus1 plus 1 indicates the number of maps that may be used for encoding the geometry and attribute data for the current atlas.

asps_enhanced_occupancy_map_fix_bit_count_minus1 plus 1 indicates the size in bits of the EOM codeword.

When asps_enhanced_occupancy_map_for_depth_flag and asps_map_count_minus1 are set to 0, asps_enhanced_occupancy_map_fix_bit_count_minus1 may be included in the ASPS.

asps_surface_thickness_minus1 plus 1 specifies the maximum absolute difference between an explicitly coded depth value and interpolated depth value when asps_pixel_deinterleaving_enabled_flag (or asps_pixel_interleaving_flag) or asps_point_local_reconstruction_enabled_flag is equal to 1.

When asps_pixel_interleaving_flag or asps_point_local_reconstruction_enabled_flag is equal to 1, the asps_surface_thickness_minus1 may be included in the ASPS.

asps_pixel_interleaving_flag may correspond to asps_map_pixel_deinterleaving_flag.

asps_map_pixel_deinterleaving_flag[i] equal to 1 indicates that decoded geometry and attribute videos corresponding to map with index i in the current atlas contain spatially interleaved pixels corresponding to two maps. asps_map_pixel_deinterleaving_flag[i] equal to 0 indicates that decoded geometry and attribute videos corresponding to map index i in the current atlas contain pixels corresponding to a single map. When not present, the value of asps_map_pixel_deinterleaving_flag[i] may be inferred to be 0.

asps_point_local_reconstruction_enabled_flag equal to 1 indicates that point local reconstruction mode information may be present in the bitstream for the current atlas. asps_point_local_reconstruction_enabled_flag equal to 0 indicates that no information related to the point local reconstruction mode is present in the bitstream for the current atlas.

asps_vui_parameters_present_flag equal to 1 specifies that the vui_parameters( ) syntax structure is present. asps_vui_parameters_present_flag equal to 0 specifies that the vui_parameters( ) syntax structure is not present.

asps_extension_flag equal to 0 specifies that no asps_extension_data_flag syntax elements are present in the ASPS RBSP syntax structure.

asps_extension_data_flag Indicates that data for extension is included in the ASPS RB SP syntax structure.

rbsp_trailing_bits is used to fill the remaining bits with 0 for byte alignment after adding 1, which is a stop bit, to indicate the end of RBSP data.

FIG. 32 shows an atlas frame parameter set according to embodiments.

FIG. 32 shows the syntax of an atlas frame parameter set contained in the NAL unit when the NAL unit type is NAL_AFPS.

The atlas frame parameter set (AFPS) contains a syntax structure containing syntax elements that apply to all zero or more entire coded atlas frames.

afps_atlas_frame_parameter_set_id identifies the atlas frame parameter set for reference by other syntax elements. An identifier that may be referred to by other syntax elements may be provided through the AFPS atlas frame parameter set.

afps_atlas_sequence_parameter_set_id specifies the value of asps_atlas_sequence_parameter_set_id for the active atlas sequence parameter set.

atlas_frame_tile_information( ) will be described with reference to FIG. 33.

afps_num_ref_idx_default_active_minus1 plus 1 specifies the inferred value of the variable NumRefIdxActive for the tile group with atgh_num_ref_idx_active_override_flag equal to 0.

afps_additional_lt_afoc_lsb_len specifies the value of the variable MaxLtAtlasFrmOrderCntLsb that is used in the decoding process for reference atlas frame lists.

afps_2d_pos_x_bit_count_minus1 plus 1 specifies the number of bits in the fixed-length representation of pdu_2d_pos_x[j] of a patch with index j in an atlas tile group that refers to afps_atlas_frame_parameter_set_id.

afps_2d_pos_y_bit_count_minus1 plus 1 specifies the number of bits in the fixed-length representation of pdu_2d_pos_y[j] of a patch with index j in an atlas tile group that refers to afps_atlas_frame_parameter_set_id.

afps_3d_pos_x_bit_count_minus1 plus 1 specifies the number of bits in the fixed-length representation of pdu_3d_pos_x[j] of patch with index j in an atlas tile group that refers to afps_atlas_frame_parameter_set_id.

afps_3d_pos_y_bit_count_minus1 plus 1 specifies the number of bits in the fixed-length representation of pdu_3d_pos_y[j] of patch with index j in an atlas tile group that refers to afps_atlas_frame_parameter_set_id.

afps_lod_bit_count specifies the number of bits in the fixed-length representation of pdu_lod[j] of a patch with index j in an atlas tile group that refers to afps_atlas_frame_parameter_set_id.

afps_override_eom_for_depth_flag equal to 1 indicates that the values of afps_eom_number_of_patch_bit_count_minus1 and afps_eom_max_bit_count_minus1 are explicitly present in the bitstream. afps_override_eom_for_depth_flag equal to 0 indicates that the values of afps_eom_number_of_patch_bit_count_minus1 and afps_eom_max_bit_count_minus1 are implicitly derived.

afps_eom_number_of_patch_bit_count_minus1 plus 1 specifies the number of bits used to represent the number of geometry patches associated with the current EOM attribute patch.

afps_eom_max_bit_count_minus1 plus 1 specifies the number of bits used to represent the number of EOM points per geometry patch associated with the current EOM attribute patch.

afps_raw_3d_pos_bit_count_explicit_mode_flag equal to 1 indicates that the bit count for rpdu_3d_pos_x, rpdu_3d_pos_y, and rpdu_3d_pos_z is explicitly coded in an atlas tile group header that refers to afps_atlas_frame_parameter_set_id.

afps_extension_flag equal to 0 specifies that no afps_extension_data_flag syntax elements are present in the AFPS RBSP syntax structure.

afps_extension_data_flag may contain extension related data.

FIG. 33 shows atlas_frame_tile_information according to embodiments.

FIG. 33 shows the syntax of atlas_frame_tile_information included in FIG. 32;

afti_single_tile_in_atlas_frame_flag equal to 1 specifies that there is only one tile in each atlas frame referring to the AFPS. afti_single_tile_in_atlas_frame_flag equal to 0 specifies that there is more than one tile in each atlas frame referring to the AFPS.

afti_uniform_tile_spacing_flag equal to 1 specifies that tile column and row boundaries are distributed uniformly across the atlas frame and signaled using the syntax elements, afti_tile_cols_width_minus1 and afti_tile_rows_height_minus1, respectively. afti_uniform_tile_spacing_flag equal to 0 specifies that tile column and row boundaries may or may not be distributed uniformly across the atlas frame and are signaled using the syntax elements afti_num_tile_columns_minus1 and afti_num_tile_rows_minus1 and a list of syntax element pairs afti_tile_column_width_minus1 [i] and afti_tile_row_height_minus1[i].

afti_tile_cols_width_minus1 plus 1 specifies the width of the tile columns excluding the right-most tile column of the atlas frame in units of 64 samples when afti_uniform_tile_spacing_flag is equal to 1.

afti_tile_rows_height_minus1 plus 1 specifies the height of the tile rows excluding the bottom tile row of the atlas frame in units of 64 samples when afti_uniform_tile_spacing_flag is equal to 1.

When afti_uniform_tile_spacing_flag is not equal to 1, the following elements are included in the atlas frame tile information.

afti_num_tile_columns_minus1 plus 1 specifies the number of tile columns partitioning the atlas frame when afti_uniform_tile_spacing_flag is equal to 0.

afti_num_tile_rows_minus1 plus 1 specifies the number of tile rows partitioning the atlas frame when pti_uniform_tile_spacing_flag is equal to 0.

afti_tile_column_width_minus1[i] plus 1 specifies the width of the i-th tile column in units of 64 samples.

afti_tile_column_width_minus1[i] is included in the atlas frame tile information according to the value of afti_num_tile_columns_minus1.

afti_tile_row_height_minus1 [i] plus 1 specifies the height of the i-th tile row in units of 64 samples.

afti_tile_row_height_minus1 [i] is included in the atlas frame tile information according to the value of afti_num_tile_rows_minus1.

afti_single_tile_per_tile_group_flag equal to 1 specifies that each tile group (or tile) that refers to this AFPS includes one tile. afti_single_tile_per_tile_group_flag equal to 0 specifies that a tile group that refers to this AFPS may include more than one tile. When not present, the value of afti_single_tile_per_tile_group_flag may be inferred to be equal to 1).

afti_num_tiles_in_atlas_frame_minus1 specifies the number of tiles in each atlas frame referring to the AFPS.

afti_tile_idx[i] specifies the tile index of the i-th tile in each atlas frame referring to the AFPS).

Based on the value of afti_num_tile_groups_in_atlas_frame_minus1, afti_tile_idx[i] is included in the atlas frame tile information.

When afti_single_tile_per_tile_group_flag is equal to 0, afti_num_tile_groups_in_atlas_frame_minus1 is carried in the atlas frame tile information.

afti_num_tile_groups_in_atlas_frame_minus1 plus 1 specifies the number of tile groups in each atlas frame referring to the AFPS. The value of afti_num_tile_groups_in_atlas_frame_minus1 may be in the range of 0 to NumTilesInAtlasFrame−1, inclusive. When not present and afti_single_tile_per_tile_group_flag is equal to 1, the value of afti_num_tile_groups_in_atlas_frame_minus1 may be inferred to be equal to NumTilesInAtlasFrame−1.

The following elements are included in the atlas frame tile information according to the value of as much as afti_num_tile_groups_in_atlas_frame_minus1.

afti_top_left_tile_idx[i] specifies the tile index of the tile located at the top-left corner of the i-th tile group (tile). The value of afti_top_left_tile_idx[i] is not equal to the value of afti_top_left_tile_idx[j] for any i not equal to j. When not present, the value of afti_top_left_tile_idx[i] may be inferred to be equal to i. The length of the afti_top_left_tile_idx[i] syntax element may be Ceil(Log2(NumTilesInAtlasFrame) bits.

afti_bottom_right_tile_idx_delta[i] specifies the difference between the tile index of the tile located at the bottom-right corner of the i-th tile group (tile) and afti_top_left_tile_idx[i]. When afti_single_tile_per_tile_group_flag is equal to 1, the value of afti_bottom_right_tile_idx_delta[i] is inferred to be equal to 0. The length of the afti_bottom_right_tile_idx_delta[i] syntax element is Ceil(Log2(NumTilesInAtlasFrame−afti_top_left_tile_idx[i])) bits.

afti_signalled_tile_group_id_flag equal to 1 specifies that the tile group ID for each tile group is signaled.

When afti_signalled_tile_group_id_flag is equal to 1, afti_signalled_tile_group_id_length_minus1 and afti_tile_group_id[i] may be carried in the atlas frame tile information. When the value of this flag is 0, tile group IDs may not be signaled.

afti_signalled_tile_group_id_length_minus1 plus 1 specifies the number of bits used to represent the syntax element afti_tile_group_id[i] when present, and the syntax element atgh_address in tile group headers.

afti_tile_group_id[i] specifies the tile group ID of the i-th tile group. The length of the afti_tile_group_id[i] syntax element is afti_signalled_tile_group_id_length_minus1+1 bits.

afti_tile_group_id[i] is included in the atlas frame tile information according to the value of afti_num_tile_groups_in_atlas_frame_minus1.

FIG. 34 shows supplemental enhancement information (SEI) according to embodiments.

FIG. 34 shows the detailed syntax of SEI information contained in a bitstream according to embodiments as shown in FIG. 30.

The reception method/device, the system, and the like according to the embodiments may decode, reconstruct, and display point cloud data based on the SEI message.

The SEI message indicates, based on each payloadType, that the payload may contain corresponding data.

For example, when payloadType is equal to 13, the payload may contain 3D region mapping information (3d_region_mapping(payloadSize)).

When psd_unit_type is PSD_PREFIX_SEI, the SEI information according to the embodiments may include buffering_period(payloadSize), pic_timing(payloadSize), filler_payload(payloadSize), user_data_registered_itu_t_t35(payloadSize), user_data_unregistered(payloadSize), recovery_point(payloadSize), no_display(payloadSize), time_code(payloadSize), regional_nesting(payloadSize), sei_manifest(payloadSize), sei_prefix_indication(payloadSize), geometry_transformation_params (payloadSize), 3d_bounding_box_info(payloadSize) (see FIG. 35 and the like), 3d_region_mapping(payloadSize) (see FIG. 36 and the like), and reserved_sei_message(payloadSize).

When psd_unit_type is PSD_SUFFIX_SEI, the SEI according to the embodiments may include filler_payload (payloadSize), user_data_registered_itu_t_t35(payloadSize), user_data_unregistered(payloadSize), decoded_pcc_hash(payloadSize), and reserved_sei_message (payloadSize).

FIG. 35 shows 3D bounding box SEI according to embodiments.

FIG. 35 shows detailed syntax of SEI information contained in a bitstream according to embodiments as shown in FIG. 30.

3dbi_cancel_flag equal to 1 indicates that the 3D bounding box information SEI message cancels the persistence of any previous 3d bounding box information SEI message in output order.

object_id is the identifier of the point cloud object/content carried in the bitstream.

3d_bounding_box_x indicates the x coordinate value of the origin position of the 3D bounding box of the object.

3d_bounding_box_y indicates the y coordinate value of the origin position of the 3D bounding box of the object.

3d_bounding_box_z indicates the z coordinate value of the origin position of the 3D bounding box of the object.

3d_bounding_box_delta_x indicates the size of the bounding box on the x axis of the object.

3d_bounding_box_delta_y indicates the size of the bounding box on the y axis of the object.

3d_bounding_box_delta_z indicates the size of the bounding box on the z axis of the object.

FIG. 36 shows a 3D region mapping information SEI message according to embodiments.

FIG. 36 shows detailed syntax of SEI information contained in a bitstream according to embodiments as shown in FIG. 30.

3dmi_cancel_flag equal to 1 indicates that the 3D region mapping information SEI message cancels the persistence of any previous 3D region mapping information SEI message in output order.

num_3d_regions may indicate the number of 3D regions signaled in the SEI.

The following elements as many as the value of num_3d_regions may be included in this SEI message.

3d_region_idx[i] may indicate the identifier of the i-th 3D region.

3d_region_anchor_x[i], 3d_region_anchor_y[i], and 3d_region_anchor_z[i] may indicate x, y, and z coordinate values of the anchor point of the i-th 3D region, respectively. For example, when the 3D region is of a cuboid type, the anchor point may be the origin of the cuboid.

3d_region_anchor_x[i], 3d_region_anchor_y[i], and 3d_region_anchor_z[i] may indicate the x, y, and z coordinate values of the origin position of the cuboid of the i-th 3D region.

3d_region_type[i] may indicate the type of the i-th 3D region, and may have 0x01-cuboid as a type value.

3d_region_type[i] equal to 1 may indicate that the type of the 3D region is a cuboid. Hereinafter, elements related to the cuboid type may be included in this SEI message.

3d_region_delta_x[i], 3d_region_delta_y[i], and 3d_region_delta_y[i] may indicate difference values of the i-th 3D region on the x, y, and z axes.

num_2d_regions[i] may indicate the number of 2D regions of a frame in which video or atlas data associated with the i-th 3D region is present.

The following elements as many as the value of num_2d_regions[i] may be included in this SEI message.

2d_region_idx [j] may indicate the identifier of the j-th 2D region.

2d_region_top [j] and 2d_region_left[j] may include vertical coordinates and horizontal coordinates within a frame of the top-left position of the j-th 2D region, respectively.

2d_region_width [j] and 2d_region_height [j] may include horizontal range (width) and vertical range (height) values in the frame of the j-th 2D region, respectively.

The 3d region-related fields and 2d region-related fields of the 3d region mapping information of FIG. 36 may correspond to volumetric rectangle information contained in the bitstream according to the embodiments. Specifically, the bounding box related fields (e.g., vri_bounding_box_top, vri_bounding_box_left, vri_bounding_box_width, and vri_bounding_box_height) of the volumetric rectangle information indicate a 2D region. In addition, an object-related field of the volumetric rectangle information, for example, vri_rectangle_object_idx may correspond to object_idx contained in scene_object_information. In other words, object_idx represents 3D region information. This is because scene_object_information includes signaling information about a 3D bounding box, that is, a 3D region.

The 3d region-related fields and the 2d region-related fields of the 3D region mapping information of FIG. 36 may correspond to the tile information (tile id, 2D region) and patch object idx of patch information contained in the bitstream according to the embodiments, respectively.

num_tiles [j] may indicate the number of atlas tiles or video tiles associated with the j-th 2D region.

The following tile-related elements as many as the value of num_tiles [j] may be included in this SEI message.

tile_idx [k] may indicate the identifier of an atlas tile or video tile associated with the k-th 2D region.

num_tile_groups [j] may indicate the number of atlas tile groups or video tile groups associated with the j-th 2D region. This value may correspond to the number of tiles.

The following element as many as the value of num_tile_groups [j] may be included in this SEI message.

tile_group_idx [m] may indicate the identifier of an atlas tile group or video tile group associated with the m-th 2D region. This value may correspond to the tile index.

Due to the signaling scheme according to the embodiments, the reception method/device according to the embodiments may identify a mapping relationship between the 3D region and one or more atlas tiles (2D regions) and acquire corresponding data.

FIG. 37 shows volumetric tiling information according to embodiments.

FIG. 37 shows detailed syntax of SEI information contained in the bitstream according to the embodiments as shown in FIG. 30.

Volumetric Tiling Information SEI Message

This SEI message informs a V-PCC decoder according to the embodiments avoid different characteristics of a decoded point cloud, including correspondence of areas within a 2D atlas and the 3D space, relationship and labeling of areas and association with objects.

The persistence scope for this SEI message may be the remainder of the bitstream or until a new volumetric tiling SEI message is encountered. Only the corresponding parameters specified in the SEI message may be updated. Previously defined parameters from an earlier SEI message may persist if not modified and if the value of vti_cancel_flag is not equal to 1.

FIG. 38 shows volumetric tiling information objects according to embodiments.

FIG. 38 shows detailed syntax of volumetric_tiling_info_objects information included in FIG. 37.

Based on vtiObjectLabelPresentFlag, vti3dBoundingBoxPresentFlag, vtiObjectPriorityPresentFlag, tiObjectHiddenPresentFlag, vtiObjectCollisionShapePresentFlag, vtiObjectDependencyPresentFlag, and the like, volumetric_tiling_info_objects may include elements as shown in FIG. 38.

FIG. 39 shows volumetric tiling information labels according to embodiments.

FIG. 39 shows detailed syntax of volumetric_tiling_info_labels included in FIG. 37.

vti_cancel_flag equal to 1 indicates that the volumetric tiling information SEI message cancels the persistence of any previous volumetric tiling information SEI message in output order. vti_cancel_flag equal to 0 indicates that volumetric tiling information follows as shown in FIG. 37.

vti_object_label_present_flag equal to 1 indicates that object label information is present in the current volumetric tiling information SEI message. vti_object_label_present_flag equal to 0 indicates that object label information is not present.

vti_3d_bounding_box_present_flag equal to 1 indicates that 3D bounding box information is present in the current volumetric tiling information SEI message. vti_3d_bounding_box_present_flag equal to 0 indicates that 3D bounding box information is not present.

vti_object_priority_present_flag equal to 1 indicates that object priority information is present in the current volumetric tiling information SEI message. vti_object_priority_present_flag equal to 0 indicates that object priority information is not present.

vti_object_hidden_present_flag equal to 1 indicates that hidden object information is present in the current volumetric tiling information SEI message. vti_object_hidden_present_flag equal to 0 indicates that hidden object information is not present.

vti_object_collision_shape_present_flag equal to 1 indicates that object collision information is present in the current volumetric tiling information SEI message. vti_object_collision_shape_present_flag equal to 0 indicates that object collision shape information is not present.

vti_object_dependency_present_flag equal to 1 indicates that object dependency information is present in the current volumetric tiling information SEI message. vti_object_dependency_present_flag equal to 0 indicates that object dependency information is not present.

vti_object_label_language_present_flag equal to 1 indicates that object label language information is present in the current volumetric tiling information SEI message. vti_object_label_language_present_flag equal to 0 indicates that object label language information is not present.

vti_bit_equal_to_zero shall be equal to 0.

vti_object_label_language contains a language tag followed by a null termination byte equal to 0x00. The length of the vti_object_label_language syntax element may be less than or equal to 255 bytes, not including the null termination byte.

vti_num_object_label_updates indicates the number of object labels that are to be updated by the current SEI.

vti_label_idx[i] indicates the label index of the i-th label to be updated.

vti_label_cancel_flag equal to 1 indicates that the label with index equal to vti_label_idx[i] shall be canceled and set equal to an empty string. vti_label_cancel_flag equal to 0 indicates that the label with index equal to vti_label_idx[i] shall be updated with information that follows this element.

vti_bit_equal_to_zero shall be equal to 0 vti_label[i] indicates the label of the i-th label. The length of the vti_label[i] syntax element may be less than or equal to 255 bytes, not including the null termination byte.

vti_bounding_box_scale_log2 indicates the scale to be applied to the 2D bounding box parameters that may be specified for an object.

vti_3d_bounding_box_scale_log2 indicates the scale to be applied to the 3D bounding box parameters that may be specified for an object.

vti_3d_bounding_box_precision_minus8 plus 8 indicates the precision of the 3D bounding box parameters that may be specified for an object.

vti_num_object_updates indicates the number of objects that are to be updated by the current SEI.

Object-related information is included in the volumetric tiling information object (see FIG. 38) according to the value of vti_num_object_update.

vti_object_idx[i] indicates the object index of the i-th object to be updated.

vti_object_cancel_flag[i] equal to 1 indicates that the object with index equal to i shall be canceled and that the variable ObjectTracked[i] shall be set to 0. Its 2D and 3D bounding box parameters may be set equal to 0. vti_object_cancel_flag equal to 0 indicates that the object with index equal to vti_object_idx[i] shall be updated with information that follows this element and that the variable ObjectTracked[i] shall be set to 1.

vti_bounding_box_update_flag[i] equal to 1 indicates that 2D bounding box information is present for object with object index i. vti_bounding_box_update_flag[i] equal to 0 indicates that 2D bounding box information is not present.

When vti_bounding_box_update_flag is equal to 1 for vti_object_idx[i], the following bounding box elements for vti_object_idx[i] are included in the volumetric tiling information object.

vti_bounding_box_top[i] indicates the vertical coordinate value of the top-left position of the bounding box of an object with index i within the current atlas frame.

vti_bounding_box_left[i] indicates the horizontal coordinate value of the top-left position of the bounding box of an object with index i within the current atlas frame.

vti_bounding_box_width[i] indicates the width of the bounding box of an object with index i.

vti_bounding_box_height[i] indicates the height of the bounding box of an object with index i.

When vti_3d_bounding_box_update_flag[i] is equal to 1, the following bounding box elements are included in the volumetric tiling information object.

vti_3d_bounding_box_update_flag[i] equal to 1 indicates that 3D bounding box information is present for object with object index i. vti_3d_bounding_box_update_flag[i] equal to 0 indicates that 3D bounding box information is not present.

When vti_3d_bounding_box_update_flag is equal to 1 for vti_object_idx[i], the following bounding box related elements are included in the volumetric tiling information object.

vti_3d_bounding_box_x[i] indicates the x coordinate value of the origin position of the 3D bounding box of an object with index i.

vti_3d_bounding_box_y[i] indicates they coordinate value of the origin position of the 3D bounding box of an object with index i.

vti_3d_bounding_box_z[i] indicates the z coordinate value of the origin position of the 3D bounding box of an object with index i.

vti_3d_bounding_box_delta_x[i] indicates the size of the bounding box on the x axis of an object with index i.

vti_3d_bounding_box_delta_y[i] indicates the size of the bounding box on the y axis of an object with index i.

vti_3d_bounding_box_delta_z[i] indicates the size of the bounding box on the z axis of an object with index i.

When vtiObjectPriorityPresentFlag is equal to 1, the following priority related elements are included in the volumetric tiling information object.

vti_object_priority_update_flag[i] equal to 1 indicates that object priority update information is present for an object with index i. vti_object_priority_update_flag[i] equal to 0 indicates that object priority information is not present.

vti_object_priority_value[i] indicates the priority of an object with index i. The lower the priority value, the higher the priority.

When vtiObjectHiddenPresentFlag is equal to 1, the following hidden information for vti_object_idx[i] is included in the volumetric tiling information object.

vti_object_hidden_flag[i] equal to 1 indicates that the object with index i shall be hidden. vti_object_hidden_flag[i] equal to 0 indicates that the object with index i shall become present.

When vtiObjectLabelPresentFlag is equal to 1, a label-related update flag is included in the volumetric tiling information object.

vti_object_label_update_flag equal to 1 indicates that object label update information is present for object with object index i. vti_object_label_update_flag[i] equal to 0 indicates that object label update information is not present.

When vti_object_label_update_flag is equal to 1 for vti_object_idx[i], the object label index for vti_object_idx[i] is included in the volumetric tiling information object.

vti_object_label_idx[i] indicates the label index of an object with index i.

When vtiObjectCollisionShapePresentFlag is equal to 1, an object collision related element is included in the volumetric tiling information object.

vti_object_collision_shape_update_flag[i] equal to 1 indicates that object collision shape update information is present for object with object index i. vti_object_collision_shape_update_flag[i] equal to 0 indicates that object collision shape update information is not present.

When vti_object_collision_shape_update_flag is equal to 1 for vti_object_idx[i], vti_object_collision_shape_id[i] for vti_object_idx[i] is included in the volumetric tiling information object.

vti_object_collision_shape_id[i] indicates the collision shape ID of an object with index i.

When vtiObjectDependencyPresentFlag is equal to 1, an object dependency related element is included in the volumetric tiling information object.

vti_object_dependency_update_flag[i] equal to 1 indicates that object dependency update information is present for object with object index i. vti_object_dependency_update_flag[i] equal to 0 indicates that object dependency update information is not present.

When vti_object_dependency_update_flag is equal to 1 for vti_object_idx[i], an object dependency related element for vti_object_idx[i] is included in the volumetric tiling information object.

vti_object_num_dependencies[i] indicates the number of dependencies of an object with index i.

Object dependency indexes as many as the value of vti_object_num_dependencies are included in the volumetric tiling information object.

vti_object_dependency_idx[i][j] indicates the index of the j-th object that has a dependency with the object with index i.

FIG. 40 shows the structure of an encapsulated V-PCC data container according to embodiments.

FIG. 41 shows an encapsulated V-PCC data container structure according to embodiments.

The point cloud video encoder 10002 of the transmission device 10000 of FIG. 1, the encoders of FIGS. 4 and 15, the transmission device of FIG. 18, the video/image encoders 20002 and 20003 of FIG. 29, the processor and the encoders 21000 to 21008 of FIG. 21, and the XR device 2330 of FIG. 23 generate a bitstream containing point cloud data according to embodiments.

The file/segment encapsulator 10003 of FIG. 1, the file/segment encapsulator 20004 of FIG. 20, the file/segment encapsulator 21009 of FIG. 21, and the XR device of FIG. 23 format the bitstream in the file structure of FIGS. 24 and 25.

Similarly, the file/segment decapsulation module 10007 of the reception device 10005 of FIG. 1, the file/segment decapsulators 20005, 21009, and 22000 of FIGS. 20 to 23, and the XR device 2330 of FIG. 23 receive and decapsulate a file and parse the bitstream. The bitstream is decoded by the point cloud video decoder 10008 of FIG. 1, the decoders of FIGS. 16 and 17, the reception device of FIG. 19, the video/image decoders 20006, 21007, 21008, 22001, and 22002 of FIGS. 20 to 23, and the XR device 2330 of FIG. 23 to restore the point cloud data.

FIGS. 40 and 41 show the structure of a point cloud data container according to the ISOBMFF file format.

FIGS. 40 and 41 show the structure of a container for delivering point clouds based on multiple tracks.

The methods/devices according to the embodiments may transmit/receive a container file containing point cloud data and additional data related to the point cloud data based on a plurality of tracks.

Track-1 40000 is an attribute track, and may contain attribute data 40040 encoded as illustrated in FIGS. 1, 4, 15, 18, and the like.

Track-2 40010 is an occupancy track, and may contain geometry data 40050 encoded as illustrated in FIGS. 1, 4, 15, 18, and the like.

Track-3 40020 is a geometry track, and may contain occupancy data 40060 encoded as illustrated in FIGS. 1, 4, 15, 18, and the like.

Track-4 40030 is a v-pcc (v3c) track, and may contain an atlas bitstream 40070 containing data related to point cloud data.

Each track is composed of a sample entry and a sample. The sample is a unit corresponding to a frame. In order to decode the N-th frame, a sample or sample entry corresponding to the N-th frame is required. The sample entry may contain information describing the sample.

FIG. 41 is a detailed structural diagram of FIG. 40.

The v3c track 41000 corresponds to track-4 40030. Data contained in the v3c track 41000 may have a format of a data container referred to as a box. The v3c track 41000 contains reference information about the V3C component tracks 41010 to 41030.

The reception method/device according to the embodiments may receive a container (which may be referred to as a file) containing point cloud data as shown in FIG. 41 and parses a V3C track, and may decode and restore occupancy data, geometry data, and attribute data based on the reference information contained in the V3C track.

The occupancy track 41010 corresponds to track-2 40010 and contains occupancy data. The geometry track 41020 corresponds to track-3 40020 and contains geometry data. The attribute track 41030 corresponds to track-1 40000 and contains attribute data.

Hereinafter, the syntax of the data structure included in the file of FIGS. 40 and 41 will be described in detail.

Volumetric Visual Track

Each volumetric visual scene is represented by a unique volumetric visual track.

An ISOBMFF file may contain multiple scenes, and therefore multiple volumetric visual tracks may be present in the file.

A volumetric visual track is identified by the volumetric visual media handler type 'vole' in the HandlerBox of the MediaBox. A volumetric visual media header is defined as follows.

Volumetric Visual Media Header

Box Type: 'vvhd'

Container: MediaInformationBox

Mandatory: Yes

Quantity: Exactly one

Volumetric visual tracks shall use a VolumetricVisualMediaHeaderBox in the MediaInformationBox.

```
aligned(8) class VolumetricVisualMediaHeaderBox
    extends FullBox('vvhd', version = 0, 1) {
}
```

'version' is an integer that specifies the version of this box

Volumetric Visual Sample Entry

Volumetric visual tracks shall use a VolumetricVisualSampleEntry.

```
class VolumetricVisualSampleEntry(codingname)
    extends SampleEntry (codingname){
    unsigned int(8)[32] compressor_name;
}
``` compressor_name is a name for informative purposes. It may be formatted in a fixed 32-byte field, with the first byte set to the number of bytes to be displayed, followed by that number of bytes of displayable data encoded using UTF-8, and then padding to complete 32 bytes total (including the size byte). The field may be set to 0.

Volumetric Visual Samples

The format of a volumetric visual sample is defined by the coding system.

V-PCC Unit Header Box

This box may be present in both the V-PCC track (in the sample entry) and in all video-coded V-PCC component tracks (in the scheme information). It contains the V-PCC unit header for the data carried by the respective tracks.

```
aligned(8) class VPCCUnitHeaderBox
    extends FullBox('vunt', version = 0, 0) {
    vpcc_unit_header( )  unit_header;
}
```

The box contains a vpcc_unit_header( ) as the above.

V-PCC Decoder Configuration Record

This record contains a version field. This version of the specification defines version 1 of this record. Incompatible changes to the record will be indicated by a change of version number. Readers are not attempt to decode this record or the streams to which it applies if the version number is unrecognizable.

The array for VPCCParameterSet includes vpcc_parameter_set( ) defined as above.

The atlas_setupUnit arrays shall include atlas parameter sets that are constant for the stream referred to by the sample entry in which the decoder configuration record is present as well as atlas stream SEI messages.

```
aligned(8) class VPCCDecoderConfigurationRecord {
    unsigned int(8) configurationVersion = 1;
```

```
    unsigned int(3) sampleStreamSizeMinusOne;
    unsigned int(5) numOfVPCCParameterSets;
        for (i=0; i< numOfVPCCParameterSets; i++) {
            sample_stream_vpcc_unit VPCCParameterSet;
        }
    unsigned int(8) numOfAtlasSetupUnits;
        for (i=0; i< numOfAtlasSetupUnits; i++) {
            sample_stream_vpcc_unit atlas_setupUnit;
        }
}
``` configurationVersion is a version field. Incompatible changes to the record are indicated by a change of version number.

sampleStreamSizeMinusOne plus 1 indicates the precision, in bytes, of the ssvu_vpcc_unit_size element in all sample stream V-PCC units in either this configuration record or a V-PCC sample in the stream to which this configuration record applies.

numOfVPCCParameterSets specifies the number of V-PCC parameter sets (VPS) signaled in the decoder configuration record.

VPCCParameterSet is a sample_stream_vpcc_unit( ) instance for a V-PCC unit of type VPCC_VPS. This V-PCC unit includes the vpcc_parameter_set( )

numOfAtlasSetupUnits indicates the number of setup arrays for the atlas stream signaled in this configuration record.

Atlas_setupUnit is a sample_stream_vpcc_unit( ) instance containing an atlas sequence parameter set, an atlas frame parameter set, or a SEI atlas NAL unit. For example, reference may be made to the description of ISO/IEC 23090-5.

According to embodiments, VPCCDecoderConfigurationRecord may be defined as follows.

```
aligned(8) class VPCCDecoderConfigurationRecord {
    unsigned int(8) configurationVersion = 1;
    unsigned int(3) sampleStreamSizeMinusOne;
    bit(2) reserved = 1;
    unsigned int(3) lengthSizeMinusOne;
        unsigned int(5) numOVPCCParameterSets;
            for (i=0; i< numOVPCCParameterSets; i++) {
                sample_stream_vpcc_unit VPCCParameterSet;
            }
    unsigned int(8) numOfSetupUnitArrays;
    for (j=0; j<numOfSetupUnitArrays; j++) {
        bit(1) array_completeness;
        bit(1) reserved = 0;
        unsigned int(6) NAL_unit_type;
        unsigned int(8) numNALUnits;
        for (i=0; i<numNALUnits; i++) {
            sample_stream_nal_unit setupUnit;
        }
    }
}
``` configurationVersion is a version field. Incompatible changes to the record are indicated by a change of version number.

lengthSizeMinusOne plus 1 indicates the precision, in bytes, of the ssnu_nal_unit_size element in all sample stream NAL units in either this configuration record or a V-PCC sample in the stream to which this configuration record applies.

sampleStreamSizeMinusOne plus 1 indicates the precision, in bytes, of the ssvu_vpcc_unit_size element in all sample stream V-PCC units signaled in this configuration record.

numOfVPCCParameterSets specifies the number of V-PCC parameter sets (VPSs) signaled in this configuration record.

VPCCParameterSet is a sample_stream_vpcc_unit( ) instance for a V-PCC unit of type VPCC_VPS.

numOfSetupUnitArrays indicates the number of arrays of atlas NAL units of the indicated types.

array_completeness equal to 1 indicates that all atlas NAL units of the given type are in the following array and none are in the stream. array_completeness equal to 0 indicates that additional atlas NAL units of the indicated type may be in the stream. The default and permitted values are constrained by the sample entry name.

NAL_unit_type indicates the type of the atlas NAL units in the following array (which shall be all of that type). It takes a value as defined in ISO/IEC 23090-5. It may indicate a NAL_ASPS, NAL_PREFIX_SEI, or NAL_SUFFIX_SEI atlas NAL unit.

numNALUnits indicates the number of atlas NAL units of the indicated type included in the configuration record for the stream to which this configuration record applies. The SEI array may only contain SEI messages of a 'declarative' nature, that is, those that provide information about the stream as a whole. An example of such an SEI may be a user-data SEI.

setupUnit is a sample_stream_nal_unit( ) instance containing an atlas sequence parameter set, an atlas frame parameter set, or a declarative SEI atlas NAL unit V-PCC Atlas Parameter Set Sample Group The 'vaps' grouping_type for sample grouping represents the assignment of samples in V-PCC track to the atlas parameter sets carried in this sample group. When a SampleToGroupBox with grouping_type equal to 'vaps' is present, a SampleGroupDescriptionBox with the same grouping type is present, and contains the ID of this group to which samples belong.

A V-PCC track may contain at most one SampleToGroupBox with grouping_type equal to 'vaps'.

```
aligned(8) class VPCCAtlasParamSampleGroupDescriptionEntry( )
    extends
SampleGroupDescriptionEntry('vaps') {
    unsigned int(8) numOfAtlasParameterSets;
    for (i=0; i<numOfAtlasParameterSets; i++) {
        sample_stream_vpcc_unit atlasParameterSet;
    }
}
``` numOfAtlasParameterSets specifies the number of atlas parameter sets signalled in the sample group description.

atlasParameterSet is a sample_stream_vpcc_unit( ) instance containing atlas sequence parameter set, atlas frame parameter set associated with this group of samples.

The atlas parameter sample group description entry may be configured as follows.

```
aligned(8) class VPCCAtlasParamSampleGroupDescriptionEntry( )
    extends
SampleGroupDescriptionEntry('vaps') {
    unsigned int(3) lengthSizeMinusOne;
    unsigned int(5) numOfAtlasParameterSets;
    for (i=0; i<numOfAtlasParameterSets; i++) {
        sample_stream_nal_unit atlasParameterSetNALUnit;
    }
}
``` lengthSizeMinusOne plus 1 indicates the precision, in bytes, of the ssnu_nal_unit_size element in all sample stream NAL units signalled in this sample group description.

atlasParameterSetNALUnit is a sample_stream_nal_unit( ) instance containing atlas sequence parameter set, atlas frame parameter set associated with this group of samples.

V-PCC SEI Sample Group

The 'vsei' grouping_type for sample grouping represents the assignment of samples in V-PCC track to the SEI information carried in this sample group. When a SampleToGroupBox with grouping_type equal to 'vsei' is present, an accompanying SampleGroupDescriptionBox with the same grouping type is present, and contains the ID of this group of samples belong to.

A V-PCC track may contain at most one SampleToGroupBox with grouping_type equal to 'vsei'.

```
aligned(8) class VPCCSEISampleGroupDescriptionEntry( ) extends
SampleGroupDescriptionEntry('vsei') {
    unsigned int(8) numOfSEIs;
    for (i=0; i<numOfSEISets; i++) {
        sample_stream_vpcc_unit sei;
    }
}
``` numOfSEIs specifies the number of V-PCC SEIs signaled in the sample group description.

sei is a sample_stream_vpcc_unit( ) instance containing SEI information associated with this group of samples.

The V-PCC SEI sample group description entry may be configured as follows.

aligned(8) class VPCCSEISampleGroupDescriptionEntry( ) extends

```
SampleGroupDescriptionEntry('vsei') {
    unsigned int(3) lengthSizeMinusOne;
    unsigned int(5) numOfSEIs;
    for (i=0; i<numOfSEIs; i++) {
        sample_stream_nal_unit seiNALUnit;
    }
}
``` lengthSizeMinusOne plus 1 indicates the precision, in bytes, of the ssnu_nal_unit_size element in all sample stream NAL units signalled in this sample group description.

seiNALUnit is a sample_stream_nal_unit( ) instance containing SEI information associated with this group of samples.

V-PCC Bounding Box Sample Group

The 'vpbb' grouping_type for sample grouping represents the assignment of samples in V-PCC track to the 3D bounding box information carried in this sample group. When a SampleToGroupBox with grouping_type equal to 'vpbb' is present, an accompanying SampleGroupDescriptionBox with the same grouping type is present, and contains the ID of this group to which samples belong.

A V-PCC track may contain at most one SampleToGroupBox with grouping_type equal to 'vpbb'.

```
aligned(8) class
VPCC3DBoundingBoxSampleGroupDescriptionEntry( ) extends
SampleGroupDescriptionEntry('vpbb') {
    3DBoundingBoxInfoStruct( );
}
```

V-PCC 3D Region Mapping Sample Group

The 'vpsr' grouping_type for sample grouping represents the assignment of samples in V-PCC track to the 3D region mapping information carried in this sample group. When a SampleToGroupBox with grouping_type equal to 'vpsr' is present, an accompanying SampleGroupDescriptionBox with the same grouping type is present, and contains the ID of this group of samples belong to.

A V-PCC track may contain at most one SampleToGroupBox with grouping_type equal to 'vpsr'.

```
aligned(8) class
VPCC3DRegionMappingSampleGroupDescriptionEntry( ) extends
SampleGroupDescriptionEntry('vpsr') {
    VPCC3DRegionMappingBox 3d_region_mapping;
}
```

3D Region Track Grouping

TrackGroupTypeBox with track_group_type equal to '3drg' indicates that this track belongs to a group of V-PCC component tracks 41010 to 41030 that correspond to a 3D spatial region.

Tracks belonging to the same 3D spatial region have the same value of track_group_id for track_group_type '3drg'. The track_group_id of tracks from one 3D spatial region differs from the track_group_id of tracks from any other 3D spatial region.

```
aligned(8) class SpatialRegionGroupBox extends
TrackGroupTypeBox('3drg') {
}
```

Tracks that have the same value of track_group_id within TrackGroupTypeBox with track_group_type equal to '3drg' belong to the same 3D spatial region.

The track_group_id within TrackGroupTypeBox with track_group_type equal to '3drg' is used as the identifier of the 3D spatial region.

Based on 3D region track grouping according to the embodiments, the method/device according to the embodiments may provide track grouping including data associated with the 3D region of point cloud data. The reception method/device according to the embodiments may efficiently acquire and render the point cloud data related to the 3D region.

2D Region Track Grouping

TrackGroupTypeBox with track_group_type equal to '2drg' indicates that this track belongs to a group of V-PCC component tracks that correspond to a 2D region.

Tracks belonging to the same 2D region have the same value of track_group_id for track_group_type '3drg'. The track_group_id of tracks from one 2D region differs from the track_group_id of tracks from any other 2D region.

```
aligned(8) class SpatialRegionGroupBox extends
TrackGroupTypeBox('3drg') {
}
```

Tracks that have the same value of track_group_id within TrackGroupTypeBox with track_group_type equal to '2drg' belong to the same 2D region. The track_group_id within TrackGroupTypeBox with track_group_type equal to '2drg' is used as the identifier of the 2D region.

Based on 2D region track grouping according to the embodiments, the method/device according to the embodiments may provide track grouping including data associated with the 2D region. The reception method/device according to the embodiments may efficiently acquire data related to the 2D region and render the point cloud data related to the 2D region.

The method/device for receiving point cloud data according to embodiments performs the following operations based on 3D region track grouping and/or 2D region track grouping. For example, the reception method/device according to the embodiments may access a 3D bounding box based on the 3D region track grouping, and may access an atlas tile based on the 2D region track grouping. In addition, in order to make a partial access to a 3D bounding box, geometry, attributes, and occupancy data related to the 3D bounding box should be decoded. In order to decode the V3C components, the relevant information is eventually used in the atlas bitstream. Accordingly, both the 3D region track grouping and/or the 2D region track grouping may be decoded together by the PCC receiver.

Multi Track Container of V-PCC Bitstream

The general layout of a multi-track ISOBMFF V-PCC container, where V-PCC units in a V-PCC elementary stream are mapped to individual tracks within the container file based on their types. There are two types of tracks in a multi-track ISOBMFF V-PCC container: V-PCC track and V-PCC component track.

The V-PCC track (or v3c track) 40030 or 41000 is a track carrying the volumetric visual information in the V-PCC bitstream, which includes the atlas sub-bitstream and the sequence parameter sets.

V-PCC component tracks are restricted video scheme tracks which carry 2D video encoded data for the occupancy map, geometry, and attribute sub-bitstreams of the V-PCC bitstream. In addition, the following conditions are satisfied for V-PCC component tracks:

a) in the sample entry, a new box may be inserted which documents the role of the video stream contained in this track, in the V-PCC system;

b) a track reference may be introduced from the V-PCC track, to the V-PCC component track, to establish the membership of the V-PCC component track in the specific point-cloud represented by the V-PCC track;

c) the track-header flags may be set to 0, to indicate that this track does not contribute directly to the overall layup of the movie but contributes to the V-PCC system.

The atlas bitstream describing point cloud data according to embodiments, and signaling information (which may be referred to as parameters, metadata, etc.) may be included in a data structure called a box. The method/device according to the embodiments may include and transmit the atlas bitstream and parameter information in a v-pcc track (or V3C track) based on multiple tracks. Further, the method/device according to the embodiments may transmit the atlas bitstream and parameter information according to the embodiments in a sample entry of the v-pcc track (or V3C track).

In addition, the method/device according to the embodiments may transmit the atlas bitstream and parameter information according to the embodiments in a V-PCC elementary stream track on the basis of a single track. Furthermore, the method/device according to the embodiments may transmit the atlas bitstream and parameter information in a sample entry or sample of a V-PCC elementary stream track.

Tracks belonging to the same V-PCC sequence may be time-aligned. Samples that contribute to the same point cloud frame across the different video-encoded V-PCC component tracks and the V-PCC track has the same presentation time. The V-PCC atlas sequence parameter sets and atlas frame parameter sets used for such samples have a decoding time equal or prior to the composition time of the point cloud frame. In addition, all tracks belonging to the same V-PCC sequence have the same implied or explicit edit lists.

Note: Synchronization between the elementary streams in the component tracks may be handled by the ISOBMFF track timing structures (stts, ctts, and cslg), or equivalent mechanisms in movie fragments.

Based on this layout, a V-PCC ISOBMFF container shall include the following (see FIG. 40):

A V-PCC track which contains V-PCC parameter sets (in the sample entry) and samples carrying the payloads of the V-PCC parameter set V-PCC unit (of unit type VPCC_VPS) and atlas V-PCC units (of unit type VPCC_AD). This track also includes track references to other tracks carrying the payloads of video compressed V-PCC units (i.e., unit types VPCC_OVD, VPCC_GVD, and VPCC_AVD).

A restricted video scheme track where the samples contain access units of a video-coded elementary stream for occupancy map data (i.e., payloads of V-PCC units of type VPCC_OVD).

One or more restricted video scheme tracks where the samples contain access units of video-coded elementary streams for geometry data (i.e., payloads of V-PCC units of type VPCC_GVD).

Zero or more restricted video scheme tracks where the samples contain access units of video-coded elementary streams for attribute data, i.e., payloads of V-PCC units of type VPCC_AVD.

V-PCC tracks

V-PCC Track Sample Entry

Sample Entry Type: 'vpc1', 'vpcg'

Container: SampleDescriptionBox

Mandatory: A 'vpc1' or 'vpcg' sample entry is mandatory

Quantity: One or more sample entries may be present

V-PCC tracks use VPCCSampleEntry which extends VolumetricVisualSampleEntry. The sample entry type is 'vpc1' or 'vpcg'.

A VPCC sample entry contains a VPCCConfigurationBox. This box includes a VPCCDecoderConfigurationRecord, Under the 'vpc1' sample entry, all atlas sequence parameter sets, atlas frame parameter sets, or V-PCC SEIs are in the setupUnit array.

Under the 'vpcg' sample entry, the atlas sequence parameter sets, atlas frame parameter sets, and V-PCC SEIs may be present in this array, or in the stream.

An optional BitRateBox may be present in the VPCC volumetric sample entry to signal the bit rate information of the V-PCC track.

Volumetric Sequences:

```
class VPCCConfigurationBox extends Box('vpcC') {
    VPCCDecoderConfigurationRecord( ) VPCCConfig;
}
aligned(8) class VPCCSampleEntry( ) extends
VolumetricVisualSampleEntry ('vpc1') {
    VPCCConfigurationBox config;
    VPCCUnitHeaderBox unit_header;
    VPCCBoundingInformationBox ( );
}
```

A method for transmitting point cloud data according to embodiments may include encoding point cloud data, encapsulating the point cloud data, and transmitting the point cloud data.

According to embodiments, the encapsulating of the point cloud data may include generating one or more tracks containing the point cloud data.

According to embodiments, the one or more tracks may contain point cloud data, for example, attribute data, occupancy data, geometry data, and/or parameters (metadata or signaling information) related thereto. Specifically, a track may include a sample entry describing a sample and/or the sample. The plurality of tracks may be referred to as a first track, a second track, and the like.

According to embodiments, the point cloud data transmission method may group one or more tracks. According to embodiments, the grouped tracks may correspond to a 2D region representing the point cloud data. The 2D region may be an atlas tile of an atlas frame.

A point cloud data reception method according to embodiments may receive the grouped tracks. By parsing the grouped tracks, information about the associated 2D region may be acquired. Accordingly, based on the grouped 2D region information, the method/device for receiving point cloud data according to the embodiments may parse the associated geometry, attributes, and occupancy data through spatial partial access to efficiently provide the data to the user.

Based on the 2D region track grouping according to the embodiments, the one or more tracks according to the embodiments may include a track group type box indicating the grouped tracks. The grouped tracks may have the same track group ID.

Furthermore, with regard to 2D region track grouping according to the embodiments, track grouping related information according to embodiments may include atlas_id, num_tiles, and tile_id for each value of num_tiles.

atlas_id is an identifier for an atlas to which the atlas tile(s) represented by the track group belongs.

num_tiles indicates the number of V3C tiles associated with the track group.

tile_id is an identifier for a V3C tile. This value may be equal to the atlas tile group header address (atgh_address).

A point cloud data reception device according to embodiments may include a receiver configured to receive point cloud data, a decapsulator configured to parse the point cloud data, and a decoder configured to decode the point cloud data.

The decapsulator according to embodiments may parse one or more tracks containing point cloud data.

Figure 42:
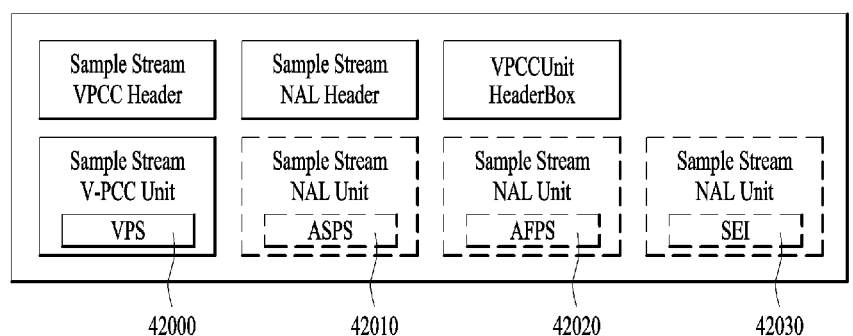
FIG. 42 shows a V-PCC sample entry according to embodiments.

FIG. 42 shows a V-PCC sample entry according to embodiments.

FIG. 42 shows a structural diagram of sample entries included in the V-PCC track (or V3C track) 40030 of FIG. 40 and the V3C track 41000 of FIG. 41.

FIG. 42 shows an exemplary V-PCC sample entry structure according to the embodiments of the present disclosure. A sample entry may contain a V-PCC parameter set (VPS) 42000, and optionally contain an atlas sequence parameter set (ASPS) 42010, an atlas frame parameter set (AFPS) 42020, and/or SEI 42030.

The method/device according to the embodiments may store point cloud data in tracks in a file. Furthermore, parameters (or signaling information) related to the point cloud data may be stored and transmitted/received in a sample or sample entry of a track.

The V-PCC bitstream of FIG. 42 may be generated and parsed by embodiments of generating and parsing of the V-PCC bitstream of FIG. 25.

The V-PCC bitstream may contain a sample stream V-PCC header, a sample stream header, a V-PCC unit header box, and a sample stream V-PCC unit.

The V-PCC bitstream corresponds to the V-PCC bitstream described with reference to FIGS. 25 and 26 or is an example of an extended form thereof.

V-PCC Track Sample Format

Each sample in the V-PCC track corresponds to a single point cloud frame. Samples corresponding to this frame in the various component tracks shall have the same composition time as the V-PCC track sample. Each V-PCC sample may include one or more atlas NAL units.

```
aligned(8) class VPCCSample {
    unsigned int PointCloudPictureLength = sample_size; // Represents the sample size
from SampleSizeBox.
    for (i=0; i<PointCloudPictureLength; ) {
        sample_stream_nal_unit nalUnit
        i += (VPCCDecoderConfigurationRecord.lengthSizeMinusOne+1) +
    nalUnit.ssnu_nal_unit_size;
    }
}
aligned(8) class VPCCSample
{
    unsigned int PictureLength = sample_size; // Represents the sample size from
SampleSizeBox.
    for (i=0; i<PictureLength; )       // Signaled up to the end of the picture.
    {
        unsigned int((VPCCDecoderConfigurationRecord.LengthSizeMinusOne+1)*8)
            NALUnitLength;
        bit(NALUnitLength * 8) NALUnit;
```

```
        i += (VPCCDecoderConfigurationRecord.LengthSizeMinusOne+1) +
NALUnitLength;
    }
  }
}
```

VPCCDecoderConfigurationRecord indicates the decoder configuration record in the matching V-PCC sample entry.

nalUnit contains a single atlas NAL unit in sample stream NAL unit format.

NALUnitLength indicates the size of a subsequent NAL unit in bytes.

NALUnit contains a single atlas NAL unit.

V-PCC Track Sync Sample:

A sync sample (random access point) in a V-PCC track is a V-PCC IRAP coded patch data access unit. Atlas parameter sets may be repeated at a sync sample for random access, if needed.

Video-Encoded V-PCC Component Tracks

The carriage of coded video tracks that use MPEG-specified codecs are well defined in ISOBMFF derived specifications. For example, for carriage of AVC and HEVC coded videos, reference may be made to the ISO/IEC 14496-15. ISOBMFF may provide an extension mechanism if other codec types are required.

Since it is not meaningful to display the decoded frames from attribute, geometry, or occupancy map tracks without reconstructing the point cloud at the player side, a restricted video scheme type may be defined for these video-coded tracks.

Restricted Video Scheme

V-PCC component video tracks may be represented in the file as restricted video, and identified by 'pccv' in the scheme_type field of the SchemeTypeBox of the RestrictedSchemeInfoBox of their restricted video sample entries.

It should be noted that there is no restriction on the video codec used for encoding the attribute, geometry, and occupancy map V-PCC components. Moreover, these components may be encoded using different video codecs.

Scheme Information

SchemeInformationBox may be present and contain a VPCCUnitHeaderBox.

Referencing V-PCC Component Tracks

To link a V-PCC track to component video tracks, three TrackReferenceTypeBoxes may be added to a TrackReferenceBox within the TrackBox of the V-PCC track, one for each component. The TrackReferenceTypeBox contains an array of track IDs designating the video tracks which the V-PCC track references. The reference type of a TrackReferenceTypeBox identifies the type of the component such as occupancy map, geometry, or attribute, or occupancy map. The track reference types are:

'pcco': the referenced track(s) contain the video-coded occupancy map V-PCC component;

'pccg': the referenced track(s) contain the video-coded geometry V-PCC component;

'pcca': the referenced track(s) contain the video-coded attribute V-PCC component.

The type of the V-PCC component carried by the referenced restricted video track, and signaled in the RestrictedSchemeInfoBox of the track, shall match the reference type of the track reference from the V-PCC track.

Figure 43:
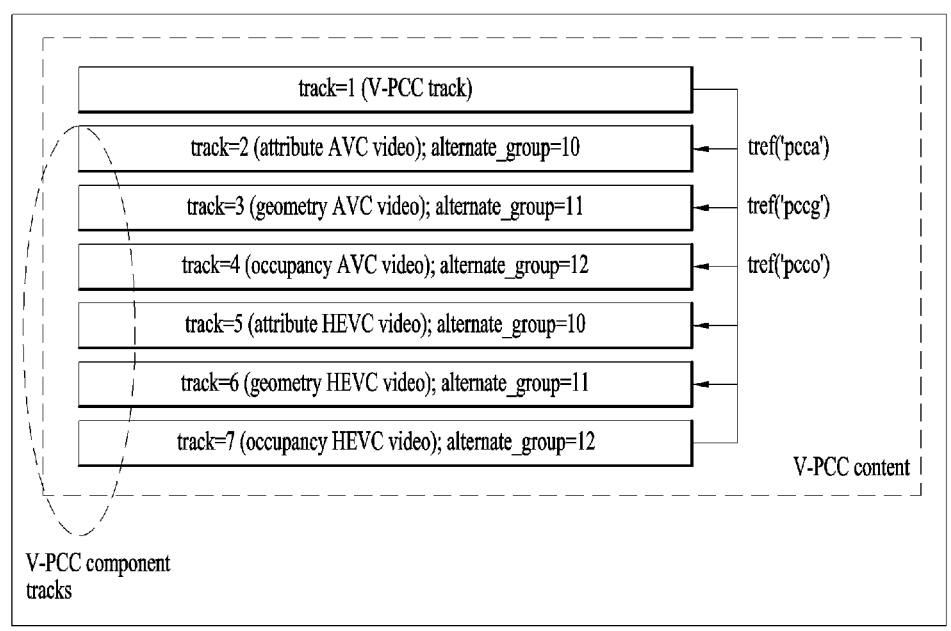
FIG. 43 shows track replacement and grouping according to embodiments.

FIG. 43 shows track replacement and grouping according to embodiments.

FIG. 43 shows an example in which replacement or grouping of tracks of an ISOBMFF file structure is applied.

Track Alternatives and Track Grouping:

V-PCC component tracks which have the same alternate_group value are different encoded versions of the same V-PCC component. A volumetric visual scene may be coded in alternatives. In such a case, all V-PCC tracks which are alternatives of each other have the same alternate_group value in their TrackHeaderBox.

Similarly, when a 2D video track representing one of the V-PCC components is encoded with alternatives, there may be a track reference to exactly one of those alternatives, and the alternatives form an alternate group.

FIG. 43 shows V-PCC component tracks constituting V-PCC content based on a file structure. When the same atlas group ID is given, there are cases where the ID is 10, 11, or 12. Tracks 2 and 5, which are attribute videos, may be used interchangeably with each other. Tracks 3 and 6, which are geometry videos, may be replaced with each other. Tracks 4 and 7, which are occupancy videos, may be replaced with each other.

Single Track Container of V-PCC Bitstream:

A single-track encapsulation of V-PCC data requires the V-PCC encoded elementary bitstream to be represented by a single-track declaration.

Single-track encapsulation of PCC data may be utilized in the case of simple ISOBMFF encapsulation of a V-PCC encoded bitstream. Such a bitstream may be directly stored as a single track without further processing. V-PCC unit header data structures can be kept in the bitstream as-is. A single track container for V-PCC data may be provided to media workflows for further processing (e.g., multi-track file generation, transcoding, DASH segmentation, etc.).

An ISOBMFF file which contains single-track encapsulated V-PCC data contains 'pcst' in the compatible brands[ ] list of its FileTypeBox.

V-PCC Elementary Stream Track:

Sample Entry Type: 'vpe1', 'vpeg'

Container: SampleDescriptionBox

Mandatory: A 'vpe1' or 'vpeg' sample entry is mandatory

Quantity: One or more sample entries may be present

V-PCC elementary stream tracks use VolumetricVisualSampleEntry with a sample entry type of 'vpe1' or 'vpeg'.

A VPCC elementary stream sample entry contains a VPCCConfigurationBox.

Under the 'vpe1' sample entry, all atlas sequence parameter sets, atlas frame parameter sets, and SEIs may be in the setupUnit array. Under the 'vpeg' sample entry, atlas sequence parameter sets, atlas frame parameter sets, and SEIs may be present in this array or in the stream.

Volumetric Sequences:

```
class VPCCConfigurationBox extends Box('vpcC') {
        VPCCDecoderConfigurationRecord( ) VPCCConfig;
}
aligned(8) class VPCCElementaryStreamSampleEntry( ) extends
VolumetricVisualSampleEntry ('vpe1') {
        VPCCConfigurationBox config;
        VPCCBoundingInformationBox 3d_bb;
}
```

V-PCC Elementary Stream Sample Format

A V-PCC elementary stream sample may be comprised of one or more V-PCC units which belong to the same presentation time. Each such sample has a unique presentation time, a size, and a duration. A sample may be a sync sample or decoding-wise dependent on other V-PCC elementary stream samples.

V-PCC Elementary Stream Sync Sample:

A V-PCC elementary stream sync sample may satisfy all the following conditions:

It is independently decodable;

None of the samples that come after the sync sample in decoding order have any decoding dependency on any sample prior to the sync sample; and All samples that come after the sync sample in decoding order are successfully decodable.

V-PCC Elementary Stream Sub-Sample:

A V-PCC elementary stream sub-sample is a V-PCC unit which is contained in a V-PCC elementary stream sample.

A V-PCC elementary stream track contains SubSampleInformationBox in its SampleTableBox, or in the TrackFragmentBox of each of its MovieFragmentBoxes, which lists the V-PCC elementary stream sub-samples.

The 32-bit unit header of the V-PCC unit which represents the sub-sample may be copied to the 32-bit codec_specific_parameters field of the sub-sample entry in the SubSampleInformationBox. The V-PCC unit type of each sub-sample may be identified by parsing the codec_specific_parameters field of the sub-sample entry in the SubSampleInformationBox.

Information described below may be delivered as follows. For example, when point cloud data is static, it may be carried in a sample entry of a multi-track V3C track or a sample entry of an elementary track of a single track. When the point cloud data is dynamic, the information may be carried in a separate timed metadata track.

Partial Access of Point Cloud Data

3D Bounding Box Information Structure

3DBoundingBoxStruct provides 3D bounding box information of the point cloud data, including the x, y, z offset of 3D bounding box and the width, height, and depth of 3D bounding box of the point cloud data.

```
aligned(8) class 3DBoundingBoxInfoStruct( ) {
    unsigned int(16) bb_x;
    unsigned int(16) bb_y;
    unsigned int(16) bb_z;
    unsigned int(16) bb_delta_x;
    unsigned int(16) bb_delta_y;
    unsigned int(16) bb_delta_z;
}
``` bb_x, bb_y, and bb_z specify the x, y, and z coordinate values of the origin position of 3D bounding box of point cloud data in the Cartesian coordinates, respectively.

bb_delta_x, bb_delta_y, and bb_delta_z indicate the extension of the 3D bounding box of point cloud data in the Cartesian coordinates along the x, y, and z axes relative to the origin, respectively.

3D Region Information Structure

3DRegionInfoStruct may contain 3D region information about a partial region of point cloud data.

```
aligned(8) class 3DRegionInfoStruct(3d_dimension_included_flag) {
    unsigned int(16) 3d_region_id;
    unsigned int(16) 3d_anchor_x;
    unsigned int(16) 3d_anchor_y;
    unsigned int(16) 3d_anchor_z;
    if(3d_dimension_included_flag){
    unsigned int(8)     3d_region_type;
    if(3d_region_type == '1') {//cuboid
    unsigned int(16) 3d_region_delta_x;
    unsigned int(16) 3d_region_delta_y;
    unsigned int(16) 3d_region_delta_z;
    }
    }
}
```

3d_region_id may indicate the identifier of the 3D region.

3d_region_anchor_x, 3d_region_anchor_y, and 3d_region_anchor_z may indicate x, y, and z coordinate values of an anchor point of the 3D region, respectively. For example, when the 3D region is of a cuboid type, the anchor point may be the origin of the cuboid, and 3d_region_anchor_x, 3d_region_anchor_y, and 3d_region_anchor_z may indicate the x, y, z coordinate values of the origin position of the cuboid of the 3D region.

3d_region_type may indicate the type of the 3D region and may have 0x01-cuboid as a value.

3d_dimension_included_flag may be a flag indicating whether the 3D region contains detailed information, for example, 3d_region_type, 3d_region_delta_x, 3d_region_delta_y, and 3d_region_delta_z.

3d_region_delta_x, 3d_region_delta_y, and 3d_region_delta_z may indicate the difference values along the x, y, and z axes when the 3D region type is cuboid.

2D Region Information Structure

```
aligned(8) class 2DRegionInfoStruct(2d_dimension_included_flag) {
    unsigned int(8)     2d_region_type;
    unsigned int(16) 2d_region_id;
    if(2d_dimension_included_flag){
        unsigned int(16) 2d_region_top;
        unsigned int(16) 2d_region_left;
        unsigned int(16) 2d_region_width;
        unsigned int(16) 2d_region_height;
    }
}
```

2d_region_id may indicate the identifier of a 2D region. According to embodiments, it may match a video tile identifier, a tile group identifier, or an atlas_tile identifier or tile group identifier in an atlas frame.

2d_region_type may indicate a type representing a 2D region. This may specify the shape of a region, i.e., whether the shape is a square, or whether the 2D region represents a video tile or tile group, or whether an atlas_tile or tile group identifier in an atlas frame is indicated.

2d_region_top and 2d_region_left may include a vertical coordinate value and a horizontal coordinate value of the top-left position of the 2D region within the frame, respectively.

2d_dimension_included_flag may be a flag indicating whether the width and height values of the 2D region are included.

2d_region_width and 2d_region_height may include the horizontal range (width) and vertical range (height) of the 2D region within the frame, respectively.

FIG. 44 shows a structure of a 3D region mapping information according to embodiments.

FIG. 45 shows a structure of a 3D region mapping information according to embodiments.

The information in FIGS. 44 and 45 may be delivered as follows. For example, when point cloud data is static, it may be carried in a sample entry of a multi-track V3C track or a sample entry of an elementary track of a single track. When the point cloud data is dynamic, the information may be carried in a separate timed metadata track.

V-PCC 3D Region Mapping Information Structure

The V-PCC 3D region mapping information structure (VPCC3DRegionMappingInfoStruct) may contain 2D region information about one or more geometry, occupancy, or attribute videos or atlas frames containing data associated with a 3D region of the point cloud data within the video or atlas frame. It may also contain an identifier of a track group including 3D region data (which may refer to a set of tracks including data of the same 3D region).

```
aligned(8) class VPCC3DRegionMappingInfoStruct( ){
    unsigned int(16) num_3d_regions;
    for (i = 0; i < num_3d_regions; i++) {
    3DRegionInfoStruct(1);
        unsigned int(8) num_2d_regions[i];
        for (j=0; j< num_2d_regions[i]; j++){
        2DRegionInfoStruct(1);
        }
    unsigned int(8) num_track_groups[i];
        for (k=0 ; k <num_track_groups[i]; k++)
        unsigned int(32)   track_group_id;
    }
}
```

3DRegionInfoStruct( ) may represent 3D region information in a 3D space of some or all of the point cloud data.

num_2d_regions[i] may indicate the number of 2D regions of one or more videos or atlas frames containing data related to the point cloud data in the 3D region 2DRegionInfoStruct may indicate 2D region information about geometry, occupancy, or attribute videos or atlas frames containing data associated with data related to the point cloud data in the 3D region.

num_track_groups indicates the number of track groups associated with a 3D spatial region.

track_group_id identifies the track group for the tracks which carry the V-PCC components for the associated 3D spatial region.

The 3D region mapping information of FIG. 44 may be included in the 3D region mapping box of FIG. 45.

V-PCC 3D Region Mapping Information Box

The VPCC 3D region mapping box (VPCC3DRegionMappingBox) may contain the following information: 3D region information in a 3D space of a part or all of the point cloud data, an identifier of a track group including the corresponding 3D region data (which may refer to a set of tracks including data of the same 3D region), 2D region information about one or more videos or atlas frames containing data associated with the point cloud data in the 3D region, information about a video, an atlas tile, or a tile group associated with each 2D region, and an identifier of a track group including 2D region data (which may refer to a set of tracks including data of the same 2D region).

```
aligned(8) class VPCC3DRegionMappingBox extends FullBox('vpsr',0,0)
{
    VPCC3DRegionMappingInfoStruct( );
    unsigned int(8) num_2d_regions;
    for (j=0; j< num_2d_regions; j++) {
    unsigned int(8) 2d_region_id;
    unsigned int(8) num_tiles[j];
        for (k=0 ; k <num_tiles[j]; k++)
        unsigned int(32)   tile_id[k];
        unsigned int(8) num_tile_groups[j];
        for (k=0 ; k <num_groups[j]; k++)
        unsigned int(32)   tile_group_id[m];
    unsigned int(8) num_track_groups[j];
        for (k=0 ; k <num_track_groups[j]; k++)
        unsigned int(32)   track_group_id;
    }
}
```

2d_region_id is the identifier of the 2D region of the geometry, occupancy, attribute video or atlas frame.

num_tiles is the number of tiles of a video frame or tiles of an atlas frame associated with the 2D region of a geometry, occupancy, attribute video or atlas frame.

tile_id[k] is a tile identifier of a video frame or an atlas frame associated with the 2D region of the geometry, occupancy, attribute video or atlas frame.

num_tile_groups indicates the number of tile groups of a video frame or tile groups of a video frame associated with the 2D region of a geometry, occupancy, attribute video or atlas frame.

tile_group_id is a tile group identifier of an atlas frame or a video frame associated with the 2D region of a geometry, occupancy, attribute video or atlas frame.

num_track_groups indicates the number of track groups associated with a 2D region.

track_group_id identifies the track group for the tracks which carry the V-PCC components for the associated 2D region.

Static V-PCC 3D Region Mapping Information

If the 2D region information about one or more video or atlas frames containing data associated with the 3D region of point cloud data, and information about the video or atlas tile or tile group associated with each 2D region do not change within the point cloud sequence, VPCC3DRegionMappingBox may be contained in the sample entry of the V-PCC track or V-PCC elementary stream track.

```
aligned(8) class VPCCSampleEntry( ) extends
    VolumetricVisualSampleEntry ('vpc1') {
        VPCCConfigurationBox config;
        VPCCUnitHeaderBox unit_header;
        VPCC3DRegionMappingBox 3d_region_mapping;
    }
```

The 2D region information about an atlas frame signaled in the VPCC3DRegionMappingBox may be 2D region information about the atlas frame included in a sample in the V-PCC track.

The 2D region information about the video (geometry, attribute, occupancy) frame signaled in VPCC3DRegionMappingBox may be 2D region information about the video frame included in the sample in the video track (geometry, attribute, occupancy) referenced through the track reference of the V-PCC track.

```
aligned(8) class VPCCElementaryStreamSampleEntry( ) extends
VolumetricVisualSampleEntry ('vpe1') {
    VPCCConfigurationBox config;
    VPCC3DRegionMappingBox 3d_region_mapping;
}
```

The 2D region information about the video (geometry, attribute, occupancy) frame signaled in the VPCC3DRegionMappingBox may be the 2D region information about the video or atlas frame included in a sub-sample in the V-PCC elementary stream track.

Dynamic V-PCC 3D Region Mapping Information

If the V-PCC track has an associated timed-metadata track with a sample entry type 'dysr', 3D spatial regions defined for the point cloud stream is carried by the V-PCC track and considered as dynamic regions. That is, the spatial region information may dynamically change over time.

The associated timed-metadata track contains a 'cdsc' track reference to the V-PCC track carrying the atlas stream.

The 2D region information about the atlas frame signaled in the VPCC3DRegionMappingBox may be 2D region information about the atlas frame included in a sample in the V-PCC track.

The 2D region information about the video (geometry, attribute, occupancy) frame signaled in the VPCC3DRegionMappingBox may be 2D region information about the video frame included in the sample in the video track (geometry, attribute, occupancy) referenced through the track reference of the V-PCC track.

If the V-PCC elementary stream track has an associated timed-metadata track with a sample entry type 'dysr', 3D spatial regions defined for the point cloud stream is carried by the V-PCC elementary track and considered as dynamic regions. That is, the spatial region information may dynamically change over time.

The associated timed-metadata track contains a 'cdsc' track reference to the V-PCC elementary stream track.

The 2D region information about the video (geometry, attribute, occupancy) frame or atlas frame signaled in the VPCC3DRegionMappingBox may be 2D region information about a video or atlas frame contained in a sub-sample in a V-PCC elementary stream track.

```
aligned(8) class Dynamic3DSpatialRegionSampleEntry extends
MetaDataSampleEntry('dysr') {
    VPCC3DRegionMappingBox init_3d_region_mapping;
}
```

The init_3d_region_mapping may include matching information about the initial 3D region when matching information about a 3D region changes over time.

The sample syntax of this sample entry type 'dysr' is specified as follows:

```
aligned(8) DynamicSpatialRegionSample( ) {
    VPCC3DRegionMappingBox 3d_region_mapping;
}
```

Point Cloud Bounding Box

VPCCBoundingInformationBox may be present in the sample entry of either the V-PCC track or V-PCC elementary stream track. When it is present in the sample entry of either the V-PCC track or V-PCC elementary stream track, VPCCBoundingInformationBox provides the overall bounding box information of associated or carried point cloud data.

```
aligned(8) class VPCCBoundingInformationBox extends
FullBox('vpbb',0,0) {
    3DBoundingBoxInfoStruct( );
}
```

If the V-PCC track has an associated timed-metadata track with a sample entry type 'dybb', the timed metadata track provides dynamically changed 3D bounding box information of point cloud data.

The associated timed-metadata track contains a 'cdsc' track reference to the V-PCC track carrying the atlas stream.

aligned(8) class Dynamic3DBoundingBoxSampleEntry

```
extends MetaDataSampleEntry('dybb') {
    VPCCBoundingInformationBox all_bb;
}
``` all_bb provides the overall 3D bounding box information, including x, y, and z coordinates of the origin position and the extension of the overall 3D bounding box of point cloud data in the Cartesian coordinates along the x, y, and z axes relative to the origin, respectively. 3D bounding box carried in samples in this track is the spatial part of this overall 3D bounding box.

The sample syntax of this sample entry type 'dybb' is specified as follows:

```
aligned(8) Dynamic3DBoundingBoxSample( ) {
    VPCCBoundingInformationBox 3dBB;
}
```

3dBB provides 3D bounding box information signaled in the sample.

Regarding the semantics of 3DSpatialRegionStruct, dimensions_included_flag equal to 0 indicates that the dimensions are not signaled and that they have been previously signaled for the same region. That is, a previous instance of a 3DSpatialRegionStruct with the same 3d_region_id signals the dimensions.

The point cloud data transmission method according to the embodiments may generate one or more tracks including 3D region information (PCC3DRegionMappingInfoStruct) for the point cloud data.

According to embodiments, the 3D region information may include information (num_track_groups) indicating the number of track groups associated with a 3D region and information (track_group_id) identifying the track group for the tracks which carry the point cloud data associated with the 3D region.

Accordingly, the point cloud data transmission method/device according to the embodiments may generate and transmit a data track group associated with a 3D region. Accordingly, the point cloud data reception method/device according to the embodiments may make an efficient spatial access to the 3D region based on the data track group associated with the 3D region according to the embodiments.

The point cloud data transmission method according to the embodiments may generate one or more tracks containing 3D region mapping information (VPCC3DRegionMappingBox extends FullBox).

According to embodiments, the 3D region mapping information may include information (num_track_groups) indicating the number of track groups associated with the 2D region for point cloud data, and information (track_group_id) identifying the track group for the tracks that carry the point cloud data associated with the 2D region.

Figure 46:
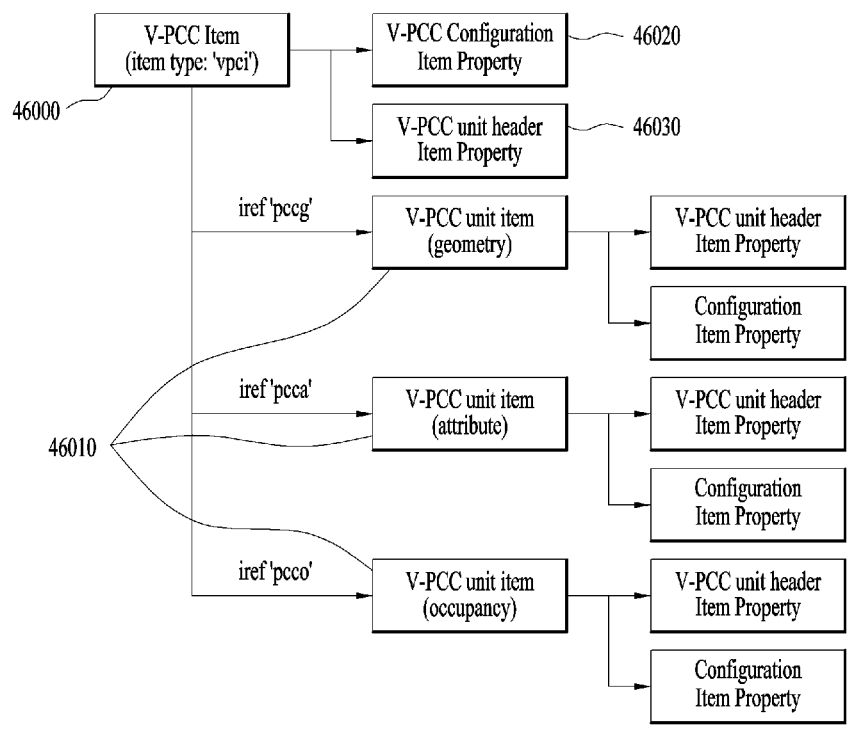
FIG. 46 shows a structure for encapsulating non-timed V-PCC data according to embodiments.

FIG. 46 shows a structure for encapsulating non-timed V-PCC data according to embodiments.

The point cloud data transmission/reception method/device according to the embodiments and the system included in the transmission/reception device may encapsulate and transmit/receive non-timed V-PCC data as shown in FIG. 46.

When the point cloud data according to the embodiments is an image, the point cloud video encoder 10002 of FIG. 1 (or the encoder of FIG. 4, the encoder of FIG. 15, the transmission device of FIG. 18, the processor 20001 of FIG. 20, the image encoder 20003 of FIG. 20, the processor of FIG. 21, or the image encoder 21008 of FIG. 21) may encode the image, the file/segment encapsulator 10003 (or the file/segment encapsulator 20004 of FIG. 20 or the file/segment encapsulator 21009 of FIG. 21) may store the image and image-related information in a container (item) as shown in FIG. 46, and the transmitter 10004 may transmit the container.

Similarly, the receiver of FIG. 1 receives the container of FIG. 46, and the file/segment decapsulator 10007 (or the file/segment decapsulator 20005 of FIG. 20 or the file/segment decapsulator 22000) parses the container. The point cloud video decoder 10008 of FIG. 1 (or the decoder of FIG. 16, the decoder of FIG. 17, the reception device of FIG. 19, or the image decoder 20006, or the image decoder 22002) may decode the image included in the item and provide the decoded image to the user.

According to embodiments, the image may be a still image. The method/device according to the embodiments may transmit and receive point cloud data about the image. The method/device according to the embodiments may store and transmit/receive the image in an item based on the data container structure as shown in FIG. 46. Attribute information about the image may be stored in an image property or the like.

The non-timed V-PCC data is stored in the file as image items. Two new item types (V-PCC item and V-PCC unit item) are defined to encapsulate the non-timed V-PCC data.

The new handler type 4CC code 'vpcc' is defined and stored in a HandlerBox of MetaBox to indicate presence of V-PCC items, V-PCC unit items, and other V-PCC-encoded content representation information.

V-PCC Items 46000: A V-PCC item is an item which represents an independently decodable V-PCC access unit. An item type 'vpci' is defined to identify V-PCC items. V-PCC items store V-PCC unit payload(s) of the atlas sub-bitstream. If PrimaryItemBox exists, item_id in this box is set to indicate a V-PCC item.

V-PCC Unit Item 46010: A V-PCC unit item is an item which represents a V-PCC unit data. V-PCC unit items store V-PCC unit payload(s) of occupancy, geometry, and attribute video data units. A V-PCC unit item stores only one V-PCC access unit related data.

An item type for a V-PCC unit item is set depending on the codec used to encode corresponding video data units. A V-PCC unit item is associated with corresponding V-PCC unit header item property and codec specific configuration item property. V-PCC unit items are marked as hidden items because it is not meaningful to display independently.

In order to indicate the relationship between a V-PCC item and V-PCC unit items, three below item reference types are used. Item reference is defined "from" a V-PCC item "to" the related V-PCC unit items.

'pcco': the referenced V-PCC unit item(s) contain the occupancy video data units.

'pccg': the referenced V-PCC unit item(s) contain the geometry video data units.

'pcca': the referenced V-PCC unit item(s) contain the attribute video data units.

V-PCC Configuration Item Property 52020
Box Types: 'vpcp'
Property type: Descriptive item property
Container: ItemPropertyContainerBox
Mandatory (per item): Yes, for a V-PCC item of type 'vpci'
Quantity (per item): One or more for a V-PCC item of type 'vpci'

For the V-PCC configuration item property, the box type is 'vpcp' and the property type is a descriptive item property. The container is an ItemPropertyContainerBox. It is mandatory per item for a V-PCC item of type 'vpci'. One or more properties per item may be present for a V-PCC item of type 'vpci'.

V-PCC parameter sets are stored as descriptive item properties and are associated with the V-PCC items.

```
aligned(8) class vpcc_unit_payload_struct ( ) {
    unsigned int(16) vpcc_unit_payload_size;
    vpcc_unit_payload( );
}
``` vpcc_unit_payload_size specifies the size in bytes of the vpcc_unit_paylod( ).

```
aligned(8) class VPCCConfigurationProperty extends ItemProperty('vpcc')
{
    vpcc_unit_payload_struct( )[ ];
}
``` vpcc_unit_paylod( ) includes a V-PCC unit of type VPCC_VPS.

V-PCC Unit Header Item Property 46030
Box Types: 'vunt'
Property type: Descriptive item property
Container: ItemPropertyContainerBox
Mandatory (per item): Yes, for a V-PCC item of type 'vpci' and for a V-PCC unit item
Quantity (per item): One For the V-PCC unit header item property, the box type is 'vunt', the property type is a descriptive item property, and the container is an ItemPropertyContainerBox. It is Mandatory per item for a V-PCC item of type 'vpci' and for a V-PCC unit item. One property may be present per item.

V-PCC unit header is stored as descriptive item properties and is associated with the V-PCC items and the V-PCC unit items.

```
aligned(8) class VPCCUnitHeaderProperty ( ) extends
ItemFullProperty('vunt', version=0, 0) {
    vpcc_unit_header( );
}
```

Based on the structure of FIG. 46, the method/device/system according to the embodiments may deliver non-timed point cloud data.

Carriage of Non-timed Video-based Point Cloud Compression Data

The non-timed V-PCC data is stored in a file as image items. A new handler type 4CC code 'vpcc' is defined and stored in the HandlerBox of the MetaBox in order to indicate the presence of V-PCC items, V-PCC unit items and other V-PCC encoded content representation information.

An item according to embodiments represents an image. For example, it is data that does not move and may refer to a single image.

The method/device according to the embodiments may generate and transmit data according to the embodiments based on a structure for encapsulating non-timed V-PCC data, as shown in FIG. 52.

V-PCC Items

A V-PCC item is an item which represents an independently decodable V-PCC access unit. A new item type 4CC code 'vpci' is defined to identify V-PCC items. V-PCC items store V-PCC unit payload(s) of atlas sub-bitstream.

If PrimaryItemBox exists, item_id in this box shall be set to indicate a V-PCC item.

V-PCC Unit Item

A V-PCC unit item is an item which represents a V-PCC unit data.

V-PCC unit items store V-PCC unit payload(s) of occupancy, geometry, and attribute video data units. A V-PCC unit item may contain only one V-PCC access unit related data.

An item type 4CC code for a V-PCC unit item is set based on the codec used to encode corresponding video data units. A V-PCC unit item is associated with corresponding V-PCC unit header item property and codec specific configuration item property.

V-PCC unit items are marked as hidden items, since it is not meaningful to display independently.

In order to indicate the relationship between a V-PCC item and V-PCC units, three new item reference types with 4CC codes 'pcco', 'pccg' and 'pcca' are defined. Item reference is defined "from" a V-PCC item "to" the related V-PCC unit items. The 4CC codes of item reference types are:

'pcco': the referenced V-PCC unit item(s) containing the occupancy video data units.

'pccg': the referenced V-PCC unit item(s) containing the geometry video data units.

'pcca': the referenced V-PCC unit item(s) containing the attribute video data units.

V-PCC-Related Item Properties

Descriptive item properties are defined to carry the V-PCC parameter set information and V-PCC unit header information, respectively:

V-PCC Configuration Item Property

Box Types: 'vpcp'

Property type: Descriptive item property

Container: ItemPropertyContainerBox

Mandatory (per item): Yes, for a V-PCC item of type 'vpci'

Quantity (per item): One or more for a V-PCC item of type 'vpci'

V-PCC parameter sets are stored as descriptive item properties and are associated with the V-PCC items.

essential is set to 1 for a 'vpcp' item property.

```
aligned(8) class vpcc_unit_payload_struct ( ) {
    unsigned int(16) vpcc_unit_payload_size;
    vpcc_unit_payload( );
}
aligned(8) class VPCCConfigurationProperty
    extends ItemProperty('vpcc') {
    vpcc_unit_payload_struct( )[ ];
}
``` vpcc_unit_payload_size specifies the size in bytes of the vpcc_unit_paylod( ).

V-PCC Unit Header Item Property

Box Types: 'vunt'

Property type: Descriptive item property

Container: ItemPropertyContainerBox

Mandatory (per item): Yes, for a V-PCC item of type 'vpci' and for a V-PCC unit item Quantity (per item): One V-PCC unit header is stored as descriptive item properties and is associated with the V-PCC items and the V-PCC unit items.

essential is set to 1 for a 'vunt' item property.

```
aligned(8) class VPCCUnitHeaderProperty ( ) {
    extends ItemFullProperty('vunt', version=0, 0) {
        vpcc_unit_header( );
}
```

V-PCC 3d Bounding Box Item Property

Box Types: 'v3dd'

Property type: Descriptive item property

Container: ItemPropertyContainerBox

Mandatory (per item): Yes, for a V-PCC item of type 'vpci' and for a V-PCC unit item Quantity (per item): One 3D bounding information is stored as descriptive item properties and is associated with the V-PCC items and the V-PCC unit items.

```
aligned(8) class VPCC3DBoundingBoxInfoProperty ( ) {
    extends ItemFullProperty('v3dd', version=0, 0) {
        3DBoundingBoxInfoStruct( );
}
```

V-PCC 3D Region Mapping Information Item Property

Box Types: 'dysr'

Property type: Descriptive item property

Container: ItemPropertyContainerBox

Mandatory (per item): Yes, for a V-PCC item of type 'vpci' and for a V-PCC unit item Quantity (per item): One 3D bounding information is stored as descriptive item properties and is associated with the V-PCC items and the V-PCC unit items.

```
aligned(8) class VPCC3DRegionMappingBoxInforoperty ( ) {
    extends ItemFullProperty('v3dd', version=0, 0) {
        VPCC3DRegionMappingInfoStruct( );
}
```

Figure 47:
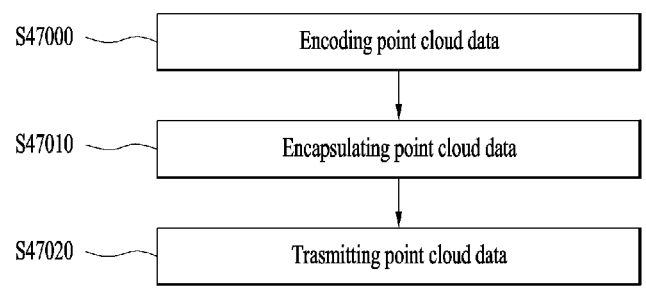
FIG. 47 illustrates a point cloud data transmission method according to embodiments.

FIG. 47 illustrates a point cloud data transmission method according to embodiments.

The point cloud data transmission method according to the embodiments includes encoding point cloud data (S47000). The encoding operation according to the embodiments may include operations such as operation of the point cloud video encoder 10002 of FIG. 1, operation of the encoder of FIG. 4, operation of the encoder of FIG. 15, and the data input unit or multiplexer 18007 of the transmission device of FIG. 18, operation of the pre-processor 20001 or video/image encoder 20002, 20003 of FIG. 20, operation of the pre-processors 21001 to 21006 or the video/image encoder 21007, 21008 of FIG. 21, operation of the XR device 2330, the bitstream generation of FIGS. 25 and 26.

The point cloud data transmission method according to the embodiments may further include encapsulating the point cloud data (S47010). operations such as file/segment encapsulation (10003, 20004, 21009) of FIGS. 1, 20, and 21, and generation of a file of FIGS. 24 and 25 (see FIG. 26 or preceding figures). The encapsulation operation according to the embodiments may include operations such as operation of the file/segment encapsulator 10003 of FIG. 1, encapsulation of the encoded point cloud data bitstream generated by the transmission device of FIG. 18, operation of the file/segment encapsulator 20004 of FIG. 20, operation of the file/segment encapsulator 21009 of FIG. 21, operation of the XR device 2330 of FIG. 23, encapsulation of a bitstream in FIGS. 25 and 26, encapsulation of a bitstream into a file in FIGS. 40 and 41, and encapsulation of a bitstream into an item in FIG. 46.

The point cloud data transmission method according to the embodiments may further include transmitting the point cloud data (S47020). The transmission operation according to the embodiments may include operations such as point cloud data transmission by the transmitter 10004 of FIG. 1, the transmitter 18008 of FIG. 18, the delivery of FIG. 20, the delivery of FIG. 21, the XR device of FIG. 23, and point cloud data transmission in FIGS. 25 to 46.

Figure 48:
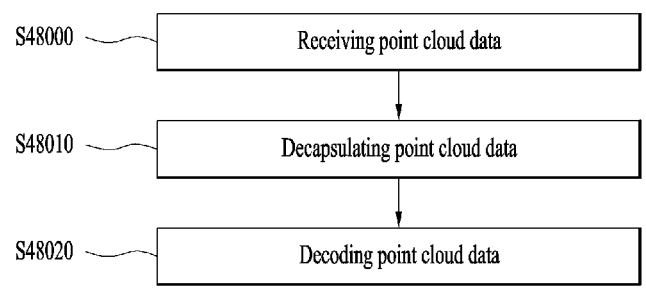
FIG. 48 illustrates a point cloud data reception method according to embodiments.

FIG. 48 illustrates a point cloud data reception method according to embodiments.

The point cloud data reception method according to the embodiments may include receiving point cloud data (S48000). The reception operation according to the embodiments may include operations such as operation of the receiver 10006 of FIG. 1, operation of the receiver of FIG. 19, the reception according to the delivery of FIG. 20, the reception according to the delivery of FIG. 22, and the reception by the XR device 2330 of FIG. 23, the reception of a bitstream in FIGS. 25 and 26, the reception of a file in FIGS. 40 and 41, and the reception of an item in FIG. 46.

The reception method according to the embodiments may further include decapsulating the point cloud data (S48010). The decapsulation operation according to the embodiments may include operations such as decapsulation of a container containing data in the file/segment decapsulator 10007 of FIG. 1, the file/segment decapsulator 20005 of FIG. 20, the file/segment decapsulator 22000 of FIG. 22, the XR device 2330 of FIG. 23, and FIGS. 25 and 26, and decapsulation of a file in FIGS. 40 and 41, decapsulation of an item in FIG. 46.

The reception method according to the embodiments may further include decoding the point cloud data (S48020). The decoding operation according to the embodiments may include operations such as operation of the point cloud video decoder 10008 of FIG. 1, operation of the decoder of FIG. 16, operation of the decoder of FIG. 17, decoding of point cloud data in FIG. 19, operation of the video/image decoder 20006 of FIG. 20, operation of the video/image decoder 22001, 22002 of FIG. 22, operation of the XR device 2330 of FIG. 23, and decoding of data in FIGS. 25 to 43.

According to the proposed method, a transmitter or receiver configured to provide a point cloud content service may configure a V-PCC bitstream and store a file as described above.

Metadata for data processing and rendering in the V-PCC bitstream may be transmitted in a bitstream.

The player or the like may be allowed to perform partial access or spatial access to the point cloud object/content according to the user's viewport. In other words, the above-described data representation method (see FIGS. 24 to 46) may enable efficient access to and processing of a point cloud bitstream according to the user's viewport.

The point cloud data transmission device according to the embodiments may provide a bounding box for partial access and/or spatial access to point cloud content (e.g., V-PCC content) and signaling information therefor (see FIGS. 24 to 46). Accordingly, the point cloud data reception device according to the embodiments may be allowed to access the point cloud content in various ways in consideration of the player or user environment.

The point cloud data transmission device according to the embodiments may provide 3D region information of V-PCC content for supporting spatial access of V-PCC content according to a user viewport and a 2D region related metadata on a video or atlas frame associated therewith (see FIGS. 24 to 46).

The point cloud data transmission device according to the embodiments may provide signaling of 3D region information about a point cloud in a point cloud bitstream and information related to a 2D region on a video or atlas frame associated therewith (see FIGS. 24 to 46).

In addition, the point cloud data reception device according to the embodiments may efficiently provide users with point cloud content with low latency considering the user environment, based on storage and signaling of 3D region information about the point cloud in the file and 2D region related information on the video or atlas frame associated therewith (see FIGS. 24 to 46).

Further, the point cloud data reception device according to the embodiments may provide various accesses to point cloud content based on 3D region information about a point cloud associated with image items in a file and 2D region related information on a video or atlas frame associated therewith (see FIGS. 24 to 46).

The point cloud data transmission device according to the embodiments may efficiently encode and provide track grouping including data associated with a 3D region of point cloud data and related signaling information (see FIGS. 24 to 46).

Further, the point cloud data receiving device according to the embodiments may efficiently access point cloud contents based on track grouping including data associated with a 2D region and related signaling information (see FIGS. 24 to 46).

The embodiments have been described in terms of a method and/or a device. The description of the method and the description of the device may complement each other.

Although embodiments have been described with reference to each of the accompanying drawings for simplicity, it is possible to design new embodiments by merging the embodiments illustrated in the accompanying drawings. If a recording medium readable by a computer, in which programs for executing the embodiments mentioned in the foregoing description are recorded, is designed by those skilled in the art, it may also fall within the scope of the appended claims and their equivalents. The devices and methods may not be limited by the configurations and methods of the embodiments described above. The embodiments described above may be configured by being selectively combined with one another entirely or in part to enable various modifications. Although preferred embodiments have been described with reference to the drawings, those skilled in the art will appreciate that various modifications and variations may be made in the embodiments without departing from the spirit or scope of the disclosure described in the appended claims. Such modifications are not to be understood individually from the technical idea or perspective of the embodiments.

Various elements of the devices of the embodiments may be implemented by hardware, software, firmware, or a combination thereof. Various elements in the embodiments may be implemented by a single chip, for example, a single hardware circuit. According to embodiments, the components according to the embodiments may be implemented as separate chips, respectively. According to embodiments, at least one or more of the components of the device according to the embodiments may include one or more processors capable of executing one or more programs. The one or more programs may perform any one or more of the operations/methods according to the embodiments or include instructions for performing the same. Executable instructions for performing the method/operations of the device according to the embodiments may be stored in a non-transitory CRM or other computer program products configured to be executed by one or more processors, or may be stored in a transitory CRM or other computer program products configured to be executed by one or more processors. In addition, the memory according to the embodiments may be used as a concept covering not only volatile memories (e.g., RAM) but also nonvolatile memories, flash memories, and PROMs. In addition, it may also be implemented in the form of a carrier wave, such as transmission over the Internet. In addition, the processor-readable recording medium may be distributed to computer systems connected over a network such that the processor-readable code may be stored and executed in a distributed fashion.

In this document, the term "/" and "," should be interpreted as indicating "and/or." For instance, the expression "A/B" may mean "A and/or B." Further, "A, B" may mean "A and/or B." Further, "A/B/C" may mean "at least one of A, B, and/or C." "A, B, C" may also mean "at least one of A, B, and/or C." Further, in the document, the term "or" should be interpreted as "and/or." For instance, the expression "A or B" may mean 1) only A, 2) only B, and/or 3) both A and B. In other words, the term "or" in this document should be interpreted as "additionally or alternatively."

Terms such as first and second may be used to describe various elements of the embodiments. However, various components according to the embodiments should not be limited by the above terms. These terms are only used to distinguish one element from another. For example, a first user input signal may be referred to as a second user input signal. Similarly, the second user input signal may be referred to as a first user input signal. Use of these terms should be construed as not departing from the scope of the various embodiments. The first user input signal and the second user input signal are both user input signals, but do not mean the same user input signal unless context clearly dictates otherwise.

The terminology used to describe the embodiments is used for the purpose of describing particular embodiments only and is not intended to be limiting of the embodiments. As used in the description of the embodiments and in the claims, the singular forms "a", "an", and "the" include plural referents unless the context clearly dictates otherwise. The expression "and/or" is used to include all possible combinations of terms. The terms such as "includes" or "has" are intended to indicate existence of figures, numbers, steps, elements, and/or components and should be understood as not precluding possibility of existence of additional existence of figures, numbers, steps, elements, and/or components. As used herein, conditional expressions such as "if" and "when" are not limited to an optional case and are intended to be interpreted, when a specific condition is satisfied, to perform the related operation or interpret the related definition according to the specific condition.

Operations according to the embodiments described in this specification may be performed by a transmission/reception device including a memory and/or a processor according to embodiments. The memory may store programs for processing/controlling the operations according to the embodiments, and the processor may control various operations described in this specification. The processor may be referred to as a controller or the like. In embodiments, operations may be performed by firmware, software, and/or combinations thereof. The firmware, software, and/or combinations thereof may be stored in the processor or the memory.

The operations according to the above-described embodiments may be performed by the transmission device and/or the reception device according to the embodiments. The transmission/reception device may include a transmitter/receiver configured to transmit and receive media data, a memory configured to store instructions (program code, algorithms, flowcharts and/or data) for the processes according to the embodiments, and a processor configured to control the operations of the transmission/reception device.

The processor may be referred to as a controller or the like, and may correspond to, for example, hardware, software, and/or a combination thereof. The operations according to the above-described embodiments may be performed by the processor. In addition, the processor may be implemented as an encoder/decoder for the operations of the above-described embodiments.

Mode for Disclosure

As described above, related details have been described in the best mode for carrying out the embodiments.

Industrial Applicability

As described above, the embodiments are fully or partially applicable to a point cloud data transmission/reception device and system.

Those skilled in the art may change or modify the embodiments in various ways within the scope of the embodiments.

Embodiments may include variations/modifications within the scope of the claims and their equivalents.

What is claimed is:

1. An apparatus for receiving point cloud data, the apparatus comprising:
a receiver configured to receive a file including point cloud data;
a decapsulator configured to decapsulate the file, wherein the decapsulator is configured to parse one or more tracks in the file, wherein the one or more tracks include 3D region information for track groups for the point cloud data; and a decoder configured to decode the point cloud data, wherein the 3D region information includes a number of atlas tiles associated with a 3D region for the point cloud data and an identifier for each atlas tile associated with the 3D region, wherein the 3D region information further includes identification information related to the track groups associated with the 3D region, and wherein the one or more tracks further include spatial region information with a sample entry type representing that the spatial region information dynamically changes over time.

2. The apparatus of claim 1, wherein the track groups include a same track group identifier.

3. The apparatus of claim 1, wherein the 3D region information further includes:

information representing a number of track groups associated with a 2D region for the point cloud data; and information identifying a track group for tracks carrying point cloud data associated with the 2D region.

4. A method for receiving point cloud data, the method comprising:

receiving a file including point cloud data;

decapsulating the file, wherein decapsulating the file includes parsing one or more tracks in the file, wherein the one or more tracks includes 3D region information for track groups for the point cloud data; and decoding the point cloud data, wherein the 3D region information includes a number of atlas tiles associated with a 3D region for the point cloud data and an identifier for each atlas tile associated with the 3D region, wherein the 3D region information further includes identification information related to the track groups associated with the 3D region, and wherein, in response to a value of a sample entry type for the 3D region information, the 3D region information dynamically change over time.

5. The method of claim 4, wherein the track groups include a same track group identifier.

6. The method of claim 4, wherein the 3D region information further includes:

information representing a number of track groups associated with a 2D region for the point cloud data; and information identifying a track group for tracks carrying point cloud data associated with the 2D region.

7. A method for transmitting point cloud data, the method comprising:

encoding point cloud data;

encapsulating the point cloud data in a file, wherein the file includes one or more tracks for the point cloud data, wherein the one or more tracks include 3D region information for track groups for the point cloud data; and transmitting the point cloud data, wherein the 3D region information includes a number of atlas tiles associated with a 3D region for the point cloud data and an identifier for each atlas tile associated with the 3D region, wherein the 3D region information further includes identification information related to the track groups associated with the 3D region, and wherein the one or more tracks further include spatial region information with a sample entry type representing that the spatial region information dynamically changes over time.

8. The method of claim 7, wherein the track groups include a same track group identifier.

9. The method of claim 7, wherein the 3D region information further includes:

information representing a number of track groups associated with a 2D region for the point cloud data; and information identifying a track group for tracks carrying point cloud data associated with the 2D region.

10. An apparatus for transmitting point cloud data, the apparatus comprising:

an encoder configured to encode point cloud data;

an encapsulator configured to encapsulate the point cloud data in a file, wherein the file includes one or more tracks for the point cloud data, wherein the one or more tracks include 3D region information for track groups for the point cloud data; and a transmitter configured to transmit the point cloud data, wherein the 3D region information includes a number of atlas tiles associated with a 3D region for the point cloud data and an identifier for each atlas tile associated with the 3D region, wherein the 3D region information further includes identification information related to the track groups associated with the 3D region, and wherein the one or more tracks further include spatial region information with a sample entry type representing that the spatial region information dynamically changes over time.

* * * * *